(12) United States Patent
Uchino et al.

(10) Patent No.: US 7,450,633 B2
(45) Date of Patent: Nov. 11, 2008

(54) WANDER GENERATOR, AND DIGITAL LINE TESTER AND PHASE NOISE TRANSFER CHARACTERISTIC ANALYZER USING THE SAME

(75) Inventors: Masaharu Uchino, Aikawa-machi (JP); Kazuhiko Ishibe, Samukawa-machi (JP); Takashi Aoki, Atsugi (JP); Ken Mochizuki, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 11/683,313

(22) Filed: Mar. 7, 2007

(65) Prior Publication Data

US 2007/0286322 A1    Dec. 13, 2007

Related U.S. Application Data

(62) Division of application No. 09/890,441, filed as application No. PCT/JP00/09139 on Dec. 22, 2000, now Pat. No. 7,206,339.

(30) Foreign Application Priority Data

| Dec. 24, 1999 | (JP) | ................................. 11-367209 |
| Jan. 14, 2000 | (JP) | ............................. 2000-006642 |
| Jun. 14, 2000 | (JP) | ............................. 2000-178183 |
| Nov. 2, 2000 | (JP) | ............................. 2000-336447 |

(51) Int. Cl.
*H04Q 1/20* (2006.01)
*H04B 3/46* (2006.01)
*H04B 17/00* (2006.01)
*G06F 1/00* (2006.01)

(52) U.S. Cl. .................... 375/224; 375/226; 713/500

(58) Field of Classification Search .................. 375/224, 375/226, 227; 713/500; 702/124; 345/440
See application file for complete search history.

(56) References Cited

U.S. PATENT DOCUMENTS 3,619,774 A    11/1971    Landwehr (Continued)

FOREIGN PATENT DOCUMENTS

EP    0 547 271 A    6/1993

(Continued)

OTHER PUBLICATIONS

M. Carbonelli et al, "Jitter and Wander Performance in Synchronization Distribution Chains", Instrumentation and Measurement Technology Conference 1996, Conference Proceedings, Quality Measurements: The Indispensible Bridge Between Theory and Reality, IEEE Brussels, Belgium, Jun. 4-6, 1996, IEEE US Jun. 4, 1996, pp. 44-47, XP010163841.

(Continued)

*Primary Examiner*—Mohammad Ghayour
*Assistant Examiner*—Lawrence B Williams
(74) *Attorney, Agent, or Firm*—Frishauf, Holtz, Goodman & Chick, P.C.

(57) ABSTRACT

A wander generator has a random number signal generator unit, a filter unit, a clock generator unit, a modulator unit, and a setting unit. The random number generator unit sequentially generates random number signals comprised of a plurality of bits at a constant speed in accordance with a predetermined algorithm. The filter unit receives a random number signal sequence generated by the random number signal generator unit for filtering. The clock generator unit generates a clock signal. The modulator unit modulates the frequency of clock signal generated by the clock generator unit with a signal output from the filter unit. The setting unit applies the filter unit with a signal for setting each amplitude value of a spectrum of a signal sequence output from the filter unit.

8 Claims, 35 Drawing Sheets

U.S. PATENT DOCUMENTS

| | | | |
|---|---|---|---|
| 4,539,518 A | | 9/1985 | Kitayoshi |
| 4,539,709 A | | 9/1985 | Conner |
| 4,901,265 A | | 2/1990 | Kerr et al. |
| 5,014,231 A | | 5/1991 | Reinhardt et al. |
| 5,515,404 A | | 5/1996 | Pearce |
| 5,557,196 A | | 9/1996 | Ujiie |
| 5,742,208 A | | 4/1998 | Blazo |
| 5,754,437 A | | 5/1998 | Blazo |
| 5,757,652 A | * | 5/1998 | Blazo et al. ............ 702/69 |
| 5,835,501 A | | 11/1998 | Dalmia et al. |
| 6,246,738 B1 | * | 6/2001 | Acimovic et al. ...... 375/240.03 |
| 6,854,068 B2 | * | 2/2005 | Ishibe et al. ............ 713/500 |

FOREIGN PATENT DOCUMENTS

| | | |
|---|---|---|
| EP | 0 823 700 A | 2/1998 |
| EP | 0 828 343 A1 | 3/1998 |
| GB | 2 146 205 A | 4/1985 |
| GB | 2158254 A | 11/1985 |
| JP | 62-233953 A | 10/1987 |
| JP | 8-220163 A | 8/1996 |

OTHER PUBLICATIONS

S. Bregni et al, "Simulation of Clock Noise and AU-4 Pointer Action in SDC Equipment", Global Telecommunications Conference 1995, Conference Record, Communiation Theory Mini-Conference, Globecom '95, IEEE Singapore Nov. 13-17, 1995, IEE US Jun. 4, 1996, pp. 44-47, XP010164311.

P.E. Sholander et al, "Mapping Wander in SONET/SDH Fixed Threshold and Uniform Pointer Processors", Global Telecommunications Conference 1995, Conference Record, Communication Theory Mini-Conference, Globecom '95, IEEE Singapore Nov. 13-17, 1995, IEEE Nov. 13, 1995, pp. 50-55, XP010164310.

S. Bregni et al, "Jitter Testing Technique and Results at VC-4 Desynchronizer Output of SDH Equipment", IEEE Transactions on Instrumentation and Measurement, vol. 44, No. 3, Jun. 1, 1995, pp. 675-678, XP000S27535.

McNally, B.I. et al, "Jitter Accumulation in a Simulated 591-2 MBIT/S, 6000km Optical Transmission System", *Electronics Letters*, vol. 24, No. 11, pp. 676-678, May 26, 1988, IEEE Stevenage, GB, XP000761221, ISSN: 0013-5194—figure 1.

* cited by examiner

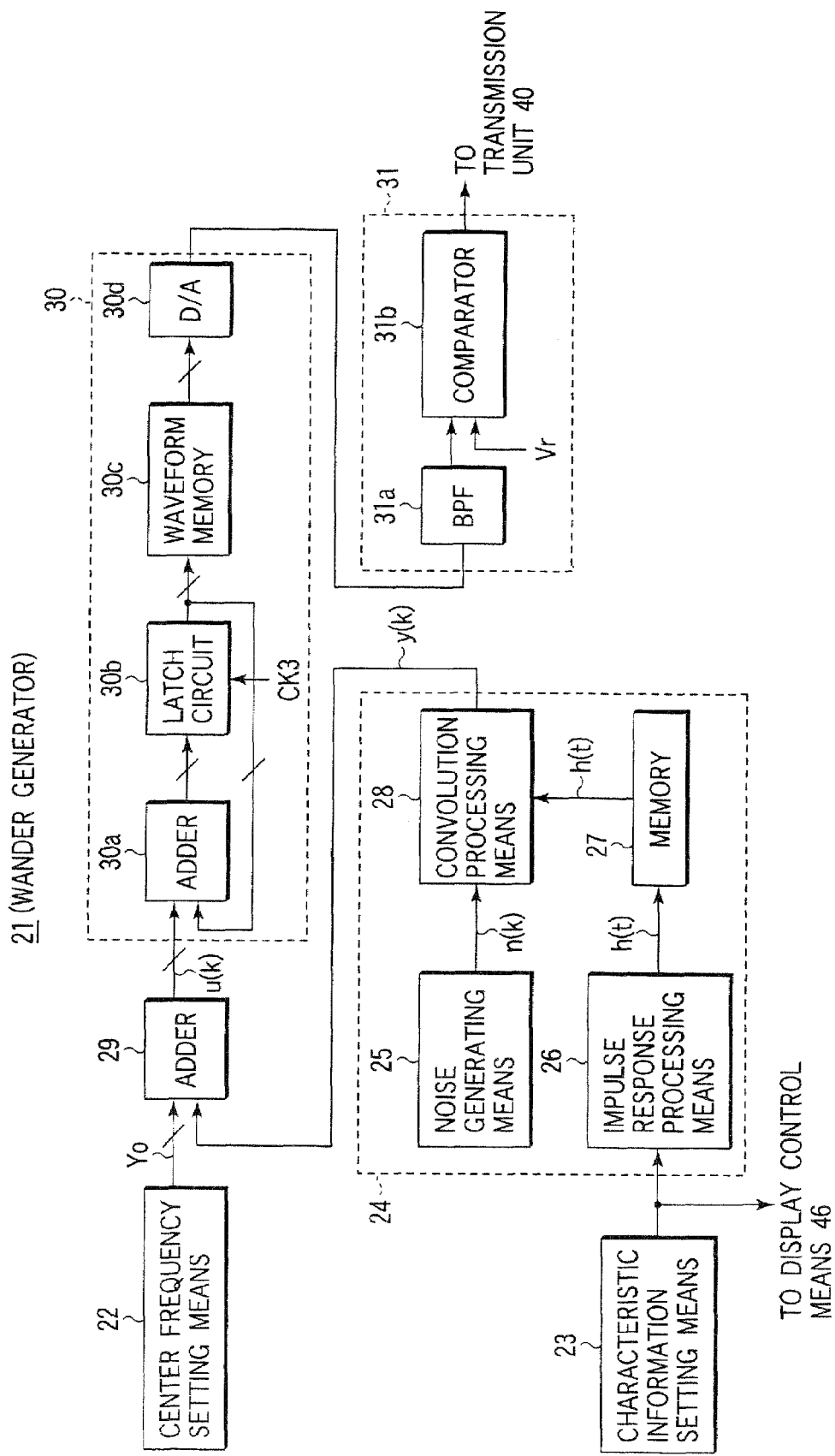
F I G. 5

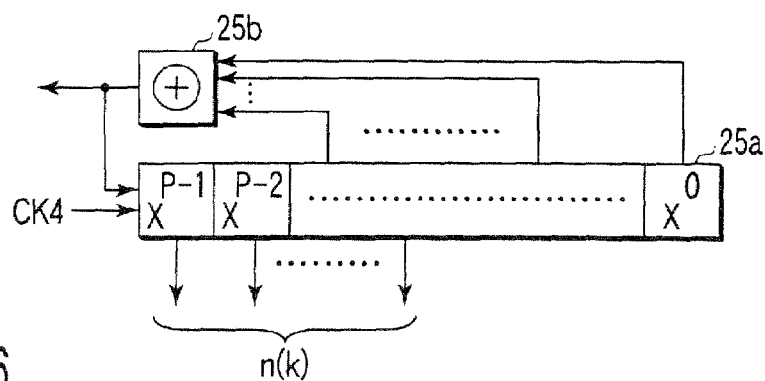
F I G. 6
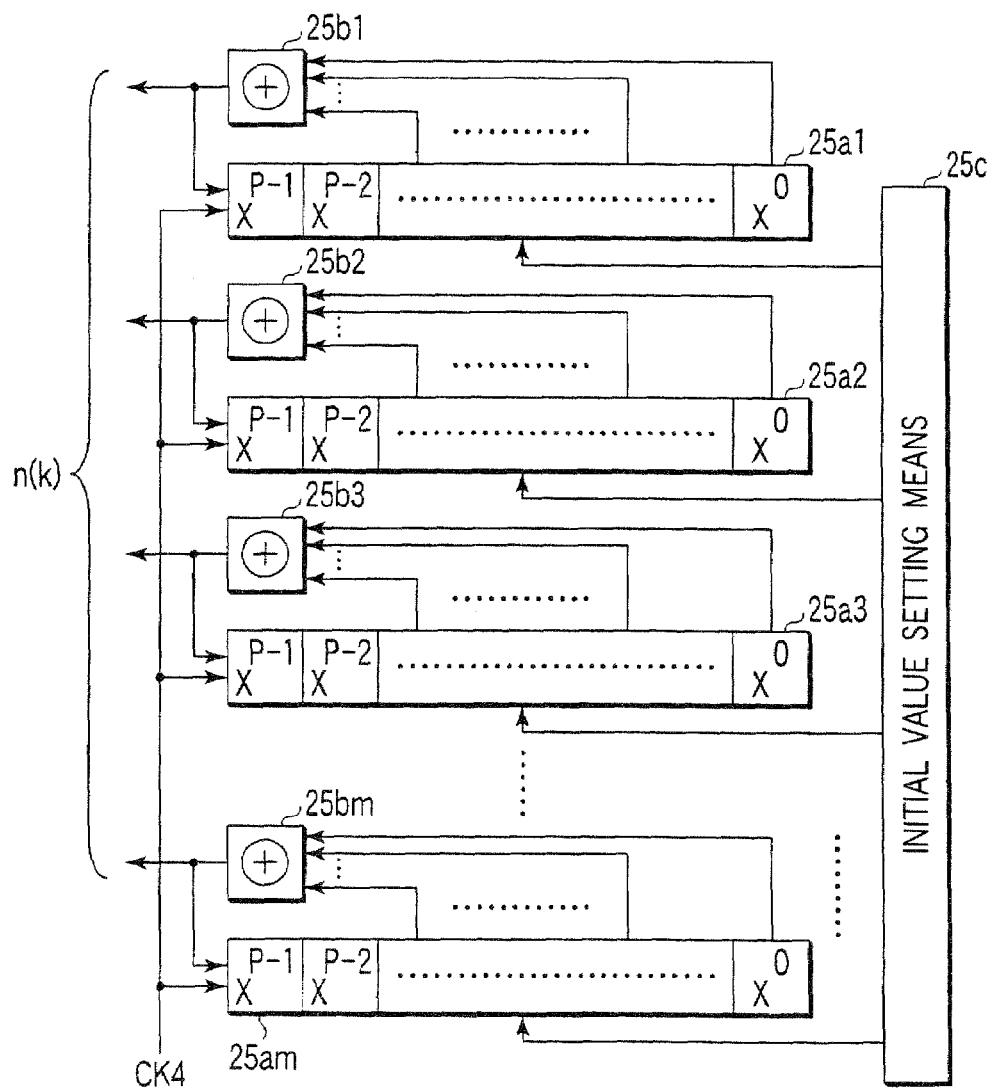
F I G. 7

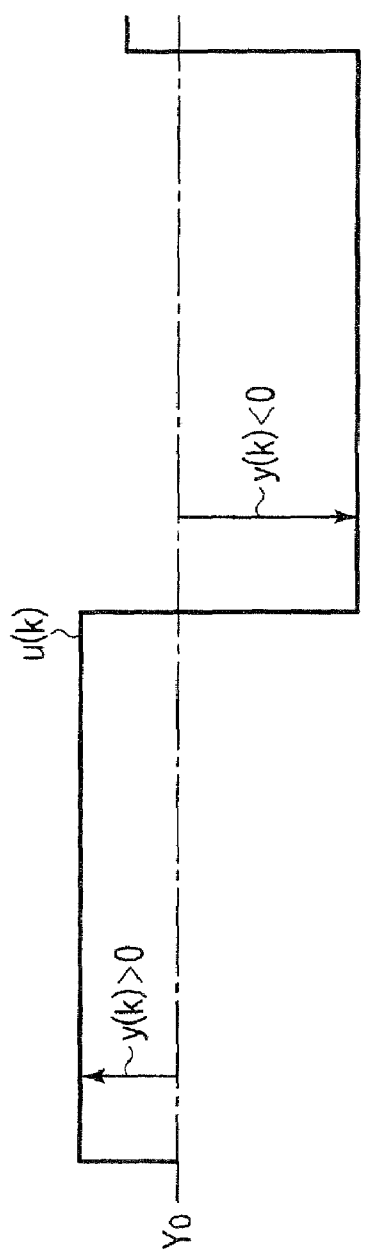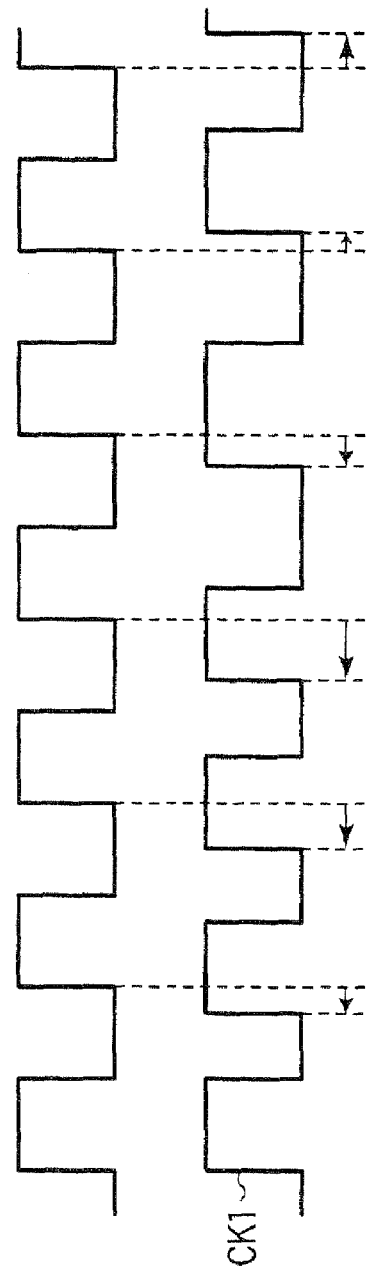
F I G. 10A
F I G. 10B
F I G. 10C

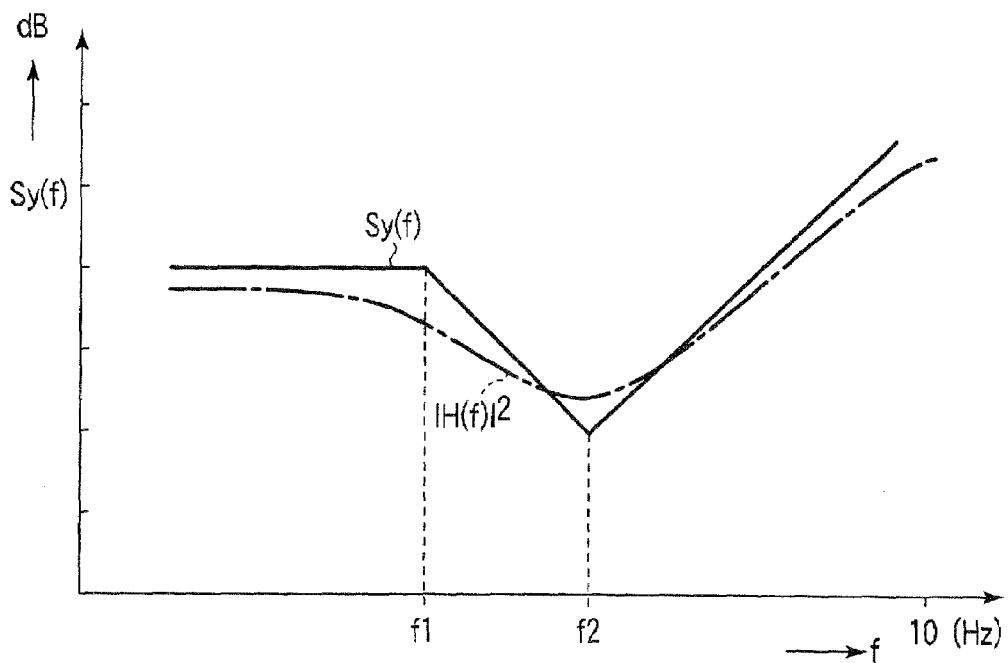
F I G. 12
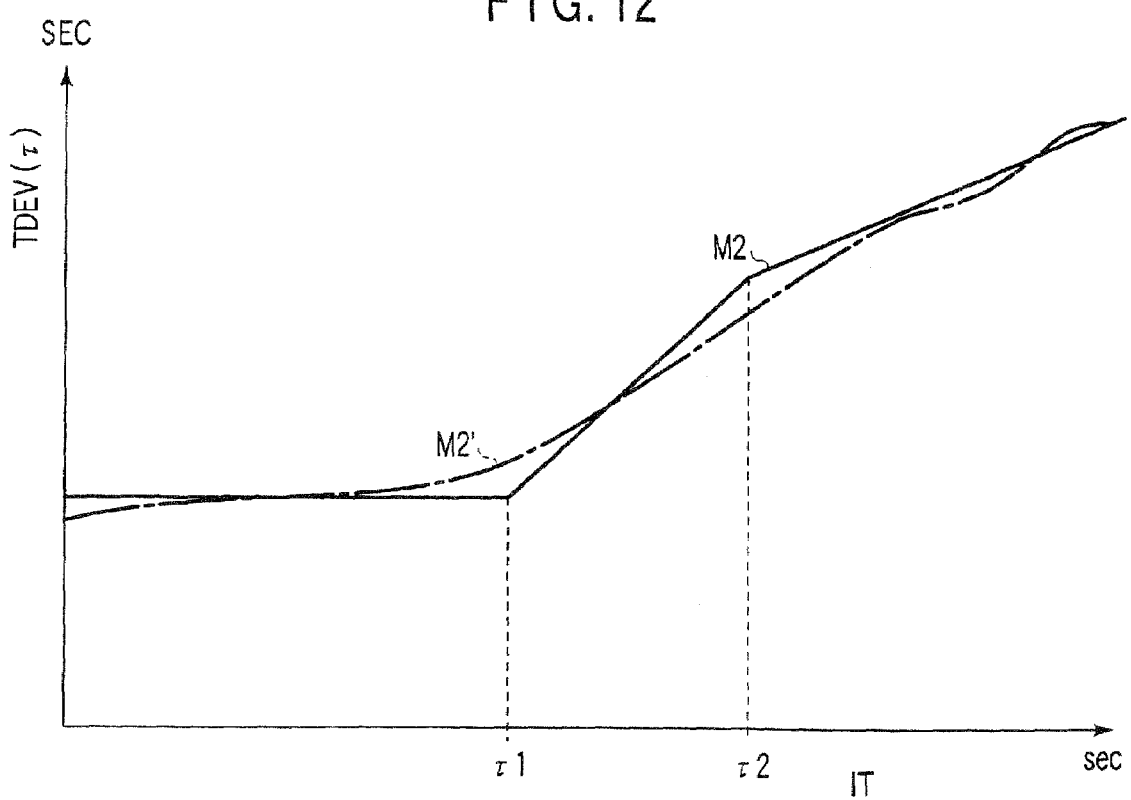
F I G. 13

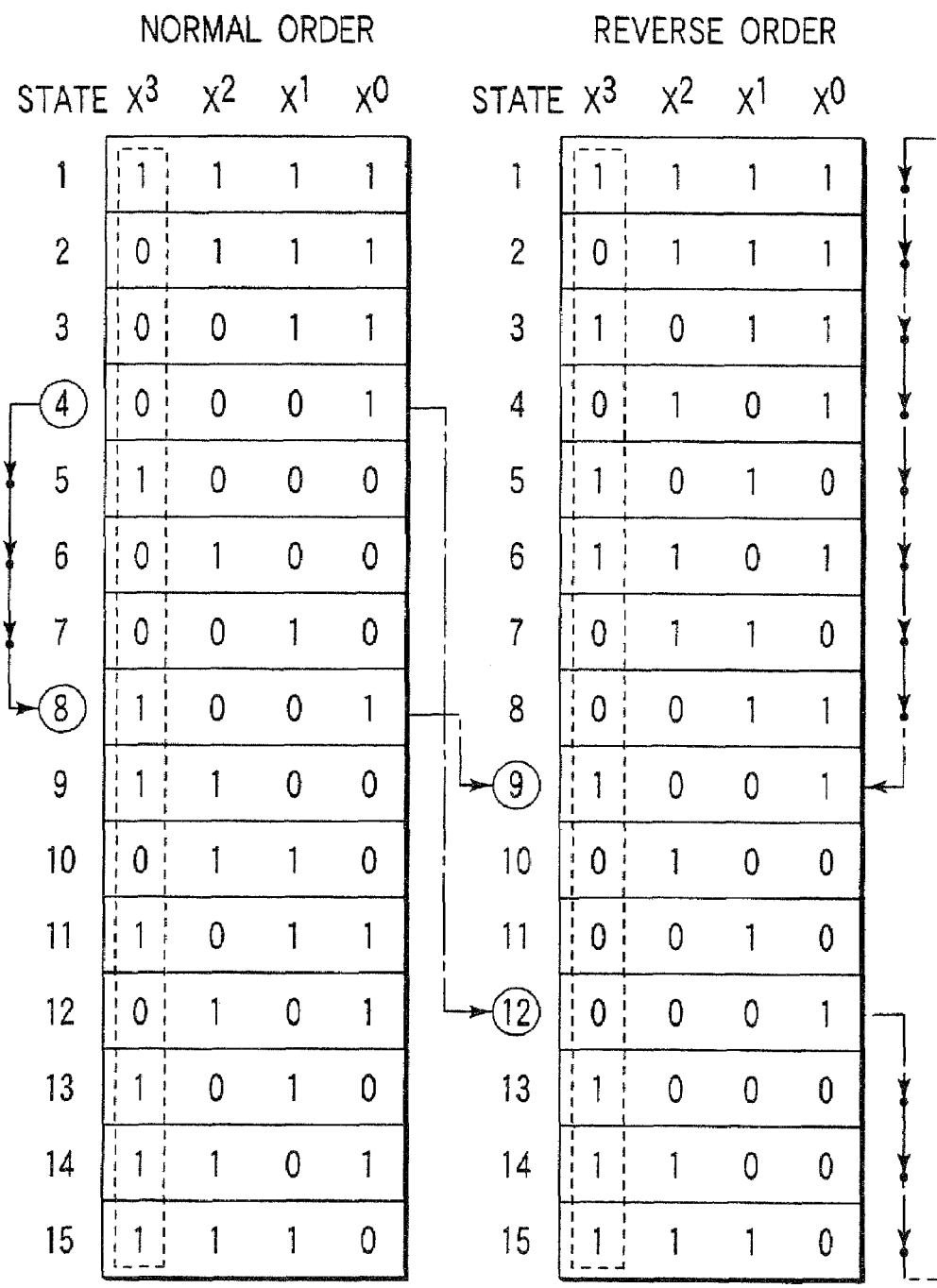
F I G. 18A    F I G. 18B

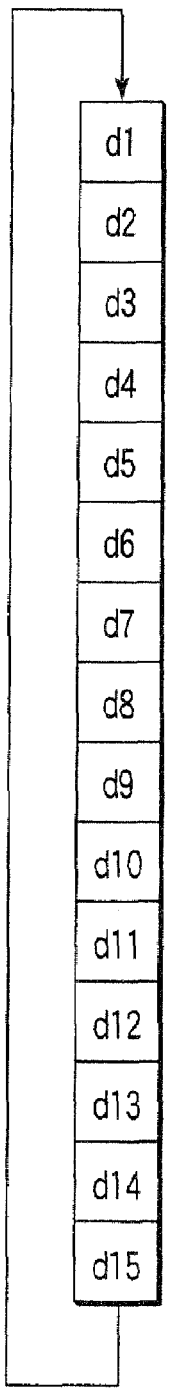
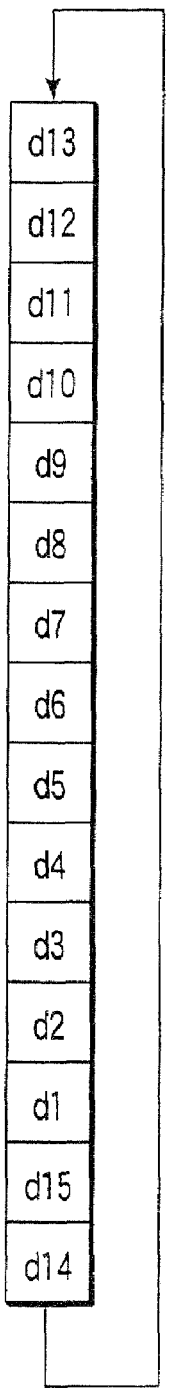
| STATE CORRESPONDENCE | |
|---|---|
| NORMAL ORDER | REVERSE ORDER |
| 1 | 1 |
| 2 | 2 |
| 3 | 8 |
| 4 | 12 |
| 5 | 13 |
| 6 | 10 |
| 7 | 11 |
| 8 | 9 |
| 9 | 14 |
| 10 | 7 |
| 11 | 3 |
| 12 | 4 |
| 13 | 5 |
| 14 | 6 |
| 15 | 15 |
F I G. 19A  F I G. 19B  F I G. 20

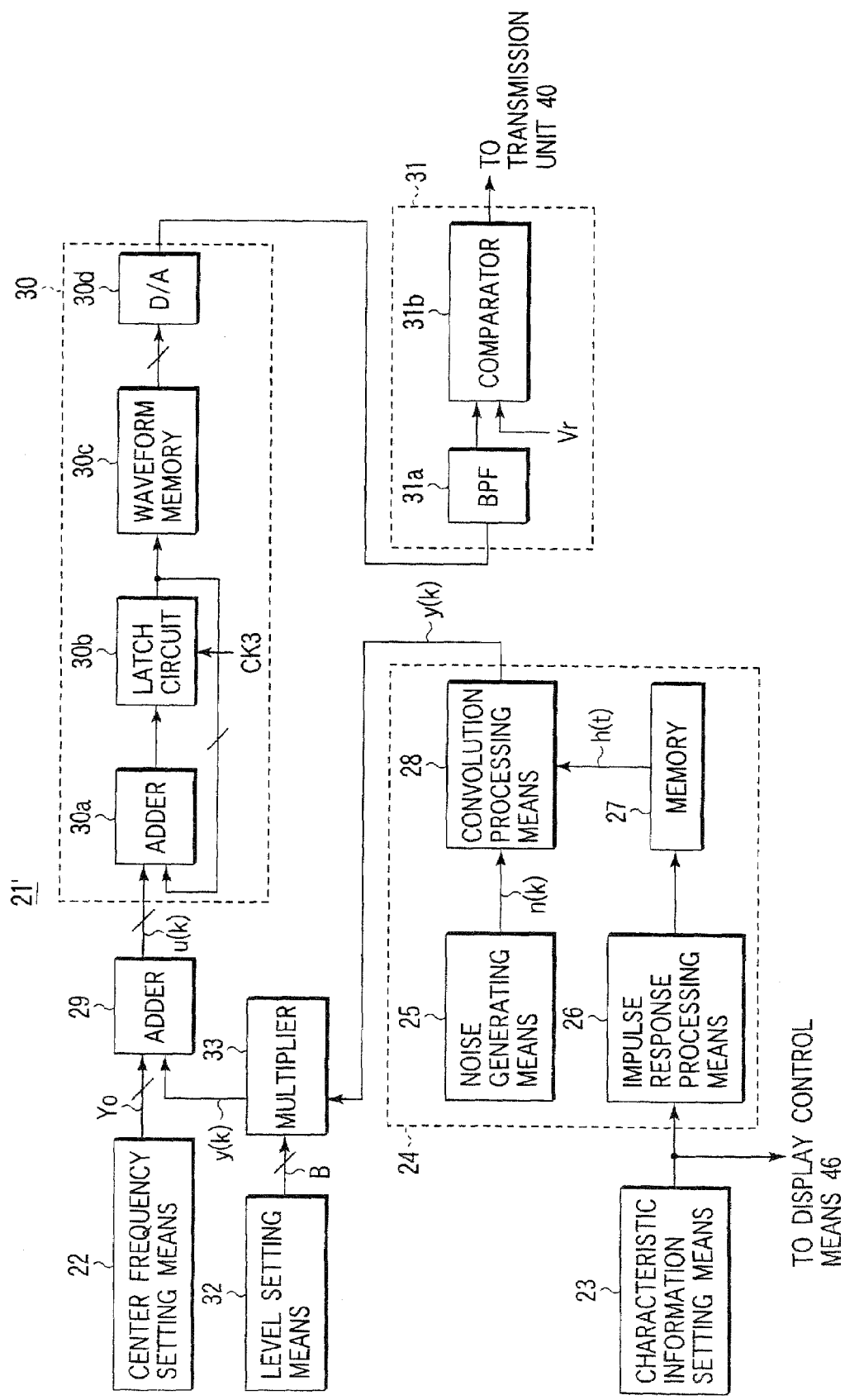
F I G. 22

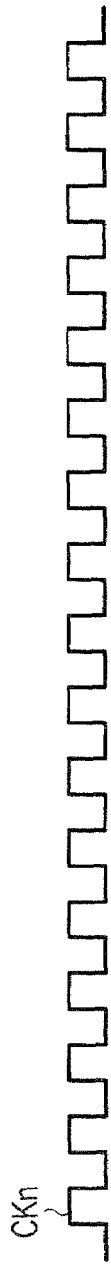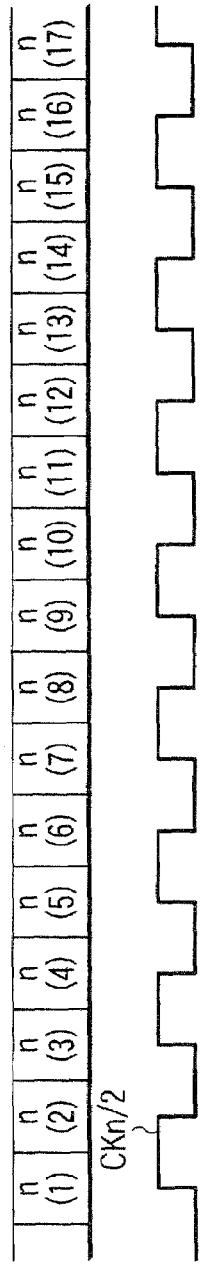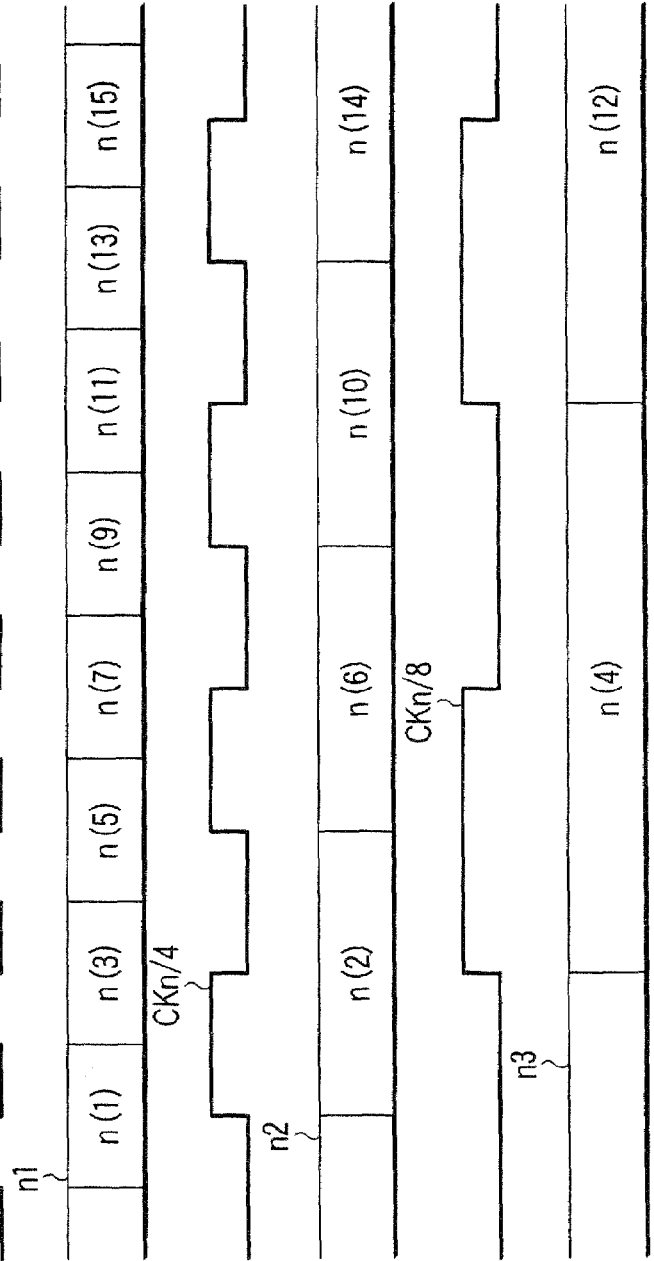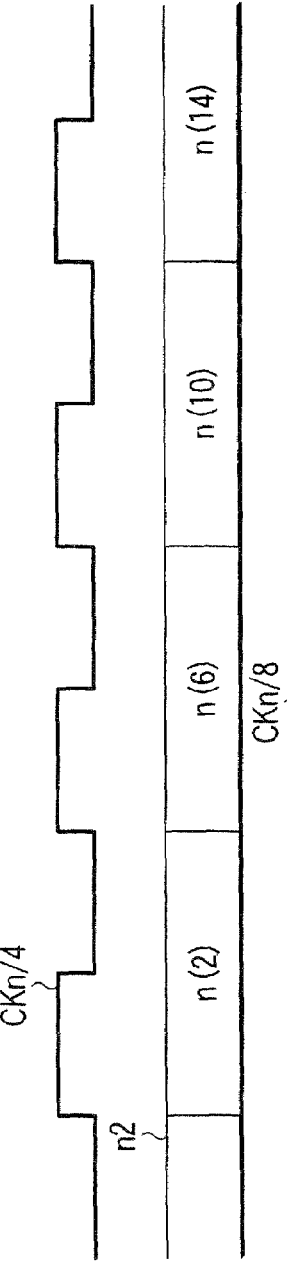
FIG. 25A  FIG. 25B  FIG. 25C  FIG. 25D  FIG. 25E  FIG. 25F  FIG. 25G  FIG. 25H

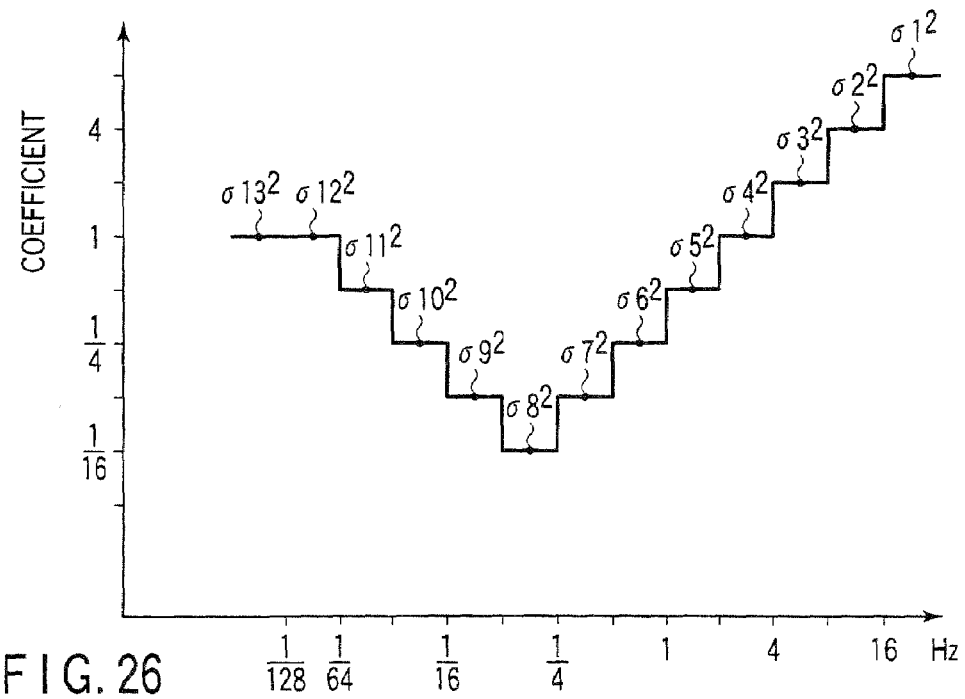
F I G. 26
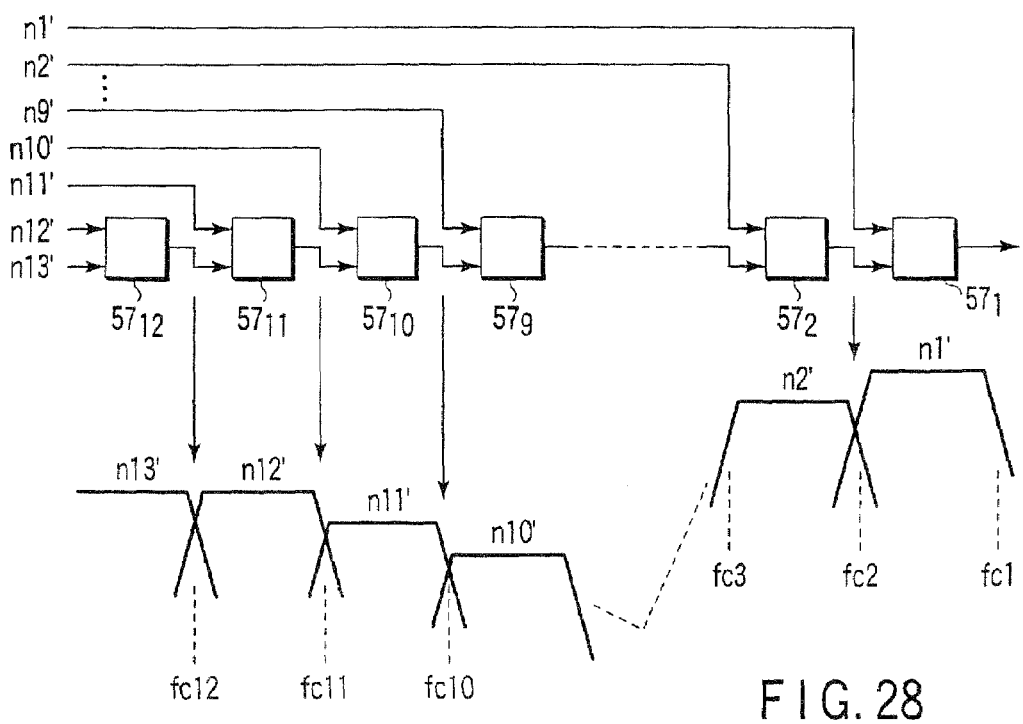
F I G. 28

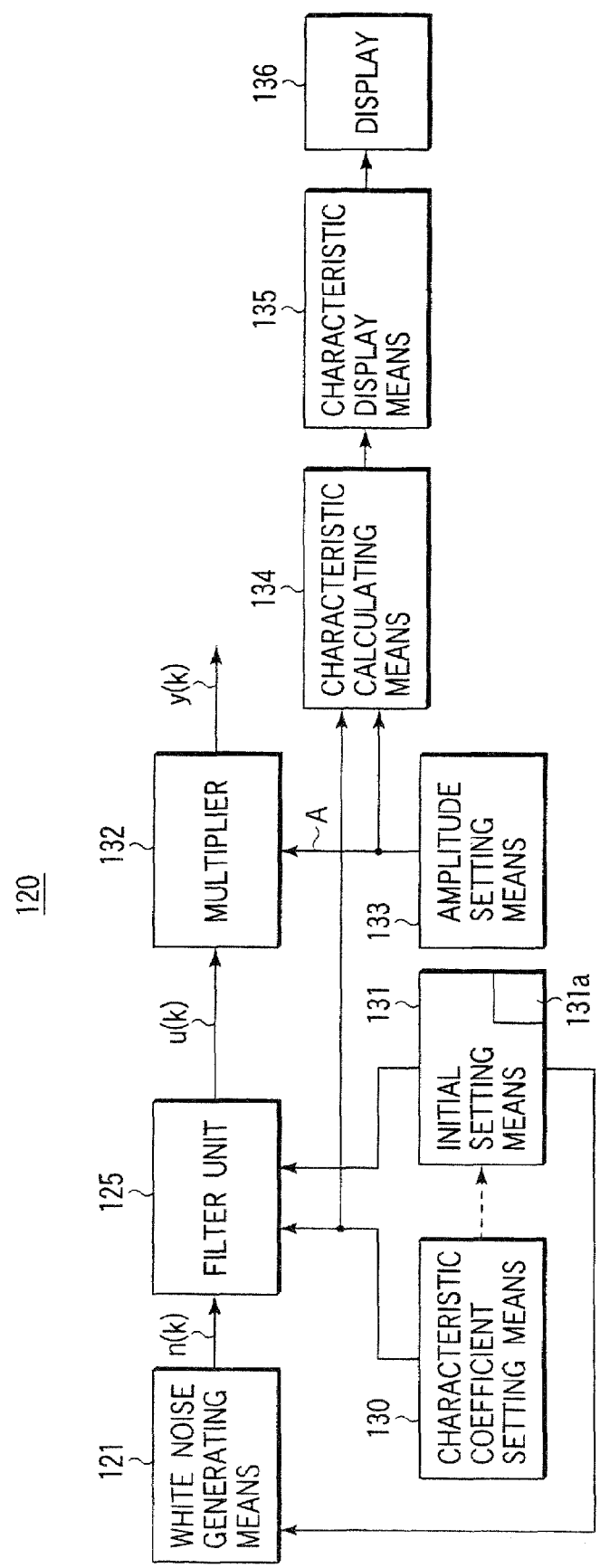
F I G. 31

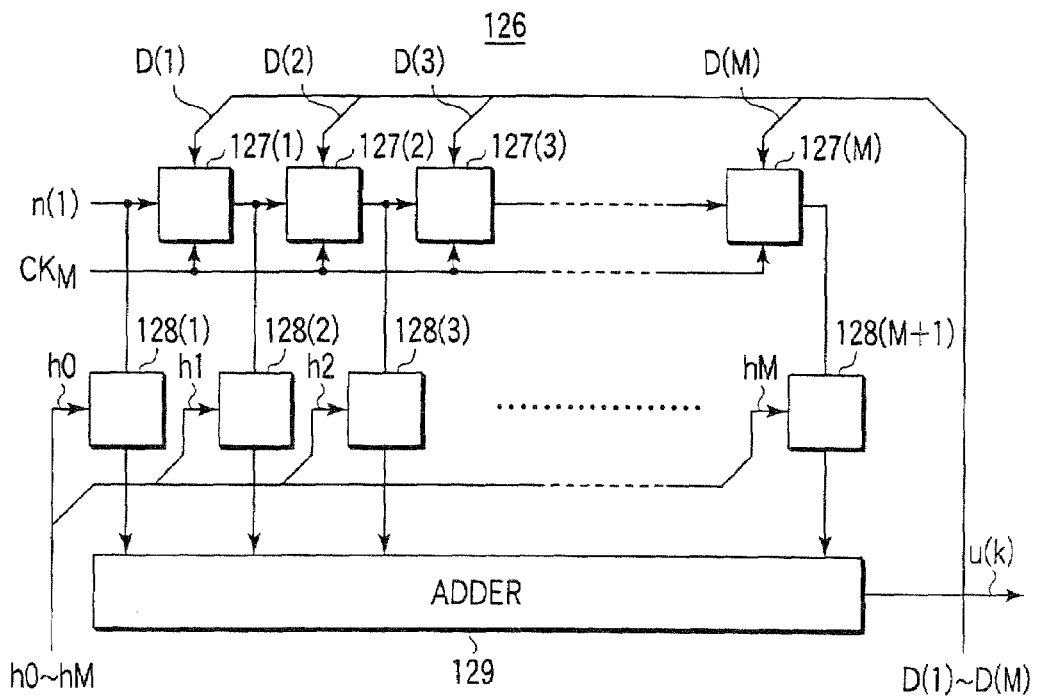
F I G. 33
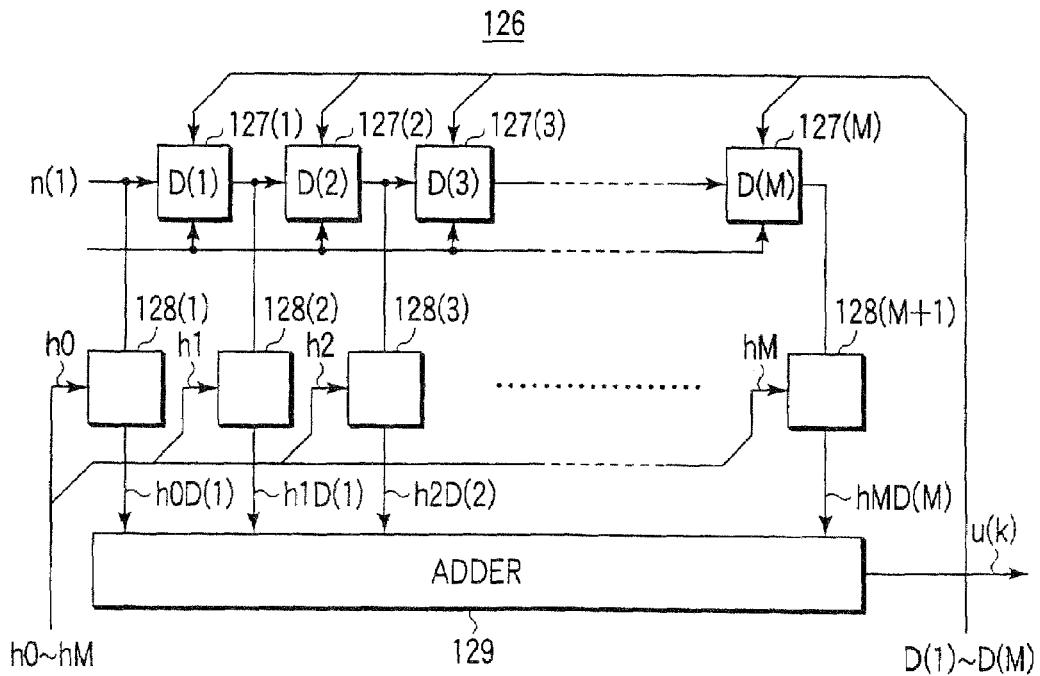
F I G. 34

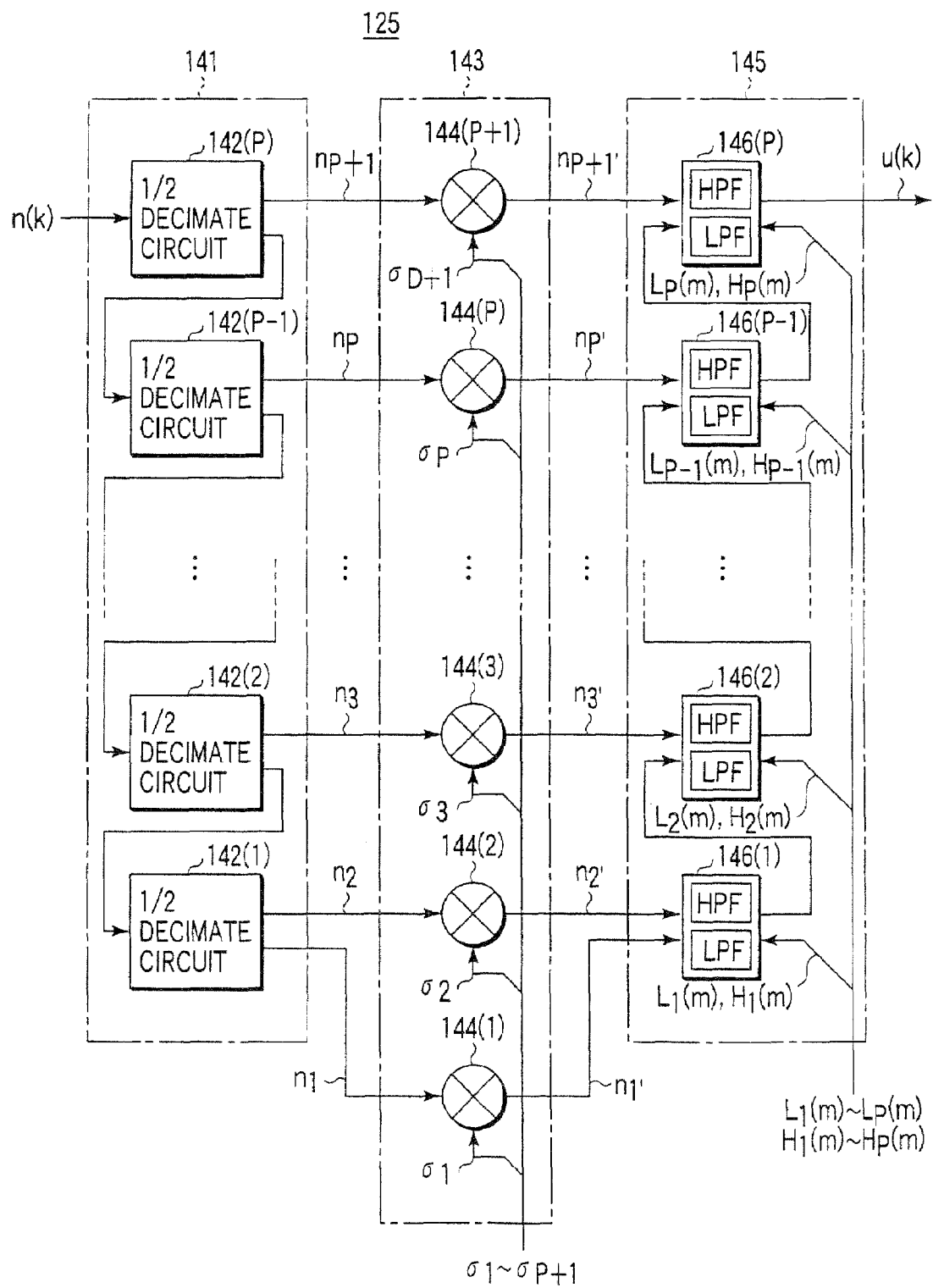
F I G. 35

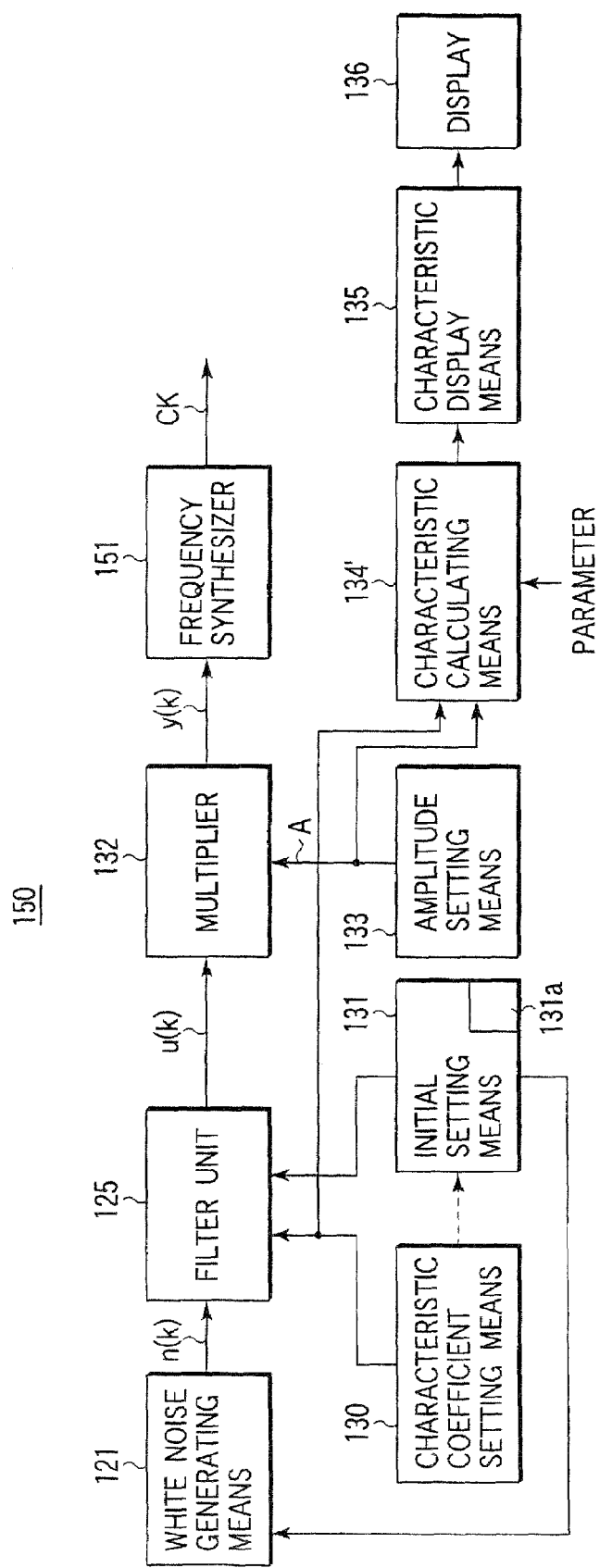
F I G. 39

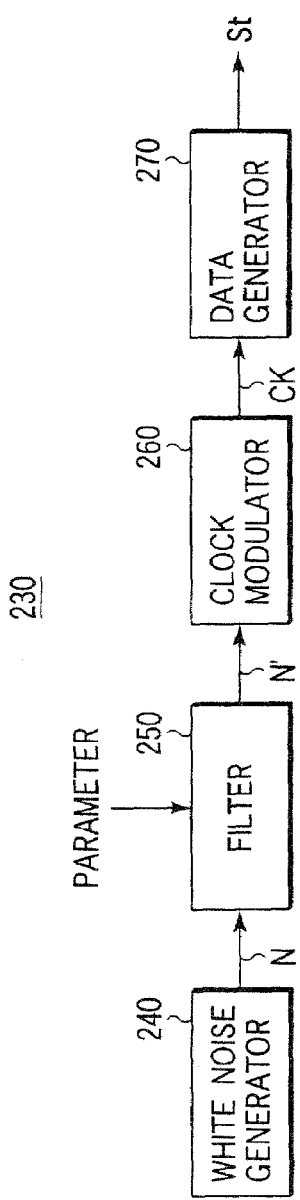
F I G. 41
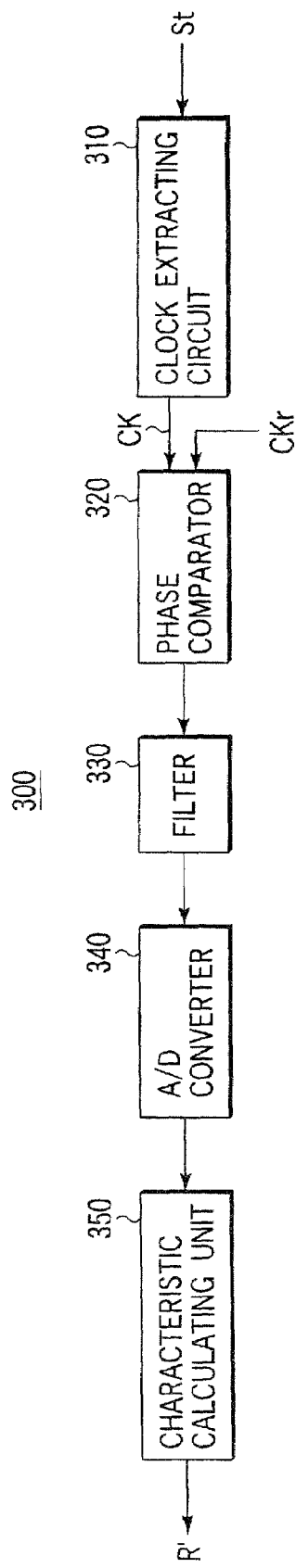
F I G. 42

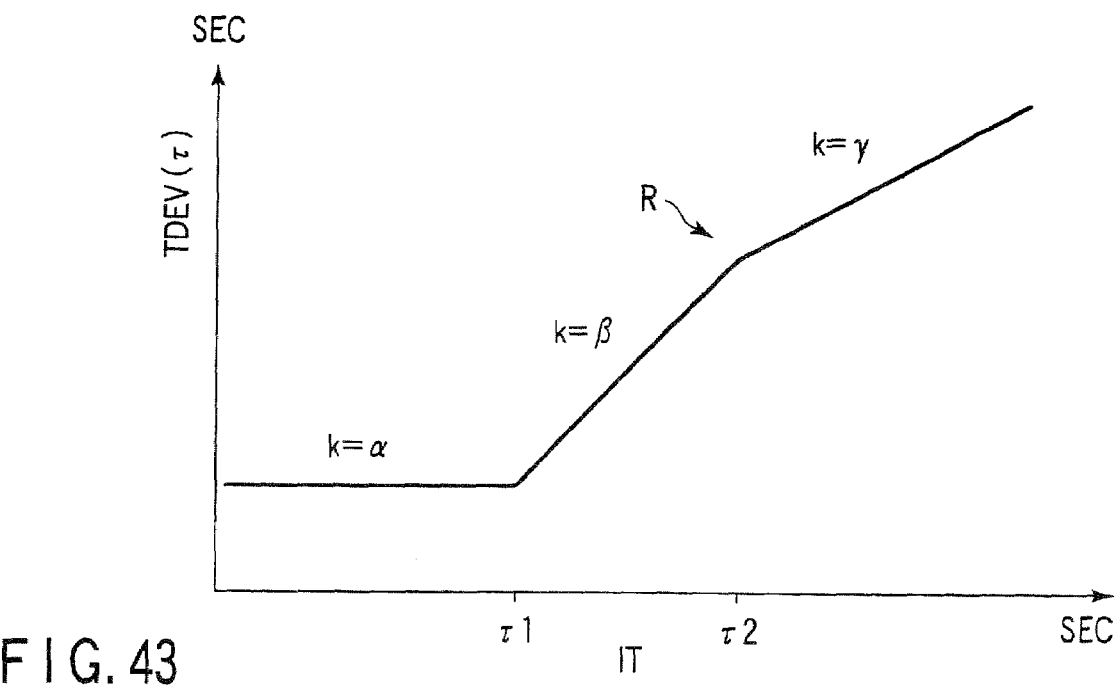
F I G. 43
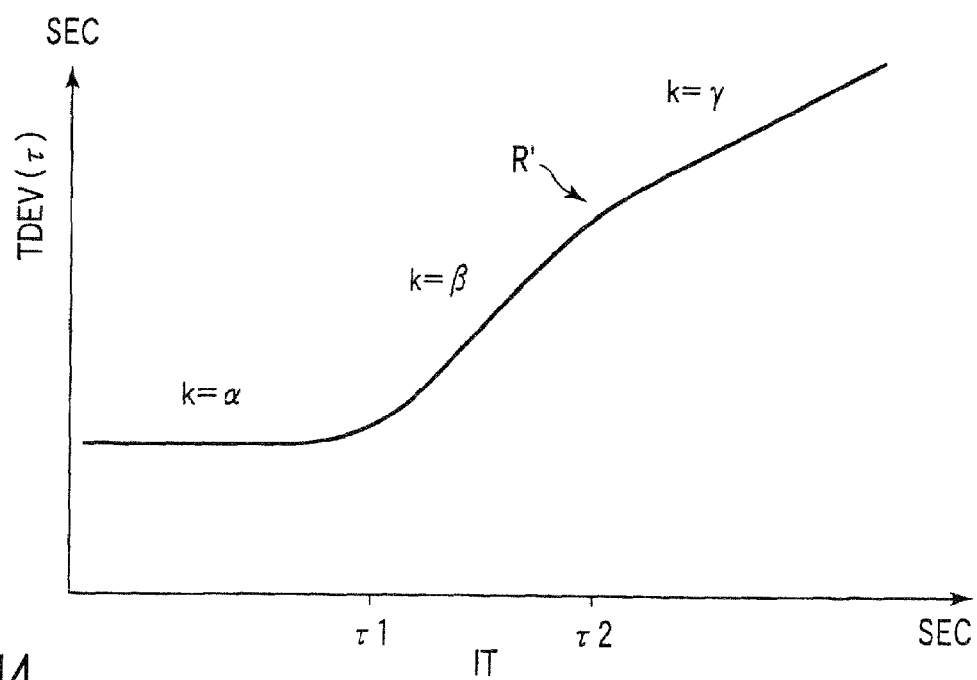
F I G. 44

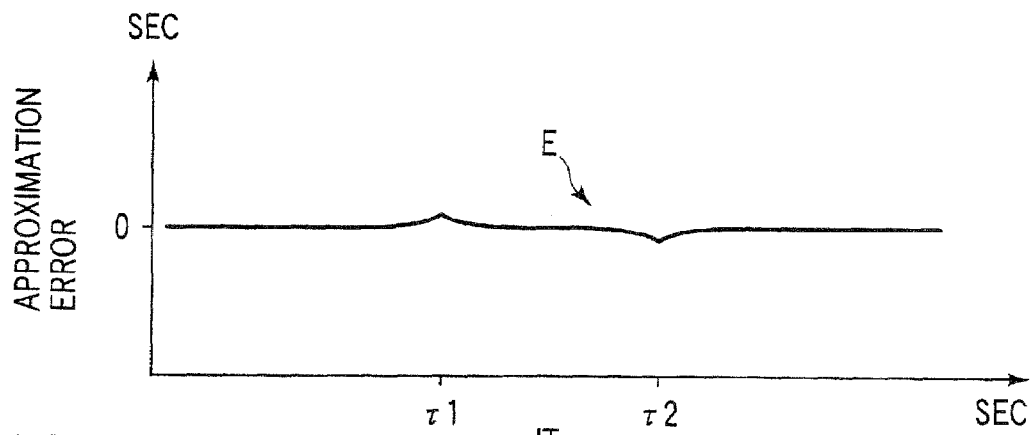
F I G. 45
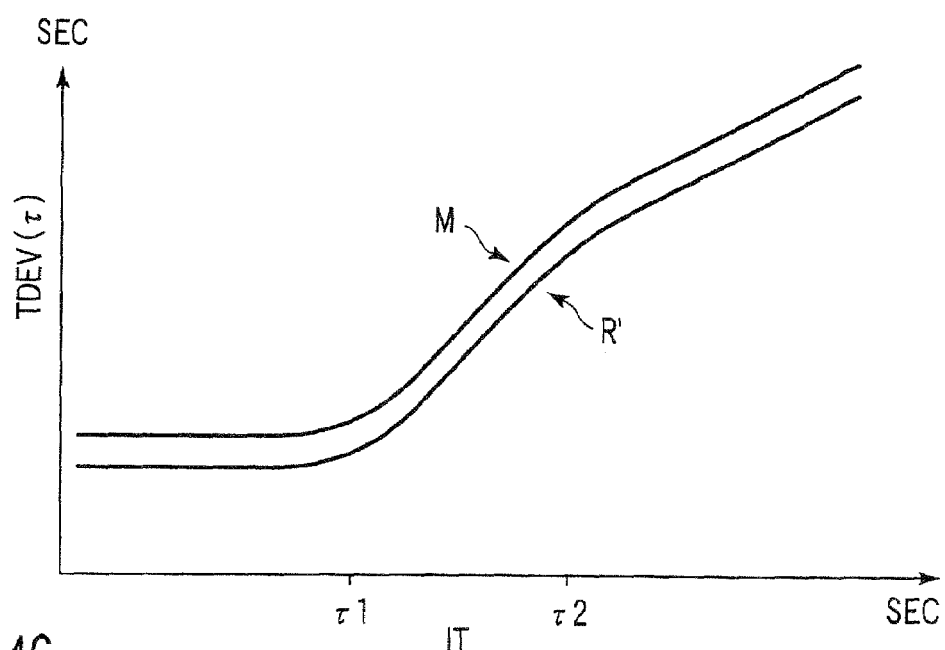
F I G. 46

WANDER GENERATOR, AND DIGITAL LINE TESTER AND PHASE NOISE TRANSFER CHARACTERISTIC ANALYZER USING THE SAME

The present application is a Divisional Application of U.S. application Ser. No. 09/890,441 filed Jul. 25, 2001 now U.S. Pat. No. 7,206,339, which is incorporated herein by reference. Ser. No. 09/890,441 is a U.S. National Phase Application under 35 USC 371 of International Application PCT/JP00/09139 (not published in English) filed Dec. 22, 2000.

TECHNICAL FIELD

The present invention relates to a wander generator, and a digital line tester and a phase noise transfer characteristic analyzer using the same, and more particularly, to a wander generator which generates a clock signal having wander, and a digital line tester and a phase noise transfer characteristic analyzer using the same.

Among them, the phase noise transfer characteristic analyzer is particularly related to a phase noise transfer characteristic analyzer for analyzing a transfer characteristic for a signal having phase noise associated with a device which transmits a clock signal or a digital signal, wherein the phase noise transfer characteristic analyzer employs a technique for properly evaluating a phase noise transfer characteristic of a device under analysis in a short measuring time.

BACKGROUND ART

As is well known, a digital signal transmitted over a digital line is affected by noise or the like on a transmission path to experience fluctuating phase.

In the fluctuations of the phase, components in the fluctuations at frequencies higher than 10 Hz are referred to as jitter, and components lower than 10 Hz as wander.

As such phase fluctuations become larger, the line cannot correctly transmit a digital signal thereon, resulting in larger code errors.

It is therefore necessary to measure jitter and wander for evaluating a digital line.

Among them, as an evaluation method associated with the wander, a time deviation (hereinafter designated as TDEV) is known.

The measurement of TDEV involves sequentially finding a phase difference TIE (Time Interval Error) between a clock signal component of a digital signal including wander and a reference clock signal as a changing amount with respect to its initial phase difference, and calculating the following equation based on this TIE data.

$$\text{TDEV}(\tau) = \{(1/6n^2)(1/m)\cdot\sum_{j=1}^{m} [\sum_{i=j}^{n+j-1}(x_{i+2n} - 2x_{i-n} + x_i)]^2\}^{1/2}$$

where $m = N - 3n + 1$; $x_i$ is TIE sample data; N is the total number of samples, $\tau$ is an integration time ($\tau = n\tau 0$), n is a sampling number ($n-1, 2, \ldots, N/3$), $\tau 0$ is a sampling period, a symbol $\sum_{j=1}^{m}$ is a sum of $j=1-m$; and a symbol $\sum_{i=j}^{n+j-1}$ is a sum of $i=j-n+j-1$.

$\text{TDEV}(\tau)$ is found based on all TIE data over a measuring time 12 times a maximum integration time.

For example, for finding TDEV(1000) for $\tau = 1000$ seconds when the sampling period $\tau 0$ is 1/80 seconds (12.5 milliseconds), the above equation is solved using measurement data over 12000 seconds (80 samples/second×1000 seconds× 12=960000 samples).

For evaluating a digital line using this TDEV, there is known a method which involves inputting a digital signal without phase fluctuations at one terminal of a line under testing and measuring the TDEV at the other terminal.

Also, there is another method which involves inputting a digital signal synchronized with a clock signal having wander to a line under testing, measuring an error rate of the digital signal at the other end, while changing the magnitude and frequency of the wander, and investigating the tolerance of the line against the magnitude and frequency of the wander.

For evaluating a line under testing using a digital signal including wander, as in the latter method, a wander generator is used for generating a clock signal having phase fluctuations at 10 Hz or lower.

FIG. 50 is a block diagram illustrating the configuration of a conventional wander generator 10.

In this wander generator 10, a modulation signal for modulating a phase lower than 10 Hz output from a modulation signal generator 11 and a reference voltage output from a reference voltage generator are added by an adder 13.

Then, in this wander generator 10, the output of the adder 13 is input to a VCO (voltage controlled oscillator) 14 to generate a clock signal CK which has a center frequency corresponding to the reference voltage and phase modulated by the modulation signal.

This wander generator 10 can vary the frequency and magnitude of the clock signal CK by varying the frequency and amplitude of the modulation signal output from the modulation signal generator 11.

In recent years, there has been proposed a method which evaluates a digital line using a digital signal that has wander which is referred to a TDEV mask (Mask) and satisfies a TDEV characteristic defined by ANSI (American National Standards Institute) or the like.

The TDEV mask has a characteristic M1 (Section 7.22 in ANSI T1.101-1994, Section D.2.2.1 in 105-03-1994, and the like) which is constant until a certain integration time $\tau 1$, and increases in proportion to $\tau^{1/2}$ in a range exceeding the integration time $\tau 1$, as illustrated in FIG. 51A.

Also, this TDEV mask has a characteristic M2 (Section 7.3.2 in ANSI T1. 101-1994, Section D.2.1 and Section D.2.2.2 in 105-03-1994) which is constant until a certain integration time $\tau 1$, increases in proportion to $\tau 1$ in a range of the integration time from $\tau 1$ to $\tau 2$, and increases in proportion to $\tau^{1/2}$ in a range exceeding the integration time $\tau 2$, as illustrated in FIG. 51B, and the like.

However, since the conventional wander generator 10 as described above can only phase modulate a single signal, it encounters difficulties in generating a clock signal which satisfies the TDEV characteristic that varies in each integration time range as described above.

It is therefore desired to realize in this type of field a wander generator which is capable of generating a clock signal having wander of desired characteristic that satisfies an arbitrary TDEV mask characteristic, and a digital line tester using this wander generator.

As described above, a transmission system for transmitting a clock and data cannot correctly restore data if a transmitted signal has larger phase noise (phase fluctuations).

For this reason, it is necessary to examine a transfer characteristic for a signal having phase noise for manufacturing or maintaining devices for use in this type of transmission system.

As mentioned above, in the fluctuations of the phase, components in the fluctuations at frequencies higher than 10 Hz are referred to as jitter, and components lower than 10 Hz as wander.

As such, jitter and wander are collectively referred herein to as phase noise.

Also, here, the phase noise is not a periodic function signal such as a single sinusoidal signal or the like which has a constant frequency and amplitude, but a noise signal which has a frequency characteristic over a wide band.

Generally, the characteristics of phase noise are represented by:

(a) TDEV (Time DEViation);
(b) TIErms (Root Mean Square Time Interval Error);
(c) MADEV (Modified Allan DEViation);
(d) ADEV (Allan DEViation); and the like.

In recent years, these characteristics are being standardized.

Therefore, for evaluating the phase noise transfer characteristic for a device, it is necessary to use a test signal having jitter and wander that conform to these standardized characteristics.

Specifically, it is necessary to input a test signal having jitter and wander of predetermined characteristics to a device under analysis, and examine how a phase noise characteristic resulting from a measurement of the phase noise characteristic of the output changes with respect to the standardized characteristics.

For analyzing such phase noise transfer characteristic, a phase noise transfer characteristic analyzer 100 as illustrated in FIG. 52 has been conventionally used.

This phase noise transfer characteristic analyzer 100 comprises characteristic specifying means 111 for specifying an arbitrary phase noise characteristic including the aforementioned standardized characteristic; parameter calculating means 112 for calculating parameters required to generate a test signal having the specified phase noise characteristic; test signal generating means 113 for generating a test signal having a phase noise characteristic corresponding to the calculated parameters and outputting the test signal from an output terminal 100a; phase noise characteristic measuring means 114 which receives through an input terminal 100a an output signal of a device 1 under analysis which has received the test signal output from the output terminal 100a for measuring its phase noise characteristic; and display means 115 for displaying the phase noise characteristic specified by the characteristic specifying means 111 and the phase noise characteristic measured by the phase noise characteristic measuring means 114 in such a manner that they can be compared with each other.

Next, description is made on an analysis made on a transfer characteristic for TDEV of wander using the phase noise transfer characteristic analyzer 100.

For example, as illustrated in FIG. 53, as a characteristic R of TDEV which has a slope which changes on boundaries located at integration times τ1 and τ2 is specified by the characteristic specifying means 111, the parameter setting means 12 calculates parameters corresponding to the characteristic R for setting in the test signal generating means 113.

Then, the test signal generating means 113 generates a test signal St with a phase noise characteristic determined by the parameters, and outputs the test signal St to the device 1 under analysis through the output terminal 100a.

An output signal Sr of the device 1 under analysis, which has received the test signal St, is input to the phase noise characteristic measuring means 114 through the input terminal 100b to measure a characteristic M of TDEV of the signal Sr.

Then, as illustrated in FIG. 54, the characteristic R specified by the characteristic specifying means 111 and the characteristic M measured by the phase noise characteristic measuring means 114 are displayed on the display means 115.

It is therefore possible to evaluate the wander transfer characteristic of the device 1 under analysis by comparing the two characteristics, displayed on the display means 115, with each other.

However, in this case, the phase noise characteristic of the test signal St input to the device 1 under analysis cannot actually be matched completely with the characteristic R specified by the characteristic specifying means 111.

Specifically, as illustrated in FIG. 53, the characteristic R generally used for evaluating phase noise is a theoretical characteristic, the slope of which is indicated by a folded line which discontinuously varies.

It is therefore extremely difficult to realize such a theoretical characteristic with an actual electronic circuit.

For this reason, the test signal St actually output from the test signal generating means 111 has a characteristic which has the slope changing portions of the characteristic R approximated by curves as R' in FIG. 53.

As such, for comparing the characteristics displayed on the display means 15, the operator himself must make an analysis in consideration of an error in the characteristic due to the approximation, so that a precise comparison is extremely difficult to achieve.

To solve this problem, the output terminal 100a has been previously connected directly to the input terminal 100b, as indicated by a broken line in FIG. 52, to measure the phase noise characteristic of the test signal St by the phase noise characteristic measuring means 114.

Then, it is contemplated that an approximation error has been found for the phase noise characteristic of the test signal St and a characteristic specified by the characteristic specifying means 112, such that a phase noise characteristic derived when the device 1 under analysis is measured is corrected by the approximation error.

However, such a method of finding the phase noise characteristic of the device 1 under analysis after finding the phase noise characteristic of the test signal requires a double measuring time, so that a waiting time until the result of a measurement is output becomes very long, particularly, for an analysis of a transfer characteristic for wander which requires a long measuring time.

DISCLOSURE OF INVENTION

It is an object of the present invention to provide a wander generator which is capable of readily and accurately generating a clock signal having wander of desired characteristic, and a digital line tester which uses this wander generator.

It is another object of the present invention to provide a phase noise transfer characteristic analyzer which is capable of correctly evaluating a specified characteristic in a short time, for example, using a wander generator which is capable of readily and accurately generating a clock signal having wander of desired characteristic.

To achieve the above objects, according to the present invention, there is provided:

(1) a wander generator comprising:
random number generating means (25, 121) for sequentially generating a random number signal comprised of a plurality of bits at a constant rate in accordance with a predetermined algorithm;
a filter unit (28, 125) for receiving a sequence of random number signals output from the random number generating means for performing filtering;

clock generating means (30, 31, 151) for generating a clock signal;

modulating means (30, 151) for modulating the frequency of the clock signal generated by the clock signal generator by a signal output from the filter unit; and setting means (23, 26, 130) for setting each amplitude value for a spectrum of a signal sequence output from the filter unit such that the characteristic of wander of the clock signal having the frequency modulated by the modulating means matches a desired characteristic.

Also, to achieve the above objects, according to the present invention, there is provided:

(2) the wander generator as set forth in (1) which is characterized in that:

the random signal generating means has a plurality of pseudo random signal generator, wherein the plurality of pseudo random signal generators combine pseudo random signals generated thereby respectively, and random number signals comprised of the plurality of bits is sequentially generated at a constant speed.

Also, to achieve the above object, according to the present invention, there is provided:

(3) the wander generator as set forth in (1), characterized in that:

the filter unit includes a plurality of storage elements for storing an input signal sequence while sequentially shifting it; and calculating means for performing a product sum calculation of stored values stored in the plurality of storage elements with a plurality of coefficients.

Also, to achieve the above objects, according to the present invention, there is provided:

(4) the wander generator as set forth in the aforementioned (3), characterized in that:

the filter unit is configured to store a random number signal sequence output from the random number generating means in the plurality of storage elements, perform the product sum calculation by means of the calculating means, and filter the random number signal sequence, wherein the setting means sets the plurality of coefficients in the calculating means as signals for setting respective amplitude values for spectra of the signal sequence output from the filter unit.

Also, to achieve the above objects, according to the present invention, there is provided:

(5) the wander generator as set forth in the aforementioned (3), characterized in that:

the filter unit comprises:

data distributing means (51, 141) for distributing the random number signal sequence generated by the random number signal generating means into a plurality of paths having different rates from each other;

weighting means (54, 143) for weighting a signal sequence for each of the paths distributed by the data distributing means with a previously set coefficient for each of the paths; and combining means (56, 145) for combining the signal sequences on the respective paths weighted by the weighting means by means of a plurality of sub-band combiners comprised of a plurality of storage elements and calculating means and for outputting the result of the combination as the result of filtering, wherein the setting means sets the plurality of weighting coefficients in the weighting means of the filter unit as signals for setting respective amplitude values for spectra of the signal sequence output from the filter unit.

Also, to achieve the above objects, according to the present invention, there is provided:

(6) the wander generator as set forth in the aforementioned (4) or (5), characterized by further comprising:

initial setting means (131) for initially setting values equivalent to stored values stored in the respective storage elements in a steady state in which the clock signal having the wander of the desired characteristic is being output to the respective storage elements included in the filter unit at least in an initial phase of operation of the apparatus through a path different from a signal input path in the steady state.

Also, to achieve the above objects, according to the present invention, there is provided:

(7) the wander generator as set forth in the aforementioned (1), characterized by further comprising:

characteristic calculating means (134') for calculating a characteristic of wander in a clock signal frequency-modulated by the modulating means based on information including a signal set in the filter unit from the setting unit; and characteristic display means (135) for displaying the characteristic calculated by the characteristic calculating means.

Also, to achieve the above objects, according to the present invention, there is provided:

(8) a digital line tester characterized by comprising:

a wander generator unit (21, 40) for generating a test signal having wander; and a wander measuring unit (41, 43) for evaluating a signal passing through a digital line under testing from the wander generator unit, wherein the wander generator unit includes the wander generator set forth in any of the aforementioned (1) through (7), and is configured to output a test signal synchronized with a clock signal output from the wander generator.

Also, to achieve the above object, according to the present invention, there is provided:

(9) a wander generator for generating a clock signal having wander which satisfies a desired time deviation characteristic, characterized by comprising:

center frequency information setting means (22) for setting data for determining a center frequency of the clock signal;

characteristic information setting means (23) for setting characteristic information of the desired time deviation characteristic;

a fluctuating signal sequence generator unit (24) for generating a fluctuating signal sequence having a power spectrum density distribution characteristic of frequency fluctuations corresponding to the desired time deviation characteristic based on characteristic information set by the characteristic information setting means;

an adder (29) for adding data set by the center frequency information setting means to the fluctuating signal sequence output from the fluctuating signal sequence generator unit;

a direct digital synthesizer (30) for outputting a frequency signal corresponding to an output of the adder; and a clock signal output circuit (31) for waveform shaping an output signal of the direct digital synthesizer to output a clock signal.

Also, to achieve the above object, according to the present invention, there is provided:

(10) the wander generator as set forth in (9) characterized in that the fluctuating signal sequence generator unit comprises:

noise generating means (25) for generating a white noise signal based on a pseudo random signal;

impulse response processing means (26) for calculating an impulse response of a transfer function for approximating a power spectrum of a white noise signal output from the noise generating means to a power spectrum density distribution characteristic of the frequency fluctuations based on the characteristic information set by the characteristic information setting means; and convolution processing means (28) for convoluting the result of the calculation by the impulse response processing means with the white noise signal output from the noise generating means to generate a fluctuating signal sequence having the power spectrum density distribution characteristic of the frequency fluctuations.

Also, to achieve the above object, according to the present invention, there is provided:

(11) the wander generator as set forth in (10) characterized in that the impulse response processing means corrects an impulse response with a correction function corresponding to an error between the power spectrum density distribution characteristic of the frequency fluctuations and the transfer function.

Also, to achieve the above object, according to the present invention, there is provided:

(12) the wander generator as set forth in (10) characterized in that the convolution processing means preferentially performs the product sum calculation for smaller absolute values of the result of the calculation for the impulse response.

Also, to achieve the above object, according to the present invention, there is provided:

(13) the wander generator as set forth in (10) characterized in that:

the impulse response processing means is configured to perform the calculation for the impulse response each time a white noise signal is output from the noise generating means; and the convolution processing means performs the convolution processing using the result of the calculation made each time by the impulse response processing means.

Also, to achieve the above object, according to the present invention, there is provided:

(14) the wander generator as set forth in (9) characterized in that the fluctuating signal sequence generator unit comprises:

noise generating means (25) for generating a white noise signal based on a pseudo random signal;

data distributing means (51) for distributing noise signals output from the noise generating means into signal paths respectively in accordance with a plurality of bands into which a frequency range of a power spectrum density distribution characteristic of the frequency fluctuations is divided to output at rates corresponding to the respective bands;

weighting means (54) for applying weights in accordance with the magnitude of spectrum of each of the bands into which the frequency band of the power spectrum density distribution characteristic is divided for the noise signals at the respective rates distributed by the data distributing means; and combining means (56) for combining the noise signals at the respective rates weighted by the weighting means to generate a fluctuating signal sequence having the power spectrum density distribution characteristic of the frequency fluctuations.

Also, to achieve the above object, according to the present invention, there is provided:

(15) the wander generator as set forth in (10) or (14) characterized in that the noise generating means:

has a plurality (m) of sets of pseudo random signal generating means for generating pseudo random codes of M sequence at initial phases different from one another; and is configured to collect outputs at predetermined stages of the respective pseudo random signal generating means to output an m-bit parallel white noise signal.

Also, to achieve the above object, according to the present invention, there is provided:

(16) a digital line tester comprising:

a wander generator (21) for generating a clock signal having wander which satisfies a defined time deviation characteristic;

a transmission unit (40) for sending a digital signal synchronized with the clock signal output from the wander generator to a digital line under testing;

a reception unit (41) for receiving the digital signal returned from the digital line under testing and restoring a clock signal of the received digital signal;

an error measuring unit (42) for measuring errors in the digital signal received by the reception unit;

a time deviation measuring unit (43) for measuring a time deviation characteristic of the clock signal, restored by the reception unit;

a display device (47); and display control means (46) for displaying the result of measurements of the error measuring unit and the time deviation characteristic measured by the time deviation measuring unit on the display unit such that it can be compared with the defined time deviation characteristic.

Also, to achieve the above objects, according to the present invention, there is provided:

(17) the digital line tester as set forth in (16) characterized in that the wander generator is the wander generator set forth in the foregoing (9) through (15).

Also, to achieve the above object, according to the present invention, there is provided:

(18) a wander generator according to the aforementioned invention comprising:

white noise generating means (121) for generating a digital white noise signal;

a filter unit (125) having a digital signal for storing a digital signal in a plurality of internal storage elements while sequentially shifting thereinto and performing product sum calculations for the contents stored in the plurality of storage element for converting a noise signal output from the white noise generating means to a noise signal of a frequency characteristic corresponding to a previously set characteristic coefficient to output the noise signal;

characteristic coefficient setting means (130) for setting arbitrary characteristic coefficient in the filter unit;

a multiplier (132) for multiplying a noise signal output from the filter unit by an amplitude coefficient;

amplitude setting means (133) for setting an arbitrary coefficient to the multiplier;

a frequency synthesizer (51) for outputting a clock signal which is phase modulated by a noise signal output from the multiplier; and initial setting means (131) for initially setting a noise signal sequence equivalent to the contents stored in the respective storage elements of the digital filter in a state in which a noise signal of a frequency characteristic corresponding to the characteristic coefficient is being output from the filter unit in the respective storage elements of the digital filter at least in an initial phase of operation of the apparatus.

Also, to achieve the above object, according to the present invention, there is provided:

(19) a wander generator comprising:

white noise generating means (121) for generating a digital white noise signal;

a filter unit (125) having a digital signal for storing a digital signal in a plurality of internal storage elements while sequentially shifting therein and performing product sum calculations for the contents stored in the plurality of storage element for converting a noise signal output from the white noise generating means to a noise signal of a frequency characteristic corresponding to a previously set characteristic coefficient to output the noise signal;

characteristic coefficient setting means (130) for setting arbitrary characteristic coefficient in the filter unit;

a multiplier (132) for multiplying a noise signal output from the filter unit by an amplitude coefficient;

amplitude setting means (133) for setting an arbitrary coefficient to the multiplier;

a frequency synthesizer (151) for outputting a clock signal which is phase modulated by a noise signal output from the multiplier;

characteristic calculating means (134, 134') for calculating a characteristic of a noise signal output from the multiplier or a clock signal output from the frequency synthesizer based on a characteristic coefficient set by the characteristic coefficient setting means and an amplitude coefficient set by the amplitude setting means; and characteristic display means (135) for displaying the characteristic calculated by the characteristic calculating means.

Also, to achieve the above object, according to the present invention, there is provided:

(20) a phase noise transfer characteristic analyzer characterized by comprising:

characteristic specifying means for specifying an arbitrary phase noise characteristic;

parameter calculating means for calculating a parameter required to generate a test signal of a phase noise characteristic specified by the characteristic specifying means;

test signal generating means for generating a test signal having the phase noise characteristic based on a parameter calculated by the parameter calculating means;

first phase noise characteristic measuring means for measuring a phase noise characteristic of the test signal generated by the test signal generating means;

an output terminal for outputting the test signal generated by the test signal generating means to an external device under analysis;

an input terminal for inputting a signal output from the device under analysis which has received the test signal;

second phase noise characteristic measuring means for measuring a phase noise characteristic of a signal input from the input terminal in parallel with the measurement of the phase noise characteristic for the test signal by the first phase noise characteristic measuring means;

approximation error calculating means for calculating a difference between the phase noise characteristic specified by the characteristic specifying means and the phase noise characteristic measured by the first phase noise characteristic measuring means as an approximation error; and virtual characteristic calculating means for calculating a virtual phase noise characteristic of a signal output when assuming that the device under analysis has received a test signal of the phase noise characteristic specified by the characteristic specifying means, thereby making it possible to know the difference between the phase noise characteristic specified by the characteristic specifying means and the virtual phase noise characteristic calculated by the virtual characteristic calculating means.

Also, to achieve the above object, according to the present invention, there is provided:

(21) a phase noise transfer characteristic analyzer characterized by comprising:

characteristic specifying means for specifying an arbitrary phase noise characteristic;

parameter calculating means for calculating a parameter required to generate a test signal of a phase noise characteristic specified by the characteristic specifying means;

test signal generating means for generating a test signal having the phase noise characteristic based on a parameter calculated by the parameter calculating means;

phase noise characteristic calculating means for calculating a phase noise characteristic of the test signal generated by the test signal generating means;

an output terminal for outputting the test signal generated by the test signal generating means to an external device under analysis;

an input terminal for inputting a signal output from the device under analysis which has received the test signal;

phase noise characteristic measuring means for measuring a phase noise characteristic of a signal input from the input terminal;

approximation error calculating means for calculating a difference between the phase noise characteristic specified by the characteristic specifying means and the phase noise characteristic measured by the phase noise characteristic measuring means as an approximation error; and virtual characteristic calculating means for correcting the phase noise characteristic measured by the second phase noise characteristic measuring means with the approximation error calculated by the approximation error calculating means to calculate a virtual phase noise characteristic of a signal output when assuming that the device under analysis has received a test signal of the phase noise characteristic specified by the characteristic specifying means, thereby making it possible to know the difference between the phase noise characteristic specified by the characteristic specifying means and the virtual phase noise characteristic calculated by the virtual characteristic calculating means.

BRIEF DESCRIPTION OF DRAWINGS

FIG. 5 is a block diagram illustrating the configuration of a main portion in FIG. 1;

FIG. 6 is a diagram illustrating the circuit configuration of a main portion in FIG. 1;

FIG. 7 is a diagram illustrating the circuit configuration of a main portion in FIG. 1;

FIGS. 10A, 10B, 10C are diagrams for explaining the operation of a main portion in FIG. 1;

FIG. 12 is a diagram illustrating a difference between a power spectrum density distribution and a transfer function for explaining the operation of the main portion in FIG. 1;

FIG. 13 is a diagram illustrating a difference between a defined TDEV characteristic and an actual TDEV characteristic for explaining the operation of the main portion in FIG. 1;

FIGS. 18A, 18B are diagrams illustrating state transitions of the reversible pseudo random generator circuit in FIG. 17;

FIGS. 19A, 19B are diagrams illustrating a change in an output at a predetermined bit location in the reversible pseudo random generator circuit in FIG. 17;

FIG. 20 is a state correspondence diagram for normal and reverse orders of the reversible pseudo random generator circuit in FIG. 17;

FIG. 22 is a block diagram illustrating an example of the configuration of a modification to the wander generator according to the present invention;

FIGS. 25A through 25H are timing diagrams for explaining the operation of the main portion in FIG. 23;

FIG. 26 is a diagram for explaining the operation of the main portion in FIG. 23;

FIG. 28 is a diagram for explaining the operation of the main portion in FIG. 23;

FIG. 31 is a block diagram illustrating the configuration of a noise generator included in the wander generator of another embodiment according to the present invention;

FIG. 33 is a block diagram illustrating the configuration of a main portion in FIG. 31;

FIG. 34 is a block diagram for explaining the operation of FIG. 31;

FIG. 35 is a block diagram illustrating the configuration of an example of a modification to the main portion in FIG. 31;

FIG. 39 is a block diagram generally illustrating the configuration of a wander generator according to the present invention;

FIG. 41 is a block diagram illustrating the configuration of a main portion in FIG. 40;

FIG. 42 is a block diagram illustrating the configuration of a main portion in FIG. 40;

FIG. 43 is a characteristic diagram illustrating an example of a specified characteristic for explaining the operation of the main portion in FIG. 40;

FIG. 44 is a characteristic diagram of a test signal for explaining the operation of the main portion in FIG. 40;

FIG. 45 is a diagram showing an approximation error for explaining the operation of the main portion in FIG. 40;

FIG. 46 is a characteristic diagram of an output signal of a device under analysis for explaining the operation of the main portion in FIG. 40;

BEST MODE FOR CARRYING OUT OF THE INVENTION

Embodiments of the present invention will hereinafter be described with reference to the drawings.

Figure 1:
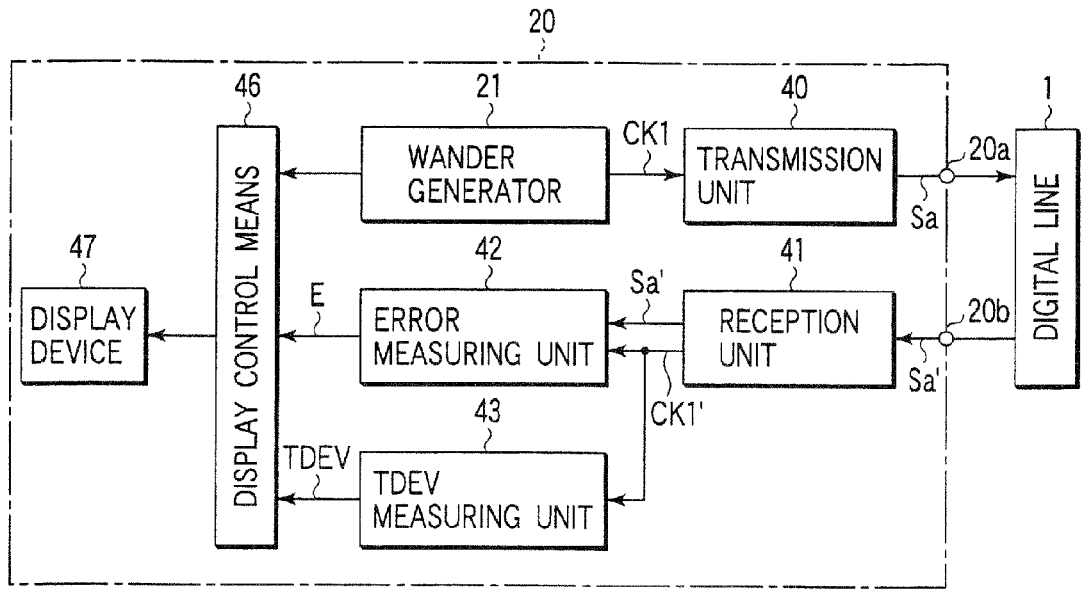
FIG. 1 is a block diagram generally illustrating the configuration of one embodiment of a wander generator according to the present invention, and a digital line tester using the same.

FIG. 1 generally illustrates an embodiment of a wander generator 21 according to the present invention, and a digital line tester 20 which uses the same.

The digital line tester 20 according to this embodiment has a wander generator 21 which generates a clock signal CK1 having wander that satisfies an arbitrary TDEV mask characteristic.

To begin with, the general configuration of the digital line tester 20 will be explained, while details on the wander generator 21 will be described later.

First, the clock signal CK1 output from the wander generator 21 is input to a transmission unit 40.

This transmission unit 40 sends a digital signal (for example, a pseudo random signal) Sa of a predetermined pattern synchronized with the clock signal CK1 output from the wander generator 21 through an output terminal 20a to a digital line 1 under testing which has been previously set in a return mode.

It should be noted that the transmission unit 40 may multiplex a digital signal other than the digital signal synchronized with the clock signal CK1 for delivery to the digital line 1.

A reception unit 41 receives a digital signal Sa' returned from the digital line 1 through an input terminal 20b, and reproduces a clock signal CK1' from the received digital signal Sa'.

An error measuring unit 42 measures an error in the digital signal Sa' received by the reception unit 41 in bit units.

Also, a TDEV measuring unit 43 measures a time deviation of the clock signal CK1' restored by the reception unit 41.

Figure 2:
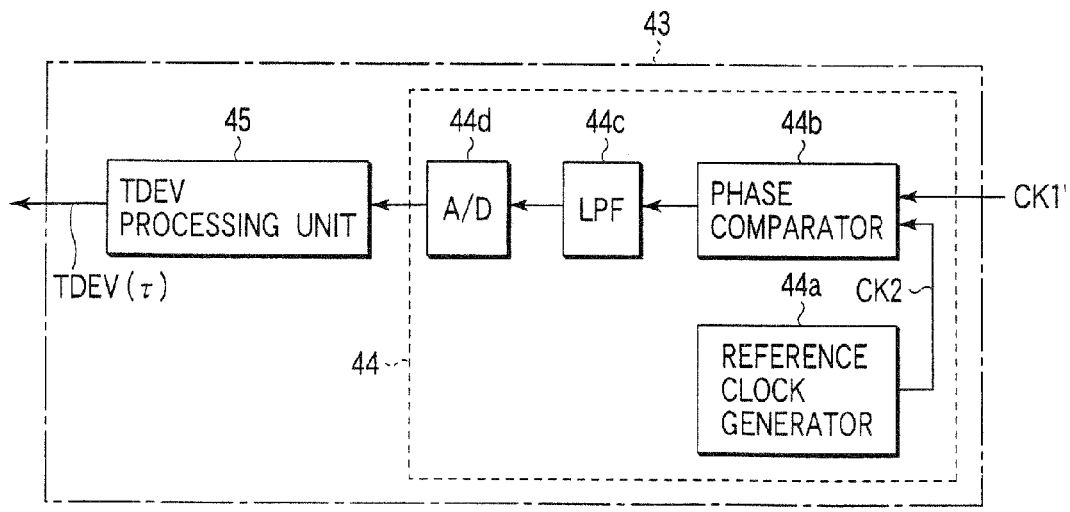
FIG. 2 is a block diagram illustrating the configuration of a main portion in FIG. 1.

As illustrated in FIG. 2, the TDEV measuring unit 43 comprises a TIE detector unit 44 and a TDEV processing unit 45.

Here, the TIE detector unit 44 detects a difference in phase between the received clock signal CK1' and a reference clock signal CK2 output from a reference clock generator 44a using a phase comparator 44b.

Then, components at 10 Hz or lower are extracted by a low pass filter (LPF) 44c from the output of the phase comparison 44b.

This wander component signal is sampled by an A/D converter 44d at a predetermined sampling period (for example, 12.5 mS) for conversion to a digital value which is output to the TDEV processing unit 45 as TIE data.

The TDEV processing unit 45 performs the aforementioned TDEV processing on the TIE data output from the TIE detector unit 44.

Turning back to FIG. 1, display control means 46 displays the result E of a measurement by the error measuring unit 42 on a display device 47, and also displays the result of a measurement by the TDEV measuring unit 43 on the display device 47 in order that it can be compared with the above defined TDEV characteristic of the wander generator 21.

With the configuration as described, the digital line tester 20 according to this embodiment can readily and efficiently evaluate the wander of the digital line 1 under testing.

This digital line tester 20 can also measure the TDEV characteristic of the clock signal CK1 generated by the wander generator 21 if its output terminal 20a is directly connected to the input terminal 20b.

Thus, the display control means 47 can also display this result of the measurement on the display device 47 in order that it can be compared with a defined TDEV mask.

It should be noted that in this digital line tester 20, the digital signal synchronized with the clock signal, including wander, output from the wander generator 21 is output to the digital line 1 under testing through the transmission unit 40.

Then, a clock signal component in the digital signal through the digital line 1 under testing is restored via the reception unit 41.

Also, a time deviation characteristic of the wander in the clock signal is found by the TDEV measuring unit 44.

Therefore, the wander generator 21 and the transmission unit 40 in the digital line tester 20 correspond to the wander generator unit according to the aforementioned present invention (8).

The reception unit 41 and the TDEV measuring unit 44 in turn correspond to a wander measuring unit according to the aforementioned present invention (8).

Before explaining the configuration of the wander generator 21, an outline thereof will be first described.

Based on a power spectrum density distribution characteristic of frequency fluctuations corresponding to the TDEV characteristic, this wander generator generates a clock signal having wander of this TDEV characteristic.

In other words, it is known that the following relationship is established between the characteristic $TDEV(\tau)$(ns) of the wander and a power spectrum density distribution $Sx(f)$(ns$^2$/Hz) of the wander:

$$Sx(f)=(0.75/f)[TDEV(0.3/f)]^2$$

Figure 51A:
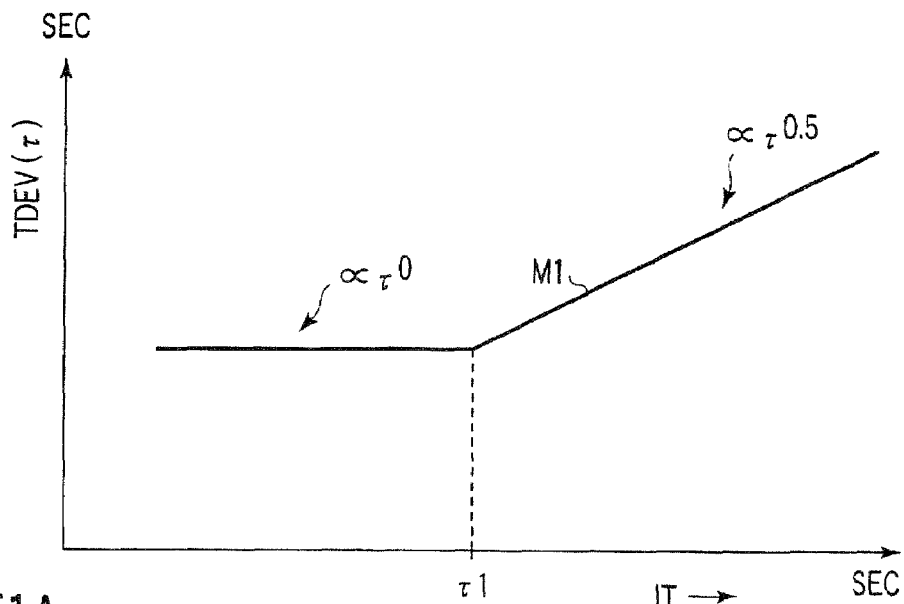
FIGS. 51A, 51B are diagrams illustrating examples of defined TDEV characteristics for explaining the operation of the conventional wander generator.
Figure 51B:
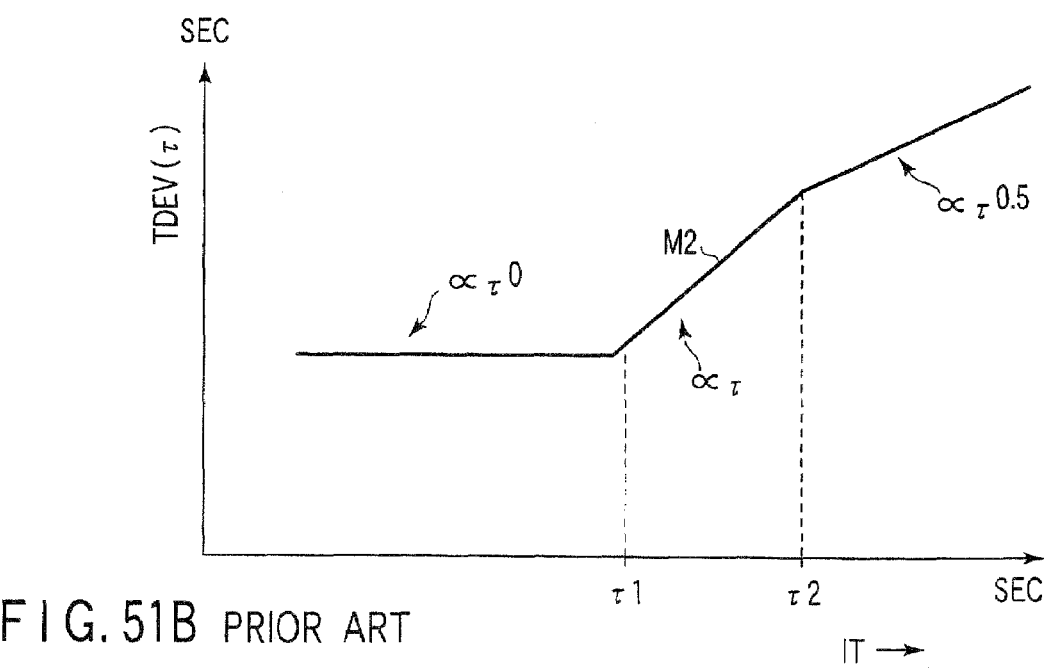
Figure 53:
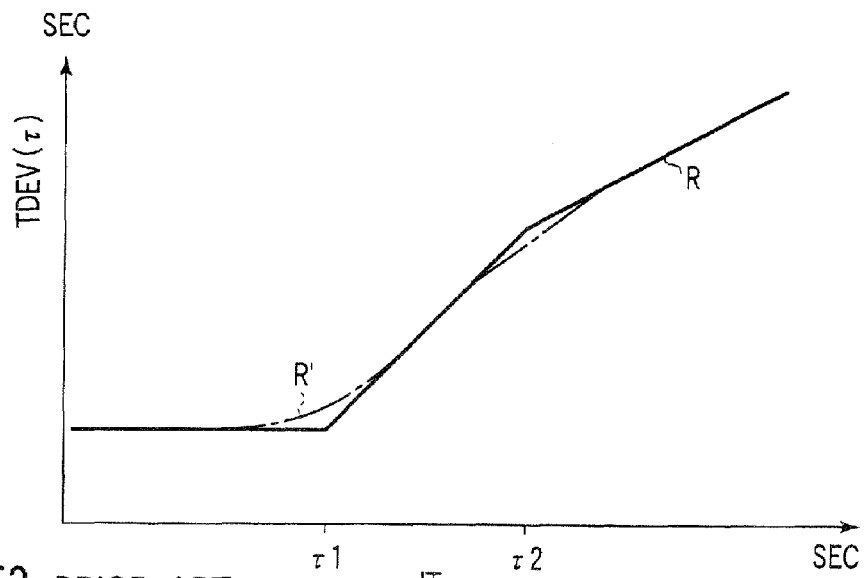
FIG. 53 is a diagram illustrating a specified characteristic and a characteristic of an actually output signal for explaining the operation of the conventional phase noise transfer characteristic analyzer.
Figure 54:
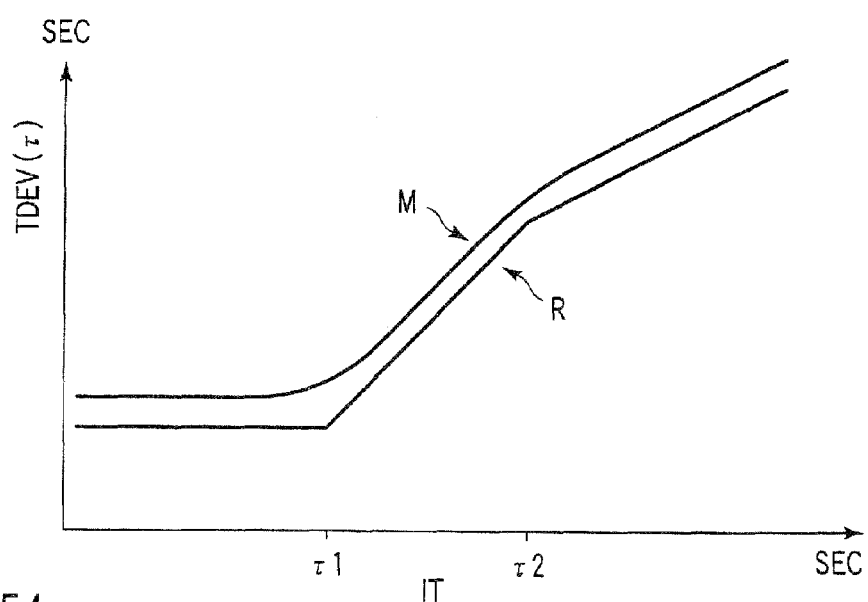
FIG. 54 is a diagram illustrating an exemplary display of characteristics for explaining the operation of the conventional phase noise transfer characteristic analyzer.

For example, with the characteristic such as the TDEV mask M2 illustrated in the aforementioned FIG. 51B, TDEV ($\tau$) is constant for an integration time up to $\tau$1.

Figure 3:
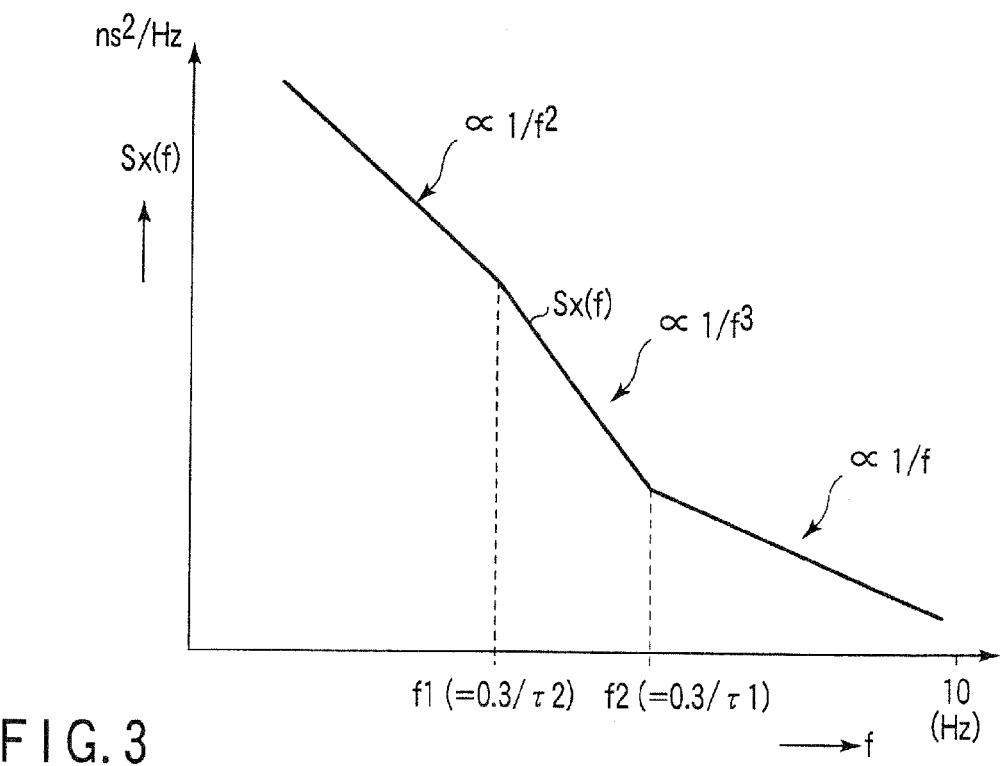
FIG. 3 is a diagram illustrating a power spectrum density distribution characteristic for explaining the principles of the wander generator according to the present invention.

Therefore, in this case, the power spectrum density distribution $Sx(f)$ is reduced in proportion to $1/f$ in a range of the frequency exceeding $0.3/\tau1=f2$, as illustrated in FIG. 3.

Then, as illustrated in FIG. 51B, $TDEV(\tau)$ is increased in proportion to $\tau$ (in proportion to $1/f$) in a range of the integration time from $\tau$1 to $\tau$2.

Therefore, in this case, the power spectrum density distribution $Sx(f)$ is reduced in proportion to $(1/f)\cdot(1/f)^2=1/f^3$ in a range of the frequency from $0.3/\tau1-0.3/\tau2(=f2-f1)$, as illustrated in FIG. 3.

Also, as illustrated in FIG. 51B, in a range of the integration time exceeding $\tau$2, TDEV ($\tau$) is increased in proportion to $\tau^{1/2}$ (in proportion to $1/f^{1/2}$).

Therefore, in this case, $Sx(f)$ is reduced in proportion to $(1/f)\cdot(1/f)=1/f^2$ in a range of the frequency lower than f1, as illustrated in FIG. 3.

On the other hand, it is known that the relationship:

$$Sy(f)=\omega^2\cdot Sx(f)=(2\pi f)^2\cdot Sx(f)$$

exists between the power spectrum density distribution characteristic $Sx(f)$ of time fluctuations and the power spectrum density distribution characteristic $Sy(f)$ of frequency fluctuations.

Figure 4:
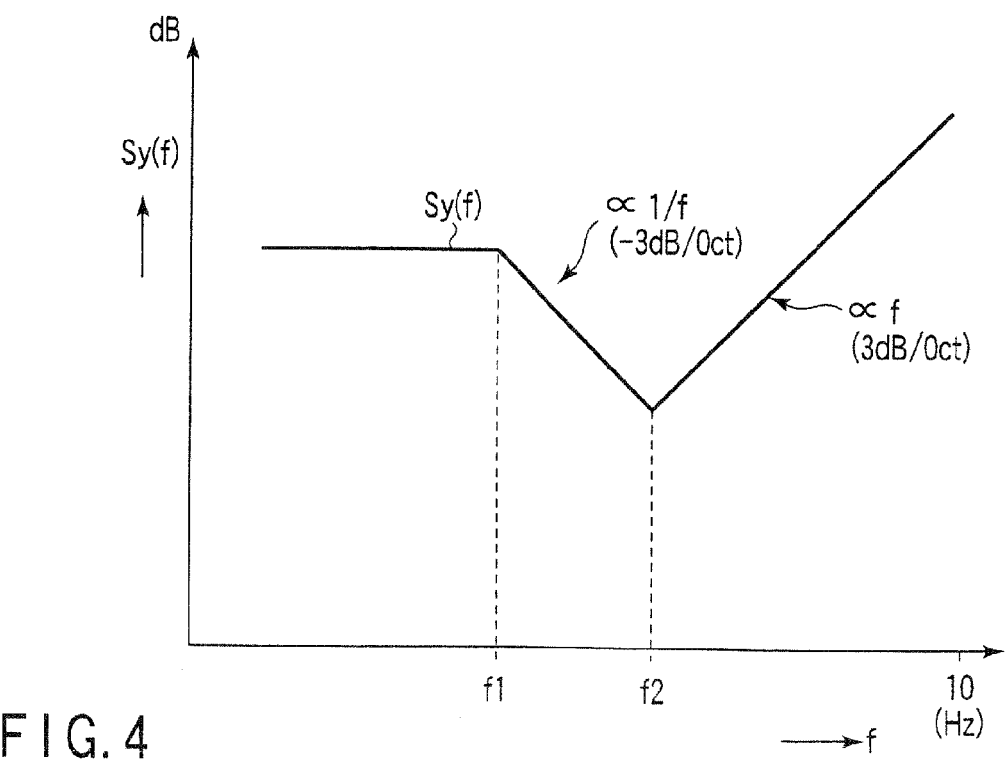
FIG. 4 is a diagram illustrating a relative power spectrum density distribution characteristic for explaining the principles of the wander generator according to the present invention.

In other words, the foregoing power spectrum density distribution characteristic $Sx(f)$ of the time fluctuations corresponds to the power spectrum density distribution characteristic $Sy(f)$ of frequency fluctuations, as illustrated in FIG. 4, which is constant up to a frequency f1; decreases at a rate of −3 dB/oct in a range of the frequency from f1 to f2; and increases at a rate of 3 dB/oct in a range of the frequency exceeding f2.

Thus, the wander generator 21 filters white noise which uniformly distributes in terms of the frequency to generate a fluctuation signal sequence y(k) of the power spectrum density distribution characteristic $Sy(f)$ as illustrated in FIG. 4, and integrates the fluctuating signal sequence y(k) by means of a direct digital synthesizer (DDS) 30, later described, to generates the aforementioned clock signal of the TDEV mask characteristic.

Also, the wander generator 21, for filtering the digital white noise signal sequence, finds an impulse response for a transfer function approximating the power spectrum density distribution characteristic $Sy(f)$ as illustrated in FIG. 4, and thereafter convolutes tap coefficients derived from the impulse response processing with the white noise signal sequence.

Next, the wander generator 21 will be explained in terms of the specific configuration.

As illustrated in FIG. 5, the wander generator 21 comprises center frequency setting means 22; characteristic information setting means 23; a fluctuating signal sequence generator unit 24; an adder 29; DDS 30; and a clock signal output circuit 31.

Here, the center frequency setting means 22 sets the center frequency (for example, 2 MHz) of the output clock signal CK1, i.e., data Y0 for determining the center frequency of an output signal of the DDS 30.

The characteristic information setting means 23 in turn sets characteristic information such as the shape of the power spectrum density distribution characteristic Sy(f) corresponding to a desired TDEV mask characteristic to be output, information on the frequency at a bending point, and the like.

Also, the fluctuating signal sequence generator unit 24 filters white noise based on the characteristic information set by the characteristic information setting means 23 to generate the fluctuating signal sequence y(k) which satisfies the power spectrum density distribution characteristic Sy(f) of the frequency fluctuations corresponding to a desired TDEV mask characteristic.

Also, the adder 29 adds the data Y0 set by the center frequency setting means 22 to the fluctuating signal sequence y(k) output from the fluctuating signal generator unit 24, and outputs an addition result u(k) to the DDS 30.

Then, the DDS 30 comprises an adder 30a; a latch circuit 30b for latching the output of the adder 30a in synchronism with a clock signal CK3; a waveform memory 30c which previously stores sinusoidal wave data at sequential address regions and reads out data at an address specified by the output of the latch circuit 30b; and a D/A converter 30d for converting the data read from the waveform memory 30c to an analog signal, and outputs a step-shaped signal at a frequency corresponding to the value output from the adder 29.

The clock signal CK3 of the DDS 30 is significantly higher (for example, about 50 MHz) as compared with the aforementioned clock signal CK1.

Assume herein that the number of addresses in the waveform memory 30a, and the frequency of the clock signal CK3 have been previously set such that a frequency signal at a frequency equal to a value u(k) output from the adder 29 can be output.

The output signal of the DDS 30 is input to the clock signal output circuit 31.

In the clock signal output circuit 31, for waveform shaping the output signal of the DDS 30 to output the clock signal CK1, the step-shaped signal output from the DDS 30 is converted to a sinusoidal wave by a bandpass filter (BPF) 31a corresponding to the data Y0, and input to a comparator 31b.

The comparator 31b compares the sinusoidal wave signal output from the low pass filter 31a with a threshold value Vr to output the binarized clock signal Ck1 which is at low level when the sinusoidal wave signal is smaller than the threshold value Vr, and at high level when the sinusoidal wave signal is equal to or larger than the threshold value Vr.

Here, the DDS 30 and the clock signal output circuit 31 generate a clock signal, the frequency of which is modulated by the fluctuating signal sequence y(k) output from convolution processing means 28 in the fluctuating signal sequence generator unit 24, as will be later described.

Therefore, the DDS 30 and the clock signal output circuit 31 correspond to the clock generating means in the aforementioned invention (1).

Also, the DDS 30 includes a portion corresponding to the modulating means in the aforementioned invention (1).

The fluctuating signal sequence generator unit 24 in turn comprises noise generating means 25 for generating a white noise signal n(k); impulse response processing means 26 for calculating tap coefficients for each impulse response time of a transfer function which approximates to the power spectrum density distribution characteristic Sy(f) based on characteristic information set by the characteristic information setting means 23; a memory 27 for storing tap coefficients for each time, calculated by the impulse response processing means 26; and convolution processing means 28 for convoluting the white noise signal n(k) output from the noise generating means 25 with the tap coefficients for each time stored in the memory 27 to generate the fluctuating signal sequence y(k) which satisfies the relative power spectrum density distribution characteristic S'.

Here, the noise generating means 25 generates the white noise signal n(k) based on a M-sequence pseudo random signal, and exemplary configurations are illustrated in FIGS. 6, 7.

The noise generating means 25 illustrated in FIG. 6 has a plurality of stages P of series shift registers 25a, and an EXOR circuit 25b for taking an exclusive OR of outputs at predetermined stages (determined by P) of the shift registers 25a, in order to comprise a set of pseudo random signal generator circuits.

Then, this noise generator circuit 25 is configured to set initial values except for zero to all bits of the shift register 25a such that one bit data is shifted at each stage each time a clock signal CK4 is received, wherein outputs of arbitrary m stages (for example, eight stages) out of P stages are sequentially output as an m-bit parallel white noise signal n(k).

The noise generating means 25 illustrated in FIG. 7 in turn comprises m sets of pseudo random signal generator circuits comprised of the aforementioned shift registers 25a and EXOR circuit 25b in order to generate a white noise signal approximate to more ideal white noise.

Specifically, this noise generating means 25 is configured to set different initial values (any of them is not set to zero) to sift registers 25a1-25am by means of initial value setting means 25c, such that each of the shift registers 25a1-25am shifts one bit data at each stage each time the clock signal CK4 is received.

Then, this noise generating means 25 collects outputs at every stage of the respective shift registers 25a1-25am to sequentially output an m-bit parallel white noise signal n(k).

Assume now that the initial values set to the respective shift registers 25a1-25am are sufficiently separate from one another.

For example, with a pseudo random signal generator circuit having P stages of shift registers 25a1-25am, a maximum of $(2^P-1)$ different codes can be generated, so that one is set to all bits in the first set of shift registers 25a1 as the initial value.

Also, in the second set of shift registers 25a2, a value advanced from the all bit "1", state by approximately $(2^P-1)/m$ times is set as the initial value.

Further, in the third set of shift registers 25a3, a value advanced from the all bit "1" state by approximately $2(2^P-1)/m$ times is set as the initial value.

By setting the initial value subsequently in this way, the respective shift registers 25a1-25am have the initial values which are different from one another by approximately $(2^P-1)/m$ or more.

As a result, if P is sufficiently larger than m, the outputs of the respective shift registers 25a1-25am are not correlated.

Therefore, the white noise signal n(k) produced by collecting the outputs of the respective shift registers 25a1-25am bit by bit into an m-bit parallel form, is extremely close to ideal white noise.

It should be noted that the noise generating means 25 configured as described relies on a predetermined algorithm determined by the pseudo random signal generator circuit comprised of the shift registers and the EX-OR circuit to sequentially output a noise signal comprised of random numbers of plural bits at a constant speed determined by the clock CK4.

Therefore, this noise generating means 25 corresponds to the random number signal generating means in the aforementioned invention (1).

Also, as illustrated in FIG. 7, a combination of outputs of a plurality of sets of pseudo random signal generators corresponds to the random number signal generating means in the aforementioned invention (2).

Turning back to FIG. 5, the impulse response processing means 26 calculates a tap coefficient h(t) for each impulse response time of a transfer function which approximates to the power spectrum density distribution characteristic Sy(f) based on the characteristic information set by the characteristic information setting means 23.

For example, as the power spectrum density distribution characteristic Sy(f) illustrated in FIG. 4, a transfer function having a characteristic which is constant up to a frequency f1; decreases at −3 dB/oct in a range of frequency from f1 to f2; and increases at 3 dB/oct in a range exceeding the frequency f2 is known to be approximated by the following transfer function H(f):

$$H(f)=(1+jf/f2)/[1+\text{Abs}(f/f1)]^{1/2}$$

where Abs(f/f1) indicates an absolute value of f/f1.

Then, an impulse response h(t) of this transfer function is expressed by:

$$h(t)=\int_{-\infty}^{\infty} H(f)e^{j2\pi ft}df$$

When the characteristic as illustrated in FIG. 4 and the frequencies (f1, f2, and the like) at its bending portions are set as characteristic information, the impulse response processing means 26 calculates the impulse response h(t) based on the set values.

Figure 8:
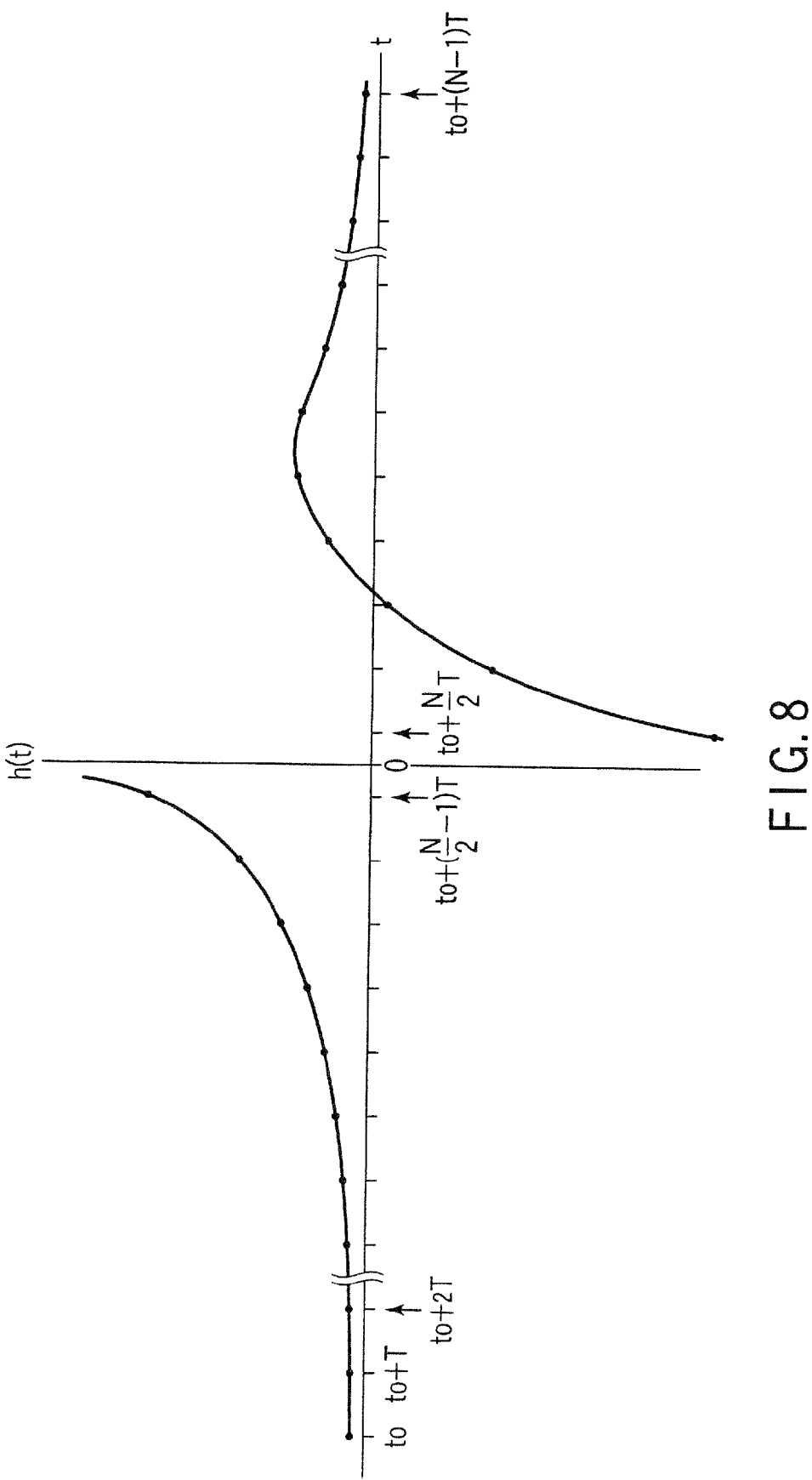
FIG. 8 is a diagram illustrating an impulse response for explaining the operation of a main portion in FIG. 1.

FIG. 8 illustrates the result of calculating the impulse response h(t) of the transfer function H(f).

Specifically, in a range t<0, the impulse response h(t) is positive and closer to zero as the absolute value of t is larger, and suddenly becomes large as the absolute value of t is closer to zero.

Also, in a range t>0, the impulse response h(t) is positive and closer to zero as the absolute value of t is larger, and is negative and suddenly reduced as the absolute value of t is closer to zero.

This impulse response processing means 26 is designed not to take a particular point t=0 for finding the values of h(t) (referred to as tap coefficients) at time intervals T of the response.

For this reason, first, an initial time $t_0$ is set at:

$$(-N/2)T+T/2=-(N+1)T/2$$

Then, N values (tap coefficients) are found for the aforementioned h(t) (N is an even number) with the value h(t0+rT) within a time range:

$$-(N-1)T/2 \leq t \leq (N-1)T/2$$

It should be noted that this time range is limited by integrating a window function g(t) which is positive in this time range and is zero out of the time range on the impulse response h(t).

The tap coefficients $h(t_0+rT)$ for each time, calculated by the impulse response processing means 26 are stored in the memory 27.

The convolution processing means 28 also convolutes the white noise signal n(k) output from the noise generating means 25 and the tap coefficients $h(t_0+rT)$ for each time stored in the memory 27 in accordance with the following equation to generate the fluctuating signal sequence y(k) which satisfies the power spectrum density distribution characteristic Sy(f):

$$y(k) = r = 0 \sum_{n}^{N-1} (k-r)h(t_0+rT)$$
$$= n(k)h(t_0) + n(k-1)h(t_0+T) +$$
$$n(k-2)h(t_0+2T) +$$
$$n(k-3)h(t_0+3T)$$
$$\ldots +$$
$$n(k-N+1)h[t_0+(N-1)T]$$

Here, the convolution processing involves a product sum calculation of the input white noise signal n(k) and previously set tap coefficients $h(t_0+rT)$.

The product sum calculation is equivalent to digital filtering performed on the white noise signal n(k) output from the noise generating means 25.

Therefore, the convolution processing means corresponds to the filter unit in the aforementioned inventions (1), (3), (4).

The tap coefficients set in the convolution processing means 28 are calculated by the impulse response processing means 26 based on the characteristic information set by the characteristic information setting means 23 for producing wander of a desired time deviation characteristic.

With such tap coefficients, the spectrum characteristic is determined for the fluctuating signal sequence y(k) output from the convolution processing means 28.

Therefore, the characteristic information setting means 23 and the impulse response processing means 26 correspond to the setting means of the above (1).

For actually performing the convolution processing, errors can be reduced by strategically determining the order of the calculations.

Specifically, the absolute value of a tap coefficient $h(t_0+rT)$ is very large in a region in which $t_0+rT$ is close to zero, and very small in a region far from zero.

For this reason, if the foregoing calculations are simply performed in a time series with a floating point scheme, the number of digits in the results of the calculations will become very large when the product sum calculation is performed up to a range in which $t_0+rT$ is close to zero.

Therefore, the accuracy of the convolution processing is degraded due to the results of calculations, performed subsequent thereto, which are underflowed in a region in which $t_0+rT$ is positive and far away from zero.

To prevent this, the product sum calculation is preferentially performed in a region in which the absolute value of a tap coefficient is small (a region in which t is far away from zero) to increase the number of digits in the results of the calculations, followed by the product sum calculation in a region in which the absolute value of a tap coefficient is large (a region in which t is close to zero).

While a variety of such calculation orders may be contemplated, two specific examples are explained here.

A first method performs a product sum calculation in a range in which t is positive and a product sum calculation in a range in which t is negative, independently of each other, from a location far away from zero, and finally adds both.

Specifically, in this method, the product sum calculations as follows are performed, respectively, from a front term to rear term in sequence.

$$y-(k) = n(k)h(t_0) +$$
$$n(k-1)h(t_0 + T) +$$
$$n(k-2)h(t_0 + 2T)$$
$$\ldots +$$
$$n(k - N/2 + 1)h[t_0 + (N/2 - 1)T]$$
$$y+(k) = n(k - N + 1)h[t_0 + (N - 1)T] +$$
$$n(k - N + 2)h[t_0 + (N - 2)T] +$$
$$n(k - N + 3)h[t_0 + (N - 3)T]$$
$$\ldots +$$
$$n(k - N/2)h[t_0 + (N/2)T]$$

Then, finally, $$y(k)=y-(k)+y+(k)$$

is calculated.

A second method alternately performs product sum calculates in a region in which t is positive and in a region in which t is negative from a location far away from zero in sequence.

Specifically, in this method, calculation such as the following equation is performed from a front term to a rear term in sequence:

$$y(k) = n(k)h(t_0) +$$
$$n(k - N + 1)h[t_0 + (N - 1)T] +$$
$$n(k-1)h(t_0 + T) +$$
$$n(k - N + 2)h[t_0 + (N - 2)T] +$$
$$n(k-2)h(t_0 + 2T) +$$
$$n(k - N + 3)h[t_0 + (N - 3)T]$$
$$\ldots +$$
$$n(k - N/2 + 1)h[t_0 + (N/2 - 1)T] +$$
$$n(k - N/2)h[t_0 + (N/2)T]$$

In this way, by preferentially performing the product sum calculation in a region in which the absolute value of a tap coefficient is small (a region in which t is far away from zero), the product sum calculation is performed in a region in which the absolute value of a tap coefficient is large (a region in which t is close to zero) after increasing the number of digits in the results of the calculations, thereby making it possible to prevent the accuracy from being degraded due to the underflow of the floating point calculation.

Also, for performing the convolution processing, N tap coefficients stored in the memory 27, a white noise signal n(k) at a current stage, and white noise signals n(k−1)−n(k−N+1) up to N−1 before the current stage are required.

For the (N−1) white noise signals n(k−1)−n(k−N+1), a method of previously storing them and reading them, and a method of using the noise generating means 25 which can return a noise signal to generate every time are contemplated.

Here, the former method is explained, while the latter method will be explained later.

Figure 9:
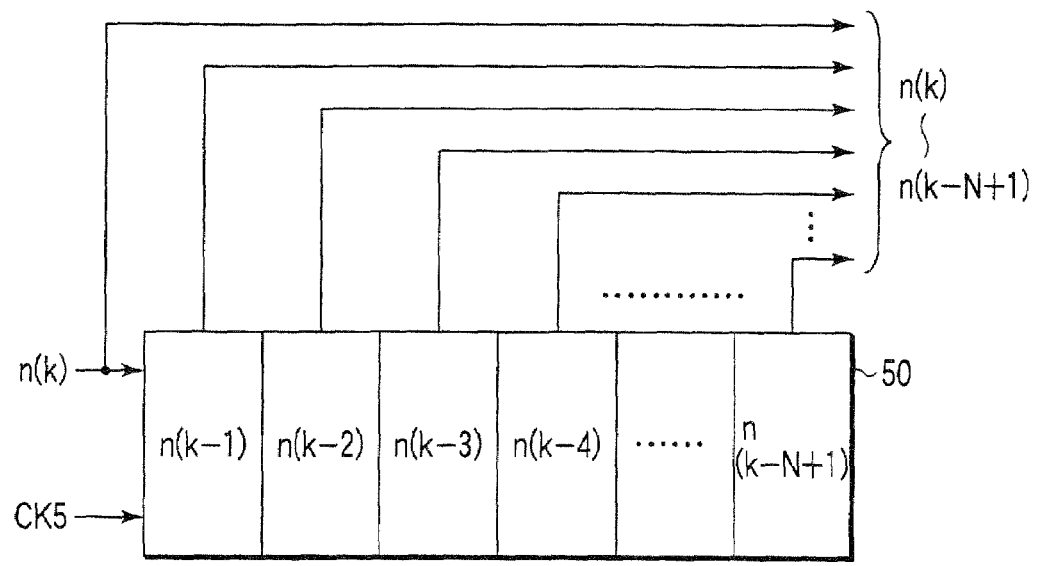
FIG. 9 is a diagram illustrating the circuit configuration of a main portion in FIG. 1.

In the former method using a memory, either the noise generating means 25 or the convolution processing means 28 is provided with (N−1) stages of shift registers 50 (N stages may be possible), as a memory, which store an m-bit noise signal while shifting previously received noise signals to subsequent stages in sequence each time a shift clock CK5 is received, as shown in FIG. 9.

At an initial stage, up to (N−1) noise signals n(k−1)−n(k−N+1) have been previously generated from the noise generating means 25 and stored in the shift register 50.

Then, the convolution processing is performed using the subsequently generated noise signal n(k) and noise signals n(k−1)−n(k−N+1) stored in the shift register 50, and the shift clock CK5 is applied to store this noise signal n(k) in the shift register 50.

Also, when the next noise signal n(k+1) is generated, the convolution processing is performed using the noise signal n(k+1) and the noise signal n(k)−n(k−N+2) stored in the shift register 50. This operation is repeated.

It should be noted that the shift clock CK5 in this event is synchronized with the clock signal CK4 of the noise generating means 25.

The fluctuating signal sequence y(k) produced by performing the convolution processing as described is added to the data Y0 input to the adder 29 for determining the center frequency.

Then, the result u(k) of the addition by the adder 29 is input to the aforementioned DDS 30.

In this DDS 30, data in the waveform memory 30c is read while accumulating (integrating) the result u(k) of the addition output from the adder 29 at a high speed (the rate of the clock signal CK2).

For this reason, for example, when the fluctuating signal sequence y(k) is positive as illustrated in FIG. 10A, the frequency of the clock signal CK1 is higher than Y0 by y(k) as illustrated in FIG. 10C, so that its phase advances by the accumulated amount of the fluctuating signal sequence y(k) with respect to the reference phase illustrated in FIG. 10B.

Also, when the fluctuating signal sequence y(k) is negative as illustrated in FIG. 10A, the frequency of the clock CK1 is lower than Y0 by y(k), so that its phase delays from the reference phase illustrated in FIG. 10B by the accumulated amount of the negative fluctuating signal sequence y(k).

In other words, the clock signal CK1 has its frequency modulated by phase variations corresponding to the result of an integration of the fluctuating signal sequence y(k).

Since the power spectrum density distribution characteristic of time fluctuations of the clock signal CK1 can be approximated to the characteristic Sx(f), it is possible to generate the clock CK1 which has wander of the TDEV mask M2.

The clock signal CK1 output from the wander generator 21 thus configured is input to the transmission unit 40 illustrated in FIG. 1, as mentioned above.

Then, a digital signal Sa synchronized with the clock signal CK1 is sent from the transmission unit 40 to the digital line 1 under testing.

Then, a digital signal Sa' returned from the digital line 1 is received by the reception unit 41, and subsequently its error rate is measured by the error measuring unit 42.

Further, TDEV of the clock signal CK1' reproduced in the reception unit 41 is measured by the TDEV measuring unit 43.

Here, the result E of measurement in the error measuring unit 42 is displayed on the display device 47, for example, in the form of numerical value by the display control means 46.

Figure 11:
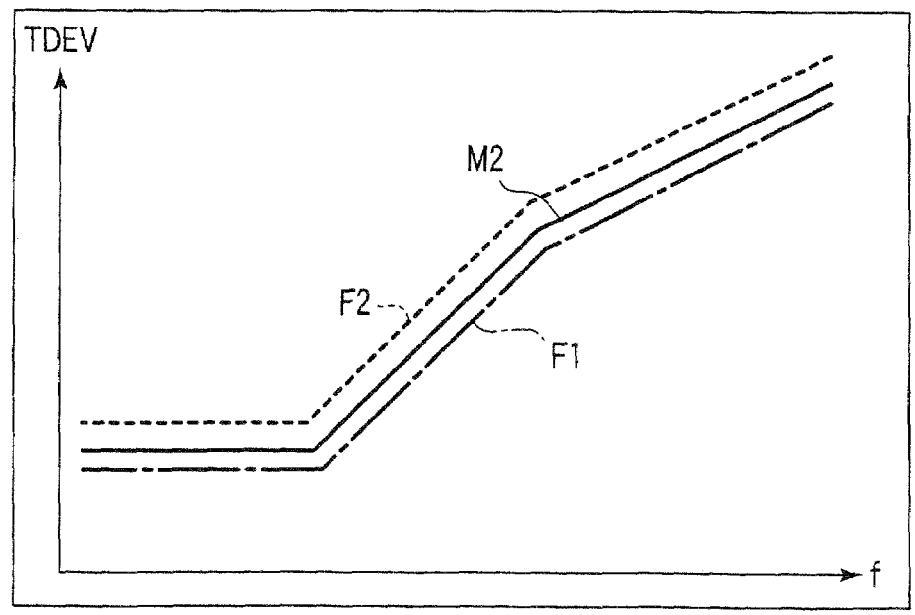
FIG. 11 is a diagram illustrating the result of a measurement made by the digital line tester using the wander generator according to the present invention.

Also, the result of measurement in the TDEV measuring unit 43 is displayed on the display device 47, such that it can be compared with a defined TDEV characteristic (TDEV mask M2), for example, as the characteristics F1 or F2 illustrated in FIG. 11.

It will be appreciated that as the characteristic F1 illustrated in FIG. 11, when a TDEV characteristic lower than the TDEV mask M2 has been measured, wander is suppressed on the digital line 1.

It will also be appreciated that as the characteristic F2 illustrated in FIG. 12, when a TDEV characteristic higher than the TDEV mask M2 has been measured, wander is increased on the digital line 1.

In the foregoing explanation, as a transfer function of a filter for generating a fluctuating signal sequence of the power spectrum density distribution characteristic Sy(f) corresponding to the TDEV mask M2, an approximation is made using:

$$H(f)=(1+jf/f2)/[1+\text{Abs}(f/f1)]^{1/2}$$

Therefore, a square of the absolute value of this transfer function $|H(f)|^2$ has errors which occur in a bending portion and an upper limit frequency portion, with respect to the ideal power spectrum density distribution characteristic Sy(f).

With the errors, the TDEV characteristic M2' of the clock signal CK1 has an error in a portion in which $\tau 1$, $\tau 2$ and $\tau$ are close to zero with respect to the defined TDEV mask M2, as illustrated in FIG. 13.

Such errors can be corrected using a correction function W(f) as next described.

Figure 14:
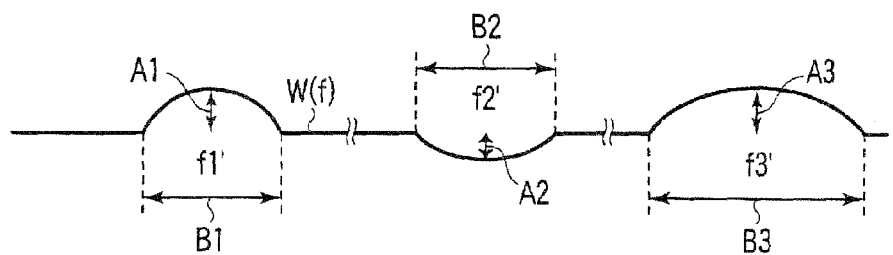
FIG. 14 is a diagram illustrating a correction function for explaining the operation of the main portion in FIG. 1.

As the correction function W(f), for example, a function having a characteristic as illustrated in FIG. 14 is used.

First, this function has its level increased in a band B1 centered at a frequency f1' near f1, and reaching a peak (A1) at the frequency f1'.

Also, this function has its level reduced in a band centered at a frequency f2' near f2, and reaching a bottom (A2) at the frequency f2'.

Also, this function has its level increased in a band B4 centered at a frequency f3' near an upper limit frequency (10 Hz), reaching a peak (A3) at the frequency f3', and constant in the remaining band.

A generalized equation for the correction function W(f) having such characteristics is expressed in the following manner:

$$W(f) = 1 + A1\exp[-((f - f1')/B1)^2/2] +$$
$$A1\exp[-((f - f1')/B1)^2/2] +$$
$$A2\exp[-((f - f2')/B2)^2/2] +$$
$$A2\exp[-((f + f2')/B2)^2/2] +$$
$$A3\exp[-((f - f3')/B3)^2/2] +$$
$$A3\exp[-((f + f3')/B3)^2/2]$$

Figure 15:
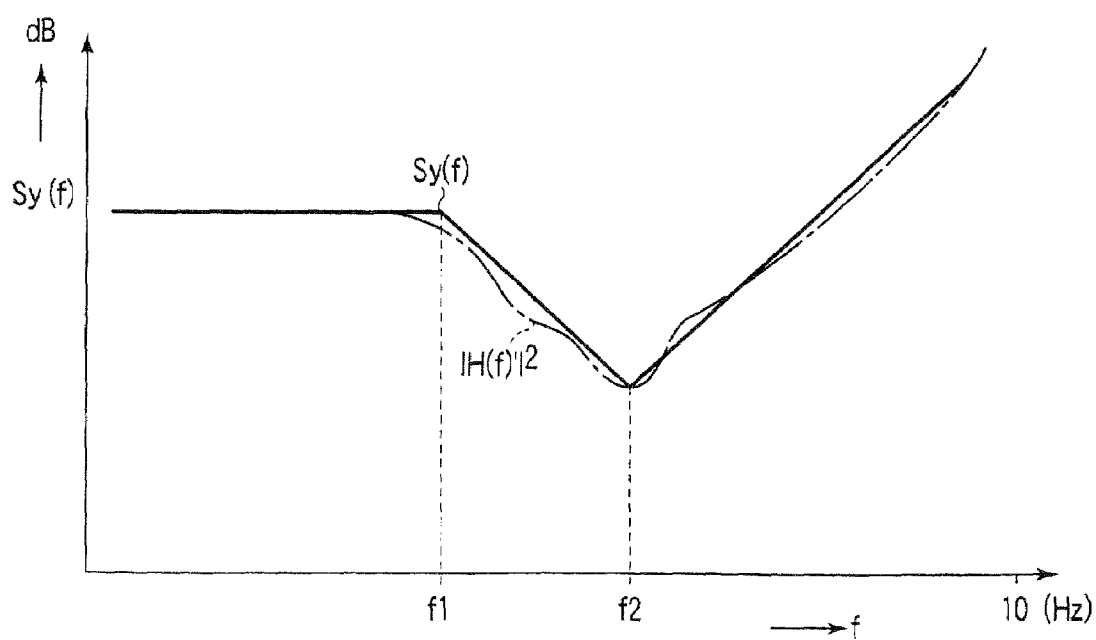
FIG. 15 is a diagram illustrating a difference between the power spectrum density distribution and a corrected transfer function for explaining the operation of the main portion in FIG. 1.

A square $|H(f)'|^2$ of the absolute value of a corrected transfer function H(f)' produced by an integration of the correction function W(f) and the transfer function H(f) further approximates to the ideal power spectrum density distribution characteristic Sy(f), as illustrated in FIG. 15.

Therefore, in the impulse response processing means 26, the impulse response h(t) of the aforementioned transfer function H(f), the impulse response w(t) of the correction function W(f), and the window function g(5) are used to perform the following calculation to find a tap coefficient:

$$h'(t)=\{h(t)*W(t)\}\cdot g(t)$$

Figure 16:
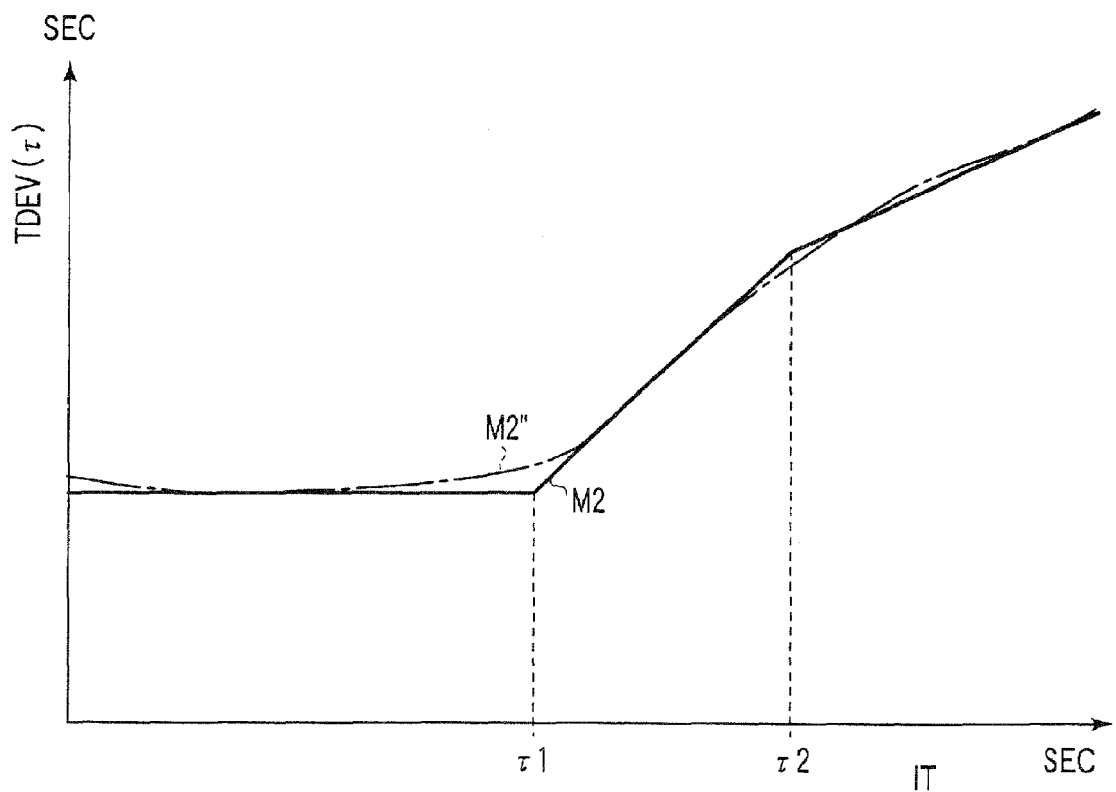
FIG. 16 is a diagram illustrating a difference between the defined TDEV characteristic and a corrected TDEV characteristic for explaining the operation of the main portion in FIG. 1.

Then, the convolution processing may be performed using this tap coefficient, thereby making it possible to approximate a TDEV characteristic M2" of the clock signal CK1 to the defined TDEV mask M2 and allow for more certain measurements as shown in FIG. 16.

Also, in the foregoing explanation, the white noise signal n(k) and the tap coefficient h ($t_0$+rT) are read from the memory 27 and the sift register 50 for performing the convolution processing.

Alternatively, as described above, by using the noise generating means 25 which is capable of generating a pseudo random signal in a reverse order, the convolution processing can be performed without using the shift register 50.

Also, together with the use of the noise generating means 25 capable of the reverse order, the impulse response processing means 26 may be configured to calculate tap coefficients in a specified order, thereby making it possible to perform the convolution processing without using the memory 27 and the register 50.

In this way, the memory can be largely saved, and the hardware configuration of the apparatus can be simplified.

Here, the noise generating means 25 which generates pseudo random signals in a normal order and in a reverse order can be implemented by using a reciprocal polynomial with respect to a normal generator polynomial.

In the following, this principle will be explained with a pseudo random signal having a short code period.

For example, assuming a normal generator polynomial p(x) is expressed by the following equation:

$$p(x)=x^4+x+1$$

its reciprocal polynomial q(x) is expressed in the following manner:

$$q(x) = x^4 p(x^{-1})$$
$$= x^{4-4} + x^{4-1}x^4$$
$$= x^4 + x^3 + 1$$

Figure 17:
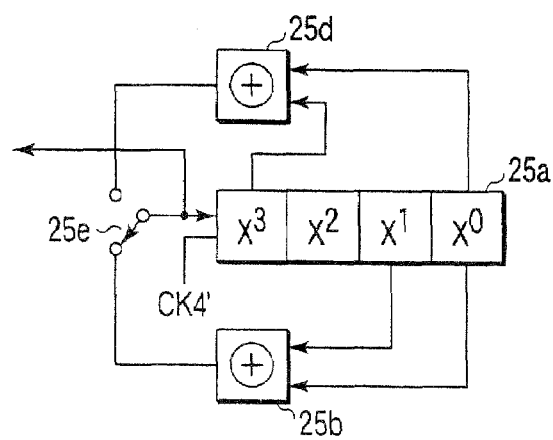
FIG. 17 is a diagram illustrating a reversible pseudo random generator circuit as a circuit component in the main portion in FIG. 1.

FIG. 17 illustrates an example of the noise generating means 25 which uses such the generator polynomial p(x) and the reciprocal polynomial q(x).

This noise generating means 25 comprises a four-stage shift register 25a; an EXOR circuit 25b for a normal order for taking exclusive OR of outputs of the third stage ($x^1$) and the fourth stage ($x^0$) of the shift register 25a; an EXOR circuit 25d for a reverse order for taking exclusive OR of outputs of the first stage ($x^3$) and the fourth stage ($x^0$) of the shift register 25a; and a switch 25e for selectively returning the outputs of the EXOR circuit 25a and the EXOR circuit 25d to the first stage.

It should be noted that the switch 25e is switched and a clock signal CK4' is input by a control circuit, not shown.

In this noise generating means 25, when the switch 25e is connected to the normal order side to input the clock CK4' after "1" is set at all stages as initial values, an operation of transitioning from state 1 to state 15 and again returning to state 1 of an internal state of the shift register 25a is repeated, as illustrated in FIG. 18A.

On the other hand, when the switch 25e is connected to the reverse order side to input the clock signal CK4' after "1" is set at all stages as initial values, an operation of transitioning from state 1 to stage 15 and again returning to state 1 of the internal state of the shift register 25a is repeated.

Here, output data at the first stage from state 1 to state 15 in the normal order case changes in the order of:

(1000100110101111)

On the other hand, output data at the first stage from the state 1 to state 15 in the reverse order case changes in the order of:

(1010110010001111)

Comparing the output data of the first stage with each other, the output data in the normal order matches the output data in the reverse order if the latter returns from the 13th bit to the first bit and moves to the 15th and 14th bits.

In other words, the data at the first stage in the normal order case repeats, as illustrated in FIG. 19A:

d1→d2→d3→ . . . →d13→d14→d15→d1→ . . . .

On the other hand, the data at the first stage in the reverse order case repeats, as illustrated in FIG. 19B:

d13→d12→d11→ . . . →d1→d15→d14→d13→ . . .

Therefore, with respect to the output data sequence at the first stage when the switch 25e is connected to the normal order side to input the clock CK4', the output data sequence at the first stage when the switch 25e is connected to the reverse order side to input the clock CK4' is output in the reverse order.

However, as illustrated in a state correspondence diagram illustrated in FIG. 20, a stage change of the shift register 25a in the reverse order case is not reverse to that in the normal order, so that the continuity of data cannot be maintained only by simply switching the switch 25e from the state in which data has been output in the normal order to the reverse order side.

For maintaining the continuity of the data, the state of the shift register 25a must be set by using data positional relationships illustrated in FIGS. 19A, 19B and stage correspondence information illustrated in FIG. 20.

For example, consider the case where from a state in which the shift register is shifted up to state 4 in the normal order to output data d5 from the EXOR circuit 25b, data is output in the reverse order in the order of d4→d3→d2→ . . . .

Specifically, since the data d5 is output from the EXOR circuit 25d in the reverse order in state 8 in the reverse order, if data is output in the reverse order from state 9 which is advanced from this state 8 by one, it is possible to output data in the order of d4→d3→d2→ . . .

Here, two methods are available for transitioning from state 4 in the normal order to state 9 in the reverse order.

One of these methods is a method which utilizes the fact that state 9 in the reverse order is equal to state 8 in the normal order.

Specifically, as indicated by solid arrows in FIGS. 18A, 18B, this method is such that the shift register is advanced from state 4 to state 8 in the normal order by applying the clock signal CK4' (in this event, data output from the noise generating means 25 is held as d5), and the switch 25e is switched to the reverse order side after the shift register is transitioned to state 9 in the reverse order.

The other method is a method which utilizes the fact that state 4 in the normal order is equal to state 12 in the reverse order.

Specifically, as indicated by one-dot-chain arrows in FIGS. 18A, 18B, this method is such that the switch 25e is switched to the reverse order side from state 4 in the normal order, and the shift register is advanced from state 12 to state 9 in the reverse order by applying the clock signal CK4' (in this event, data output from the noise generating means 25 is held as d5).

By thus controlling the switching of the switch 35e and the supply of the clock signal CK', it is possible to output data from an arbitrary state in the normal state in the reverse order.

Though not described in detail, it is also possible to output data from an arbitrary state in the reverse order in the normal order by performing a reverse control to the foregoing methods.

While the foregoing explanation has been given for a short code period for facilitating the understanding, the noise generating means 25 capable of operating in the normal and reverse orders, utilizing the aforementioned reciprocal polynomial, can be configured for a longer code period completely in a similar manner.

For example, when a generator polynomial p(x) in the normal order is expressed by:

$$p(x) = x^{96} + x^7 + x^6 + x^4 + x^3 + x^2 + 1$$

its reciprocal polynomial is expressed by the following equation:

$$\begin{aligned} q(x) &= x^{96} p(x^{-1}) \\ &= 1 + x^{96-7} + x^{96-6} + x^{96-4} + x^{96-3} + x^{96-2} + x^{96} \\ &= x^{96} + x^{94} + x^{93} + x^{92} + x^{90} + x^{89} + 1 \end{aligned}$$

Figure 21:
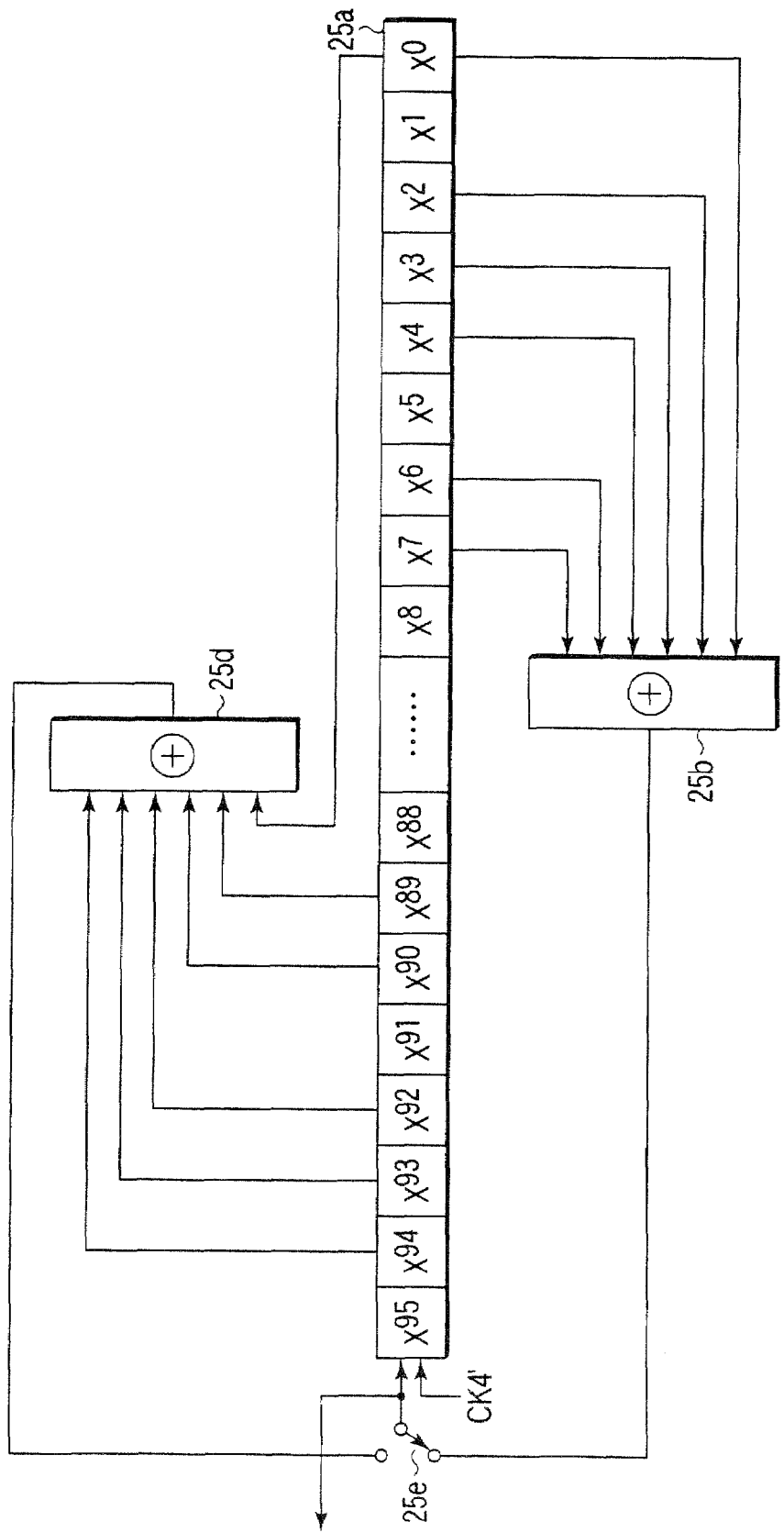
FIG. 21 is a circuit diagram of the reversible pseudo random generator circuit as a circuit component in a main portion in FIG. 1.

FIG. 21 illustrates a pseudo random signal generator circuit which uses such the generator polynomial p(x) and the reciprocal polynomial q(x).

This pseudo random signal generator circuit comprises a 96-stage shift register 25a; an EXOR circuit 25a for a normal order for taking exclusive OR of outputs of the first stage ($X^0$), third through fifth stages ($x^2$-$x^4$), seventh stage ($x^6$) and eighth stage ($x^7$) counted from the final stage of the shift register 25a; an EXOR circuit 25d for a reverse order for taking exclusive OR of outputs of the first stage ($X^0$), 90th stage ($x^{89}$), 91st stage ($x^{90}$), and 93rd through 95th stages ($x^{92}$-$x^{94}$); and a switch 25e for selectively returning outputs of the EXOR circuit 25b and the EXOR circuit 25d to the first stage.

It should be noted that even in the circuit of FIG. 21, the switching of the switch 25e and supply of the clock signal CK4' are also performed by a control circuit, not shown, in a manner similar to the foregoing.

Also, in the circuit of FIG. 21, for an output data sequence when the switch 25e is connected to the normal order side to input the clock CK4', an output data sequence when the switch 25e is connected to the reverse order side to input the clock CK4' is output in the reverse order, in a manner similar to the case of the short code period.

Further, by controlling the switching of the switch 25e and supply of the clock signal CK' based on a data position relationship and a state correspondence diagram, sequential data can be output from an arbitrary state in the normal order (or in the reverse order) sequentially in the reverse order (or in the normal order).

It should be noted that while the foregoing description has been made for the output at the first stage of the shift register 25a, the may be output from an arbitrary stage since the relationship between the normal order and the reverse order can be provided for outputs of other stages.

However, the above relationship is not established for parallel data output from two or more different stages.

Therefore, the aforementioned pseudo random signal generator circuit capable of operating in the normal and reverse orders is applied to each pseudo random signal generator circuit of the noise generating means 25 which outputs data bit by bit from a plurality m of pseudo random signal generator circuits to output an m-bit parallel white noise signal, as illustrated in FIG. 7.

In this way, with the use of the noise generating means 25 which is capable of generating the white noise signal n(k) in the reverse order, it is possible to generate previous N−1 noise signals n(k−1)–n(k−N+1) in order after generating a k-th white noise signal n(k).

Specifically, in this event, the aforementioned convolutional calculation:

$$y(k) = n(k)h(t_0) +$$
$$n(k-1)h(t_0 + T) +$$
$$n(k-2)h(t_0 + 2T)$$
$$\ldots +$$
$$n(k-N+1)h[t_0 + (N-1)T]$$

without using the memory 50.

Also, if the impulse response processing means 26 calculates the tap coefficients in the order of $h(t_o)$ to $h[t_o+(N-1)t]$ in concert with the output of the noise signal, the memory 27 is eliminated, so that the convolution processing can be carried out with one set of product sum calculating circuits.

Further, as described above, it is possible to perform the convolution processing with the aforementioned first method in order to prevents errors due to the underflow of the floating point.

Specifically, noise signals n(k)–n(k−N/2+1) are first generated in the reverse order to find y-(k), for example, for performing a product sum calculation in a range in which t is positive and a product sum calculation in a range in which t is negative independently of each other in order from a location far from zero.

Next, n(k−N+1)–n(k−N/2) are generated in the normal order operation to find y+(k), and both are added.

Thus, the fluctuating signal sequence y(k) can be produced even without the shift register 50.

Also, in this case, if the impulse response calculating means 26 calculates the tap coefficients in the order of $h(t_o)$ to $h[t_o+(N/2-1)t]$ and in the order of $[t +(N-1)T]-h[t_o+(N/2)T]$ in concert with the output of the noise signal sequence, the memory 27 is not required, so that the convolution processing can be carried out with one set of product sum calculating circuits.

It should be noted that the foregoing explanation has been made for the case where a clock signal having wander of the characteristic such as the TDEV mask M2 illustrated in FIG. 51B is generated as the defined TDEV characteristic, this does not limit the present invention.

For example, for generating a clock signal having wander of a characteristic such as the TDEV mask M1 illustrated in FIG. 51A, filtering similar to the foregoing may be performed using the characteristic information of the TDEV mask M1, and the power spectrum density distribution, transfer function H(f), and correction function W(f) corresponding to the mask.

Also, the TDEV mask is not limited to that described above but may include that having three or more bents, that having different slopes, and the like.

Likewise, for these TDEV masks, filtering similar to the foregoing may be performed using a power spectrum density distribution, transfer function H(f) and correction function W(f) corresponding to the associated mask.

Also, in the wander generator 21, the fluctuating signal y(k) is directly input to the adder 29.

Therefore, as the wander generator 21' illustrated in FIG. 22, the wander generator 21 may be configured to multiply the fluctuating signal y(k) output from the fluctuating signal sequence generator unit 24 by a set value B set by the level setting means 32, and output the result y(k)' of the multiplication to the adder 29 such that the level of the fluctuating signal can be varied.

In the foregoing manner, the wander generator 21 of this embodiment generates the fluctuating signal sequence y(k) having a power spectrum density distribution characteristic of frequency fluctuations corresponding to its time deviation characteristic based on the characteristic information of a desired time deviation characteristic, adds the fluctuating signal sequence y(k) and the data Y0 for determining the center frequency of the output clock signal in the adder 29, outputs a signal at a frequency corresponding to the result of the addition from the DDS 30, and waveform shapes an output signal of the DDS 30 to output the clock signal CK1.

For this reason, according to the wander generator 21 of this embodiment, it is possible to readily generate the clock signal CK1 having wander which satisfies a desired time deviation characteristic.

Also, the wander generator 21 of this embodiment has the fluctuating signal sequence generator unit 24 comprised of the noise generating means 25 for generating a white noise signal based on a pseudo random signal; the impulse response processing means 26 for calculating an impulse response of a transfer function for approximating a power spectrum density distribution of the white noise signal output from the noise generating means 25 to a power spectrum density distribution characteristic Sy(f) of frequency fluctuations corresponding to a desired time deviation characteristic based on characteristic information set by the characteristic information setting means 23; and the convolution processing means 28 for convoluting the result of the calculation of the impulse response processing means 26 and the white noise signal output from the noise generating means 25 to generate a fluctuating signal sequence y(k) having the power spectrum density distribution characteristic Sy(f).

In this way, the wander generator 21' of this embodiment can accurately generate the clock signal CK1 having the wander which satisfies a desired time deviation characteristic, since it digitally generates the fluctuating signal sequence y(k).

Also, when the impulse response processing means 26 corrects the impulse response by the correction function W(f) corresponding to an error between the power spectrum density distribution characteristic Sy(f) of frequency fluctuations and the transfer function, it is possible to more accurately generate the clock signal CK1 having the wander which satisfies the desired time deviation characteristic.

Further, when the convolution processing means 28 preferentially performs the product sum calculation for smaller absolute values of the results of impulse response calculations, errors can be reduced in floating point calculations, thereby making it possible to more accurately generate the clock signal CK1 having the wander which satisfies the desired time deviation characteristic.

Further, when the impulse response processing means 26 is configured to perform a calculation of the impulse response each time a white noise signal is output from the noise generating means 25 and the convolution processing means 28 performs the convolution processing using the result of the calculation performed each time by the impulse response processing means 26, it is possible to save the memory and simplify the hardware configuration of the apparatus.

Further, when the noise generating means 25 has a plurality (m) of pseudo random signal generating means for generating pseudo random codes of M-sequence at initial phases different from one another such that predetermined stages of outputs of the respective pseudo random signal generating means are collected to output an m-bit parallel white noise signal, the white noise signal can be extremely close to ideal white noise, thereby making it possible to more accurately generate the clock signal CK1 having the wander which satisfies the desired time deviation characteristic.

The fluctuation signal sequence generator unit 24 in the wander generator 21 of the foregoing embodiment calculates the impulse response of a transfer function corresponding to the power spectrum density distribution characteristic Sy(f) of frequency fluctuations corresponding to a desired time deviation characteristic, and convolutes the result of the calculation and a white noise signal to generate a fluctuating signal sequence y(k) having the power spectrum density distribution characteristic Sy(f).

Figure 23:
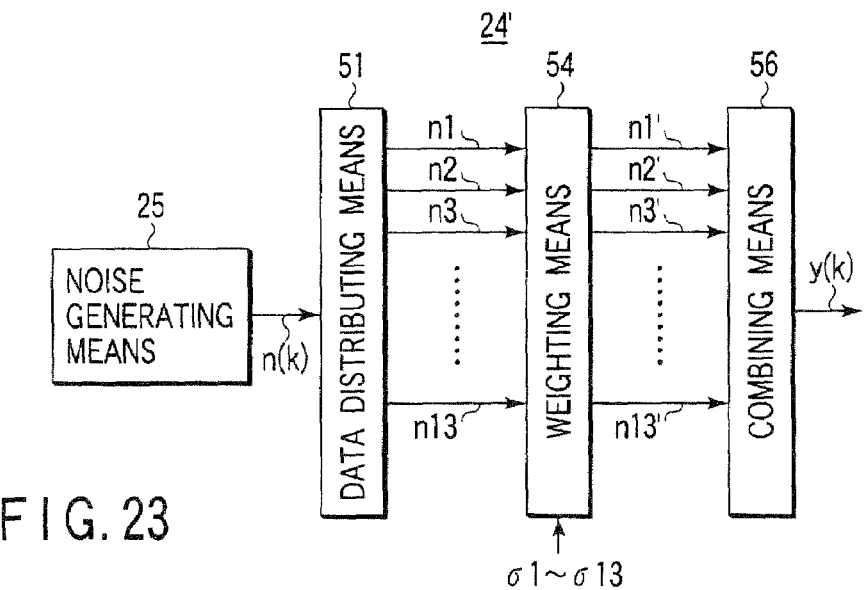
FIG. 23 is a block diagram illustrating the configuration of an example of a modification to a fluctuating signal sequence generator in FIG. 1.

Instead of the fluctuating signal sequence generator unit 24 as described, it is also possible to use the fluctuating signal sequence generator unit 24' illustrated in FIG. 23.

This fluctuating signal sequence generator unit 24' comprises the noise generating means 25, data distributing means 51, weighting means 54, and combining means 56.

Then, the fluctuating signal sequence generator unit 24' divides a frequency range of a power spectrum density distribution characteristic Sy(f) of frequency fluctuations corresponding to a desired TDEV characteristic into a plurality of bands, distributes white noise signals output from the noise generating means 25 at a rate in accordance with each band, applies corresponding weighting to power spectrum densities in each band by the weighting means 54, and combines them by means of the combining means 56 to generate a fluctuating signal sequence y(k) having the power spectrum density distribution characteristic Sy(f).

Here, explanation will be given of the division of the frequency range of the power spectrum density distribution characteristic Sy(F) corresponding to the TDEV mask M2 into a plurality of bands.

This characteristic Sy(f) is constant at frequency equal to or lower than 0.01 Hz, and varies in proportion to 1/f or f in a range of the frequency from 0.01 Hz to 10 Hz.

Therefore, the frequency range id divided such that the boundary of each band is located in a range in which the frequency covers 0.01 Hz to 10 Hz and such that the width of the respective bands are increased each time by a factor of two.

For example, assuming that the highest boundary frequency fc1 is at 16 Hz, the second highest boundary frequency fc2 is at 8 Hz, the third boundary frequency fc3 is at 4 Hz, and in a similar manner, the eleventh boundary frequency fc11 is at 1/64 Hz, and the twelfth boundary frequency fc12 is at 1/128 Hz (0.0078 Hz).

Thus, the frequency band may be divided into 13 boundaries with 12 boundary frequencies fc1-fc12.

Thus, from the noise generating means 25, the white noise signal n(k) is generated at a rate twice (32 Hz) the highest boundary frequency fc1.

Then, the data distributing means 51 distributes the white noise signal n(k) into 13 signal paths such that the rate is reduced half by half in accordance with the frequency of each band.

Figure 24:
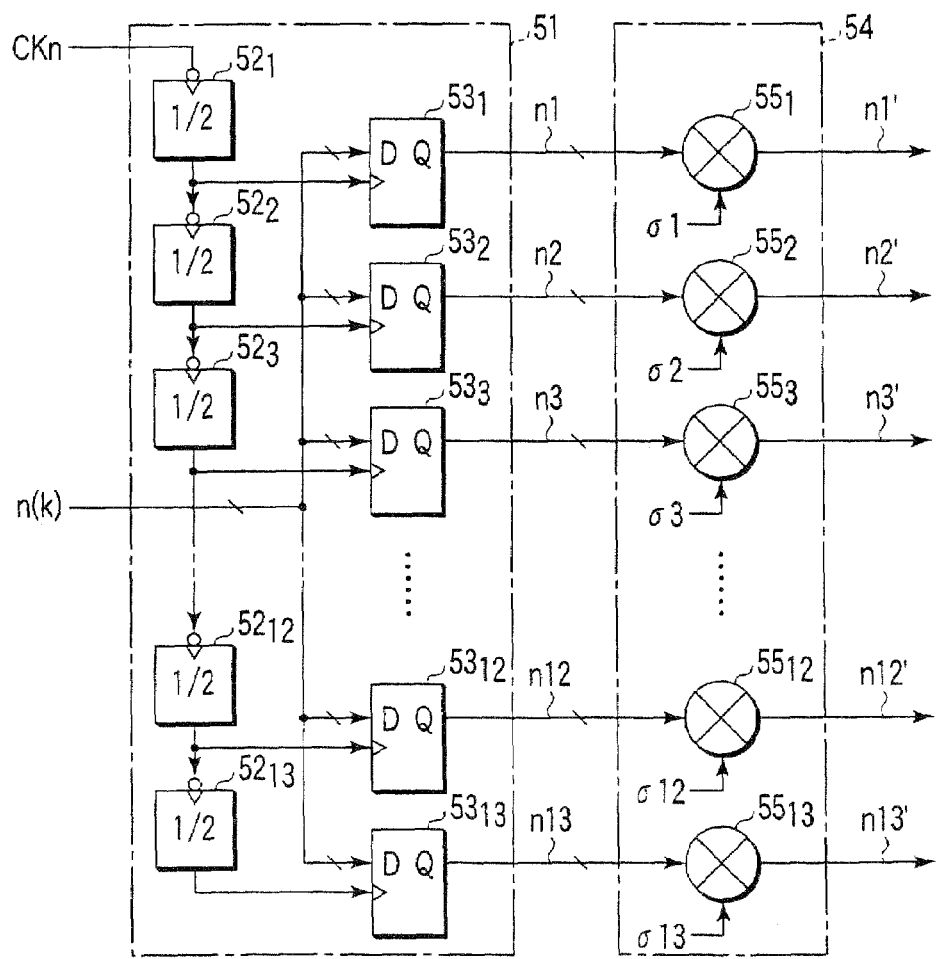
FIG. 24 is a block diagram illustrating the configuration of a main portion in FIG. 23.

The data distributing means 51 comprises, for example, 13 ½ dividers $52_1$-$52_{13}$ connected in series, each of which has an output that rises at a falling edge of an input signal; and 13 latch circuits $53_1$-$53_{13}$ which latch the noise signal n(k) at rising edges of divided outputs of the respective ½ dividers $52_1$-$52_{13}$, as illustrated in FIG. 24.

Then, a clock signal CKn synchronized with the noise signal n(k) is input to the ½ divider $52_1$ at the first stage.

Therefore, as the noise signal n(k) synchronized with the clock signal CKn as illustrated in FIG. 25A is output, for example, in the order of n(1), n(2), . . . , a ½ divided signal which rises at a falling edge of the clock signal CKn is input to the latch circuit $53_1$.

Thus, the latch circuit 531 outputs odd-numbered noise signals n1 [n(1), n(3), n(5), . . . , n(1+2i), . . . ] at a rate half the clock signal CKn (16 Hz), as illustrated in FIG. 25D.

Also, a ¼ divided signal, which rises in synchronism with falling of the ½ divided signal, is input to the latch circuit $53_2$, as illustrated in FIG. 25E.

Therefore, the latch circuit $53_2$ outputs every fourth noise signals n2 [n(2), n(6), n(10), . . . , n(2+4i), . . . ] from n(2) at a rate ¼ the clock signal CKn (8 Hz), as illustrated in FIG. 25F.

Further, a ⅛ divided signal, which rises in synchronism with falling of the ¼ divided signal, is input to the latch circuit 533, as illustrated in FIG. 25G.

Therefore, the latch circuit 533 outputs every eighth noise signals n3 [n(4), n(12), n(20), . . . , n(4+8i), . . . ] from n(4), at a rate ⅛ the clock signal CKn (4 Hz), as illustrated in FIG. 25H.

Subsequently, in a similar manner, the respective latch circuits $53_4$-$53_{13}$ outputs every 16th, every 32th, . . . , every 213th noise signals n4, n5, . . . , n13 of the noise signals output from the noise generating means 25 at rates $½^4$, $½^5$, $½^6$, $½^7$, $½^8$, $½^9$, $½^{10}$, $½^{11}$, $½^{12}$, $½^{13}$ the clock signal CKn, respectively.

As illustrated in FIG. 24, the noise signals n1-n13 at the respective rates are input to 13 multipliers $55_1$-$55_{13}$ of the weighting means 54 and are multiplied by respective weighting coefficients $\sigma_1$-$\sigma_{13}$.

The weighting coefficients $\sigma_1$-$\sigma_{13}$ have the values proportional to square roots of magnitudes of spectra in the respective bands of the power spectrum density distribution characteristic Sy(f) divided by the boundary frequencies fc1-fc12, and are set by the characteristic information setting means 23.

Here, the characteristic information setting means designates the coefficient $\sigma_{13}$ corresponding to a spectrum level of the lowest band (below 1/128 Hz) as a reference value 1, and sets the remaining weighting coefficients σ1-σ12 in conformity to the power spectrum density distribution characteristic Sy(f), as illustrated in FIG. 26:

σ12² = 1
σ11² = ½
σ10² = ¼
σ9² = ⅛
σ8² = 1/16
σ7² = ⅛
σ6² = ¼
σ5² = ½
σ4² = 1
σ3² = 2
σ2² = 4
σ1² = 8

Noise signals n1'-n13' weighted in this way are input to the combining means 56.

Figures 27, 30:
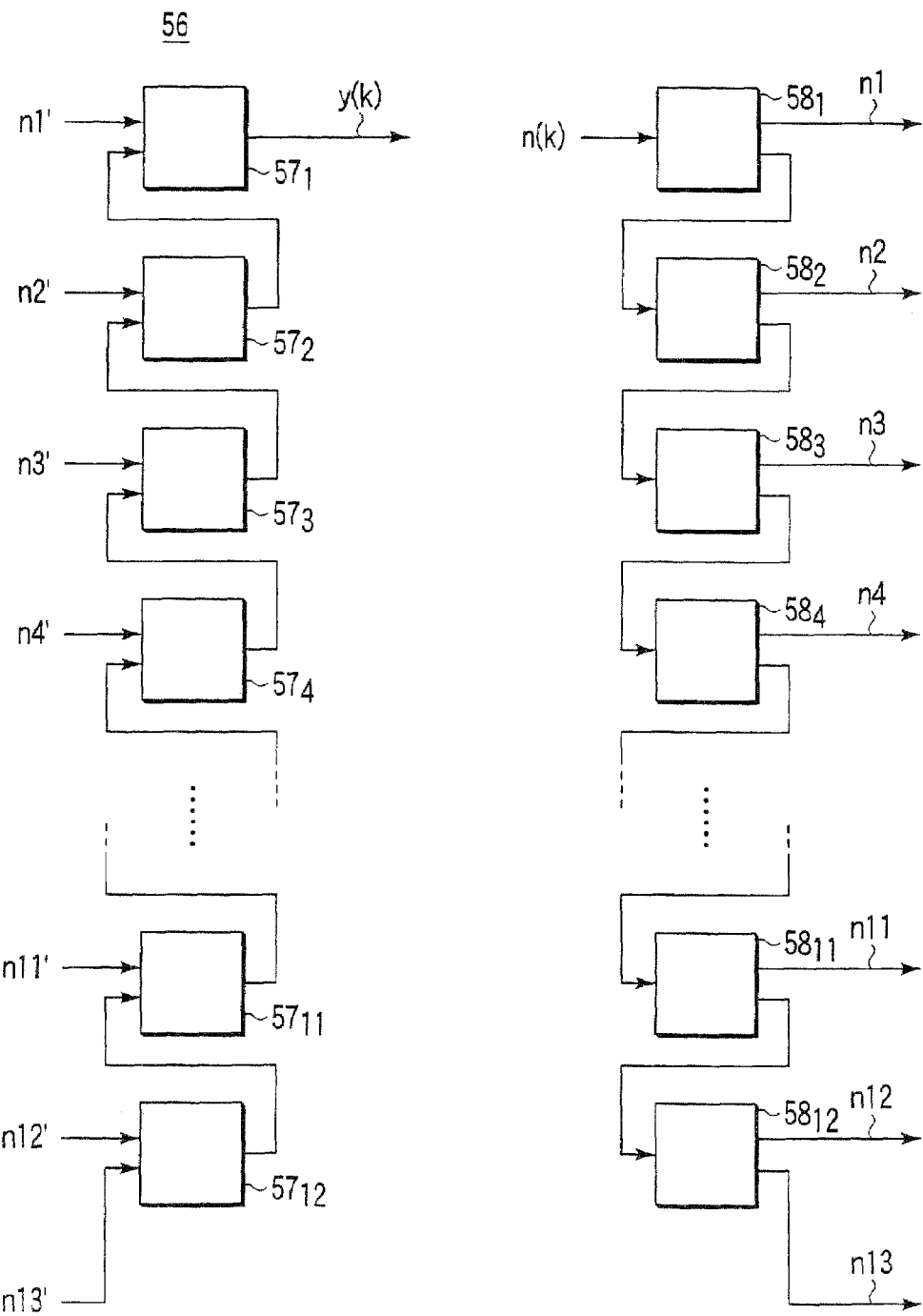
FIG. 27 is a block diagram illustrating the configuration of a main portion in FIG. 23.
FIG. 30 is a block diagram illustrating another configuration of the main portion in FIG. 23.

The combining means 56 comprises 12 poly-phase type sub-band combiners (QMF combiners) $57_1$-$57_{12}$ which are connected in cascade, as illustrated in FIG. 27.

Here, the respective sub-band combiners $57_1$-$57_{12}$ combine outputs of a high pass filter and a low pass filter (both are digital filters) which are equal in cut-off frequency fc and output the results.

Then, the cut-off frequencies of the respective sub-band combiners $57_1$-$57_{12}$ match the boundary frequency fc1-fc12 which divide the frequency range of the power spectrum density distribution characteristic Sy(f).

The combining means 56 combines the respective noise signals n1'-n13', as illustrated in FIG. 28.

Specifically, the sub-band combiner $57_{12}$ having the lowest cut-off frequency combines the noise signal n13', the low band of which is cut by the frequency fc12, and the noise signal n12', the high band of which is cut by the frequency fc12, and inputs the resulting component to the sub-band combiner $57_{11}$.

The sub-band combiner $57_{11}$ combines the output of the sub-band combiner $57_{12}$, the low band of which is cut by the frequency fc11, and the noise signal n11', the high band of which is cut by the frequency fc11, and inputs the resulting component to the sub-band combiner $54_{10}$.

Subsequently, in a similar manner, as a result of combining noise signals weighted at respective rates, the sub-band combiner $57_1$ generates a fluctuating signal sequence y(k) having a characteristic along the power spectrum density distribution characteristic Sy(f) of the frequency fluctuations.

This fluctuating signal sequence y(k) is input to the adder 29 in a manner similar to the foregoing, and is added to the data Y0 for determining the center frequency.

By inputting the result u(k) of the addition to the DDS 30, the clock signal of TDEV mask M2 can be generated.

Figure 29:
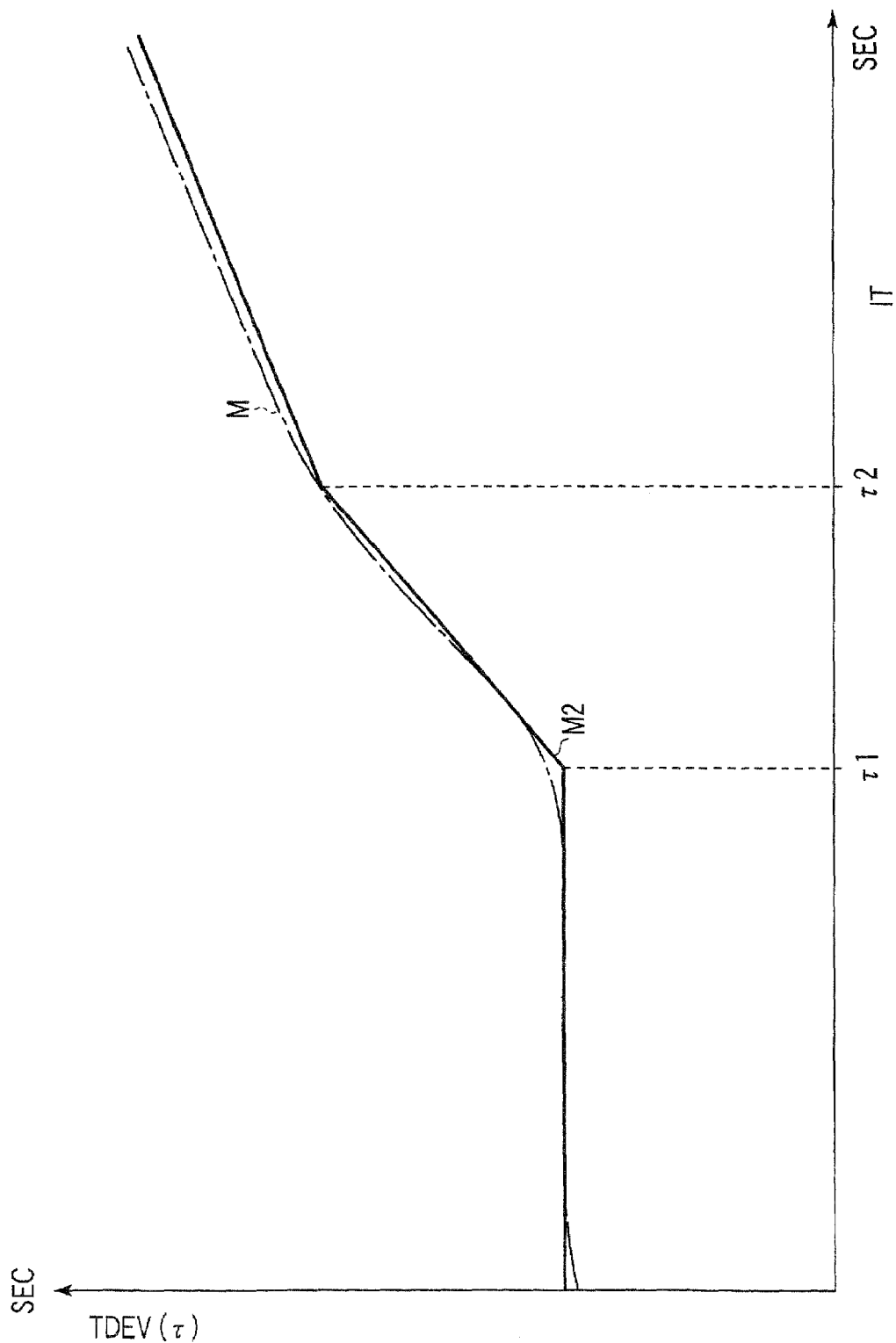
FIG. 29 is a diagram showing a difference between a defined TDEV characteristic and an actual TDEV characteristic for explaining the operation of a fluctuating signal sequence generator in FIG. 23.

The characteristic M illustrated in FIG. 29 is the TDEV characteristic of a clock generated using the fluctuating signal sequence generator unit 24', and provides a characteristic extremely approximate to the TDEV mask M2.

The explanation herein is given of the generation of the fluctuation signal of the power spectrum density distribution characteristic Sy(f) corresponding to the TDEV mask M2.

Specifically, the fluctuating signal generator unit 24' can generate a fluctuating signal sequence of an arbitrary power spectrum density distribution by arbitrarily setting divided bands and weighting coefficients.

Also, as the data distributing means 51 of the fluctuating signal sequence generator unit 24', as illustrated in FIG. 30, sub-band dividers $58_1$-$58_{12}$ for dividing an input signal with a high pass filter and a low pass filter, which are equal in cut-off frequency, are connected in cascade, symmetrically to the respective sub-band combiners $57_1$-$57_{12}$, reverse to the respective sub-band combiners $57_1$-$57_{12}$ of the combining means 56, to output the noise signals n1-n13 at different rates in parallel, in a manner described above.

In this event, the cut-off frequencies of the respective sub-band dividers $58_1$-$58_{12}$ are set identical to the cut-off frequencies of the sub-band combiners $57_1$-$57_{12}$.

In this way, the noise signals are output in parallel at rates corresponding to the frequencies of bands into which the frequency band of the power spectrum density distribution characteristic Sy(f) is divided into plural numbers, and weighted in accordance with the power spectrum densities of the respective beads to generate the fluctuating signal sequence.

Since the fluctuating signal of an arbitrary power spectrum density distribution characteristic can be generated in this way, it is possible to readily generate a clock signal of a complicated TDEV mask characteristic which is difficult in calculating the impulse response.

Also, in this case, as the noise generating means 25, it is possible to use one which has a plurality (m) of pseudo random signal generating means for generating pseudo random codes of M-sequence at initial phases different from one another, and is configured to collect predetermined stages of outputs of the respective pseudo random signal generating means to output an m-bit parallel white noise signal.

In this way, it is possible to make the white noise signal extremely close to an ideal white noise, and more accurately generate a clock signal having wander which satisfies a desired time deviation characteristic.

Also, the aforementioned fluctuating signal sequence generator unit 24' filters a signal sequence output from the noise generating means 25 by means of the data distributing means 51, the weighting means 54 and the combining means 56, wherein the weighting coefficients $\sigma_1$-$\sigma_{12}$ for determining the spectrum characteristic of the result of the processing are set by the characteristic information setting means 23.

Therefore, the data distributing means 51, weighting means 54 and combining means correspond to the filter unit in the aforementioned inventions (1), (5).

Also, the characteristic information setting means 23 corresponds to the setting means in the aforementioned inventions (1), (5).

In this way, the wander generator 21 of this embodiment comprises random number generating means for sequentially generating random number signals comprised of a plurality of bits at a constant rate in accordance with a predetermined algorithm; a filter unit for receiving a sequence of random number signals output from the random number generating means for performing filtering; clock generating means for generating a clock signal; modulating means for modulating the frequency of the clock signal generated by the clock signal generator by a signal output from the filter unit; and setting means for setting each amplitude value for a spectrum of a signal sequence output from the filter unit such that the characteristic of wander of the clock signal having the frequency modulated by the modulating means matches a desired characteristic, so that a clock signal of a desired wander characteristic can be readily generated.

Also, the digital line tester 20 of this embodiment comprises a wander generator 21 for generating a clock signal CK1 having wander which satisfies a defined time deviation characteristic; a transmission unit 40 for sending a digital signal synchronized with the clock signal CK1 output from the wander generator 21 to a digital line 1 under testing; a reception unit 41 for receiving the digital signal returned from the digital line under testing and restoring a clock signal of the received digital signal; an error measuring unit 42 for measuring errors in the digital signal received by the reception unit 41; a time deviation measuring unit 43 for measuring a time deviation characteristic of the clock signal CK1, restored by the reception unit 41; a display device 47; and display control means 46 for displaying the result of measurements of the error measuring unit 42 and the time deviation characteristic measured by the time deviation measuring unit 43 on the display unit 47 such that it can be compared with the defined time deviation characteristic.

Therefore, according to the digital line tester 20 of this embodiment, the wander on the digital line 1 under testing can be readily and efficiently evaluated, and a change in the wander due to the digital line 1 can be readily compared on the display screen.

Also, since the digital line tester 20 of this embodiment has the wander generator 21, comprising the wander generator unit, configured as described above, a digital signal synchronized with the clock signal CK1 having the wander which satisfies a desired time deviation characteristic can be sent to the digital line 1 under testing, thereby making it possible to correctly evaluate the digital line as well as reduce the size of the apparatus.

Next, in the wander generator for digitally filtering a noise signal sequence in the filter unit, and outputting a clock signal having the frequency modulated by an output signal of the filter unit in the manner described above, explanation will be given of techniques for promptly outputting the clock signal having wander of desired characteristic upon starting the apparatus or upon switching the characteristic and for previously acquiring the characteristic of wander of a clock signal to be output, and the characteristic of a signal which modulates the clock signal.

Specifically, the filtering performed by the convolution processing means 28 or the data distributing means 51, weighting means 54 and combining means 56 in the manner described above involves processing of storing an input signal sequence while sequentially shifting it into a plurality of internal storage elements, and performing product sum calculations of the contents stored in the respective storage elements with coefficients corresponding to the respective storage elements to sequentially output the results of the calculations.

Therefore, for providing an arbitrary frequency characteristic as described above, it is necessary to increase the frequency resolution which can be set.

For this purpose, it is necessary to increase the order number of filters, i.e., increase the number of internal storage elements.

When the number of storage elements is increased in this way, a very long time will be required until a signal of a desired wander characteristic is output during an initial stage of operation and upon switching the characteristic.

Also, if the characteristic of the wander of the clock signal output in this way can be arbitrarily varied, it is inconvenient if previous confirmation cannot be made as to which TDEV characteristic an actually output clock signal has.

To solve this, it is contemplated to measure an actually output clock signal and a noise signal to display the result of the measurements.

However, a method of actually measuring the clock signal and the noise signal in this way would complicate the configuration as the wander generator, and take an inhibitive time (several hours to several tens of days) until completion of measurements depending on the contents of characteristics under measurement, thereby encountering difficulties in its implementation.

Thus, explanation will be next given of details on a wander generator which is capable of promptly generating a clock signal having a wander of a desired characteristic, and is capable of readily keeping track of the characteristic of wander of an actually output clock signal and the characteristic of a signal which modulates the clock signal.

FIG. 31 illustrates a noise generator unit 120 included in the wander generator which has been created for solving the foregoing problems.

White noise generating means 121 in the noise generating unit 120 outputs a digital white noise signal n(k) at a predetermined rate.

Figure 32:
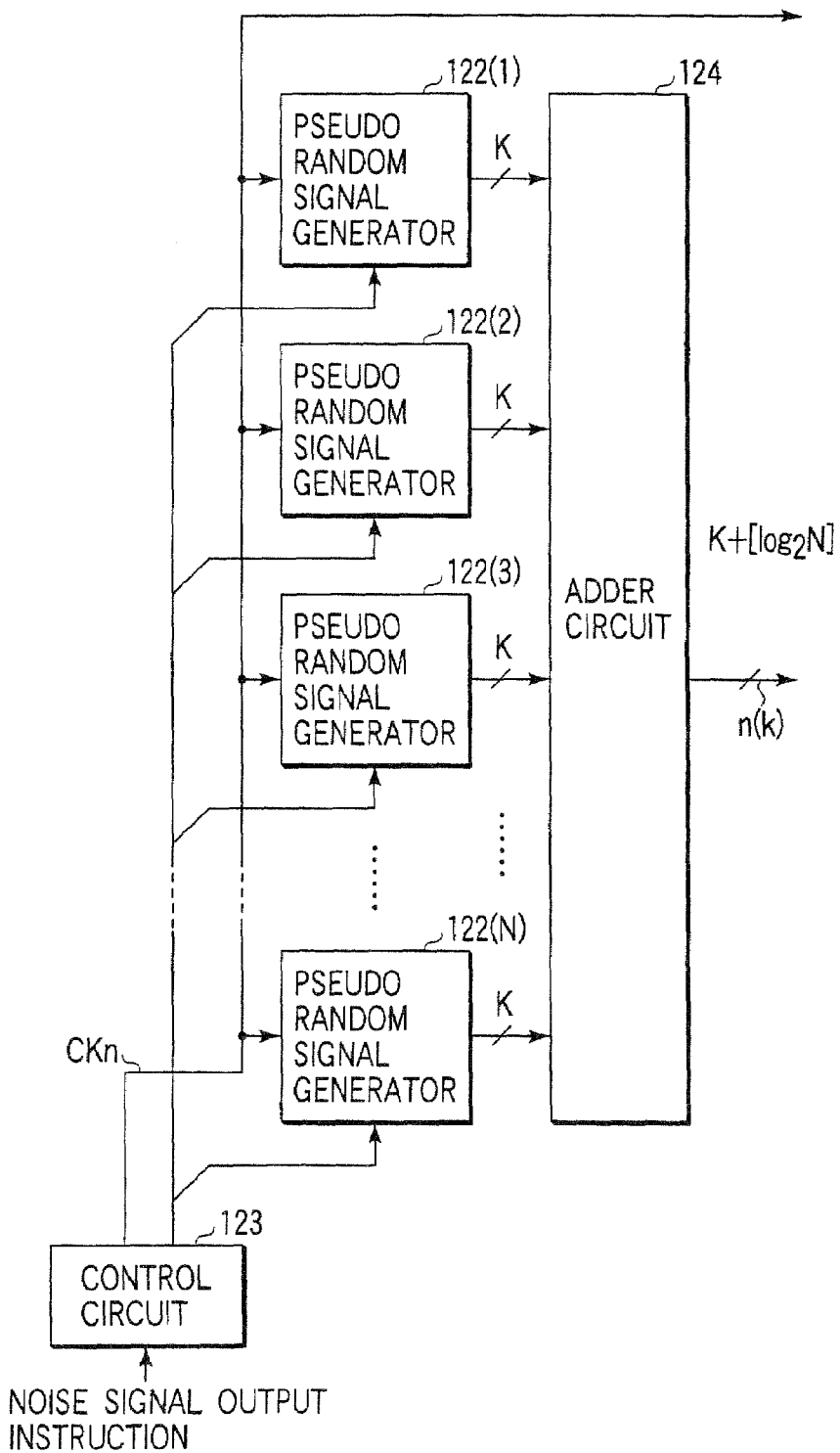
FIG. 32 is a block diagram illustrating the configuration of a main portion in FIG. 31.

For example, as illustrated in FIG. 32, the white noise generating means 121 adds K-bit random signals each output serially from a plurality N (for example N=12) of pseudo random signal generators 122(1)-122(N) in synchronism with a clock signal CKn by means of an adder circuit 124 to output a white noise signal n(k) of K+[log$_2$N] bits.

Here, the parenthesis [ ] represents an integer number with raised decimal fraction.

The plurality N of pseudo random signal generators 122 (1)-122(N) generates pseudo random signals at a code period ($2^S$−1) generated from identical shift registers at S stages.

Thus, for spacing apart correlation peaks of the output, the plurality N of pseudo random signal generators 122(1)-122 (N) are initially set such that the phases of output codes largely vary by a control circuit 123, and repeatedly output noise signals n(1), n(2), . . . , n($2^S$−2), n($2^S$−1) as one period.

In this way, an instantaneous value of the white noise signal generated by adding a plurality of pseudo random signals approximates to a Gauss distribution characteristic.

Here, the control circuit 123 receives a noise signal output instruction from initial setting means 131, later described, and initializes the pseudo random signal generators 122(1)-122(N) to output clock signals CKn.

Also, a noise signal n(k) output from the white noise generating means 121 is input to a filter unit 125.

The filter unit 125 has a digital filter which stores a digital signal sequence while sequentially shifting it into a plurality of internal storage elements, and performs product sum calculations for the contents stored in the plurality of storage elements.

Then, the filter unit 125 converts the noise signal n(k) output from the white noise generating means 121 to a noise signal of a frequency characteristic corresponding to a previously set characteristic coefficient and outputs the same.

The explanation herein is given of the filter unit 125 which is comprised, for example, of an FIR type digital filter 126 as illustrated in FIG. 33.

The digital filter 126 comprises a plurality M of stages of series storage elements (also referred to as delay elements) 127(1)-127(M) for storing input data while sequentially shifting it into later stages; multipliers 128(1)-128(M+1) for multiplying input data to the storage element at the first stage and output data of the respective storage elements 127(1)-127(M) by filter coefficients (characteristic coefficients of this embodiment) h0-hM, respectively; and an adder 129 for producing a total sum of outputs of the multipliers 128(1)-128 (M+1).

Each of the storage elements 127(1)-127(M) sequentially shifts the noise signal n(k) in synchronism with the clock signal CKn.

Also, each of the storage elements 127(1)-127(M) can set arbitrary values D(1)-D(M) from the initial setting means 131, later described.

The filter coefficients h0-hM input to the multipliers 128 (1)-128(M+1) are set by characteristic coefficient setting means 130, later described.

The FIR type digital filter 126 thus configured converts the input noise signal n(k) to a noise signal (corresponding to the aforementioned fluctuating signal sequence) having a frequency characteristic in accordance with the filter coefficients h0-hM.

Then, the characteristic coefficient setting means 130 sets a characteristic coefficient for determining the characteristic of the noise signal u(k) output from the filter unit 125 (a filter coefficient when the filter unit 125 is comprised only of the digital filter 126 as is the foregoing case), and can set an arbitrary characteristic coefficient through manipulations on a manipulation unit or the like, not shown.

The initial setting means 131 in turn has a memory (ROM) 131a, and retrieves a noise signal sequence equivalent to the contents stored in the respective storage elements in the digital filter in a state in which a noise signal of a frequency characteristic corresponding to a characteristic coefficient is being output from the filter unit 125, based on the contents of the memory 131a, and initially sets the noise signal sequence in the respective storage elements in the digital filter at least upon initial operation of the apparatus.

Specifically, the initial setting means 131, when the filter unit 125 is comprised only of the digital filter 126 as described above, initially sets a noise signal sequence equivalent to the contents stored in the respective storage elements 127(1)-127 (M) in a state in which a noise signal of a frequency characteristic corresponding to filter coefficients $h_0$-$h_M$ is being output from the digital filter 126.

Assuming herein that the noise signal n(1) generated by the white noise generating means 121 in an initial phase of operation is known, M noise signals n(2N−1), n(2N−2), ..., n(2N−M) preceding the noise signal n(1) have been previously stored in the memory 131a as initial values D(1)-D(M), respectively.

Then, the initial setting means 131 instructs the respective storage elements 127(1)-127(M) of the digital filter 26 to output the noise signals to the white noise generating means 121, after respective initial settings, in an initial phase of operation such as power on, as illustrated in FIG. 34.

Thus, the internal state of the filter unit 125 is immediately set to the same state as a steady state in the initial phase of operation, so that noise signals of frequency characteristics in accordance with the filter coefficients $h_0$-$h_M$ set by the characteristic coefficient setting means 130 are immediately output from the filter unit 125.

The noise signal u(k) output from the filter unit 125 is input to a multiplier 132.

The multiplier 132 multiplies the noise signal u(k) by an amplitude coefficient A set by amplitude setting means 133, and outputs the result of the multiplication as a noise signal y(k) of a desired characteristic.

Also, characteristic calculating means 134 finds the frequency characteristic, amplitude and the like of the noise signal y(k) output from the multiplier 132 based on the characteristic coefficient set in the filter unit and the amplitude coefficient A set in the multiplier 132.

Characteristic display means 135 in turn displays the characteristic of the noise signal found by the characteristic calculating means 134 on a display 136 as a graph or numerical values.

In the noise generating unit 120 configured as described, noise signals equivalent to the contents stored in the respective storage elements 127(1)-127(M) in the digital filter 126 in a state in which a noise signal of a frequency characteristic corresponding to a characteristic coefficient is being output from the filter unit 125 are initially set in the respective storage elements 127(1)-127(M) by the initial setting means 131 at least in an initial phase of operation of the apparatus.

For this reason, the noise signal of a frequency characteristic corresponding to a characteristic coefficient can be immediately output from the filter unit 125 without waiting until M noise signals are fetched into the filter unit 125 from the white noise generating means 121, thereby making it possible to eliminate influences on measurements due to outputs of noise signals which do not fit the characteristic.

Also, the characteristic calculating means 134 finds the characteristic of the output noise signal y(k) based on the characteristic coefficient set in the filter unit 125 by the characteristic setting means 130 and the amplitude coefficient A in the amplitude setting means 133, and displays the characteristic by the characteristic display means 135, so that the characteristic of the noise signal y(k) to be output can be conveniently confirmed promptly beforehand.

While the foregoing explanation has been given of the filter unit 125 comprised of only the digital filter 126, this does not limit the present invention.

For example, the filter unit 125 may be comprised of a divider circuit 141, a weighting circuit 143, and a combining circuit 145 including a digital filter, as illustrated in FIG. 35.

Here, the divider circuit 141 has a plurality P of ½ decimate circuits 142(1)-142(P) connected in cascade.

Each of the ½ decimate circuits 142(1)-142(P) is a circuit for alternately distributing input data into two output paths and outputting them at a rate half the input rate.

Figure 36:
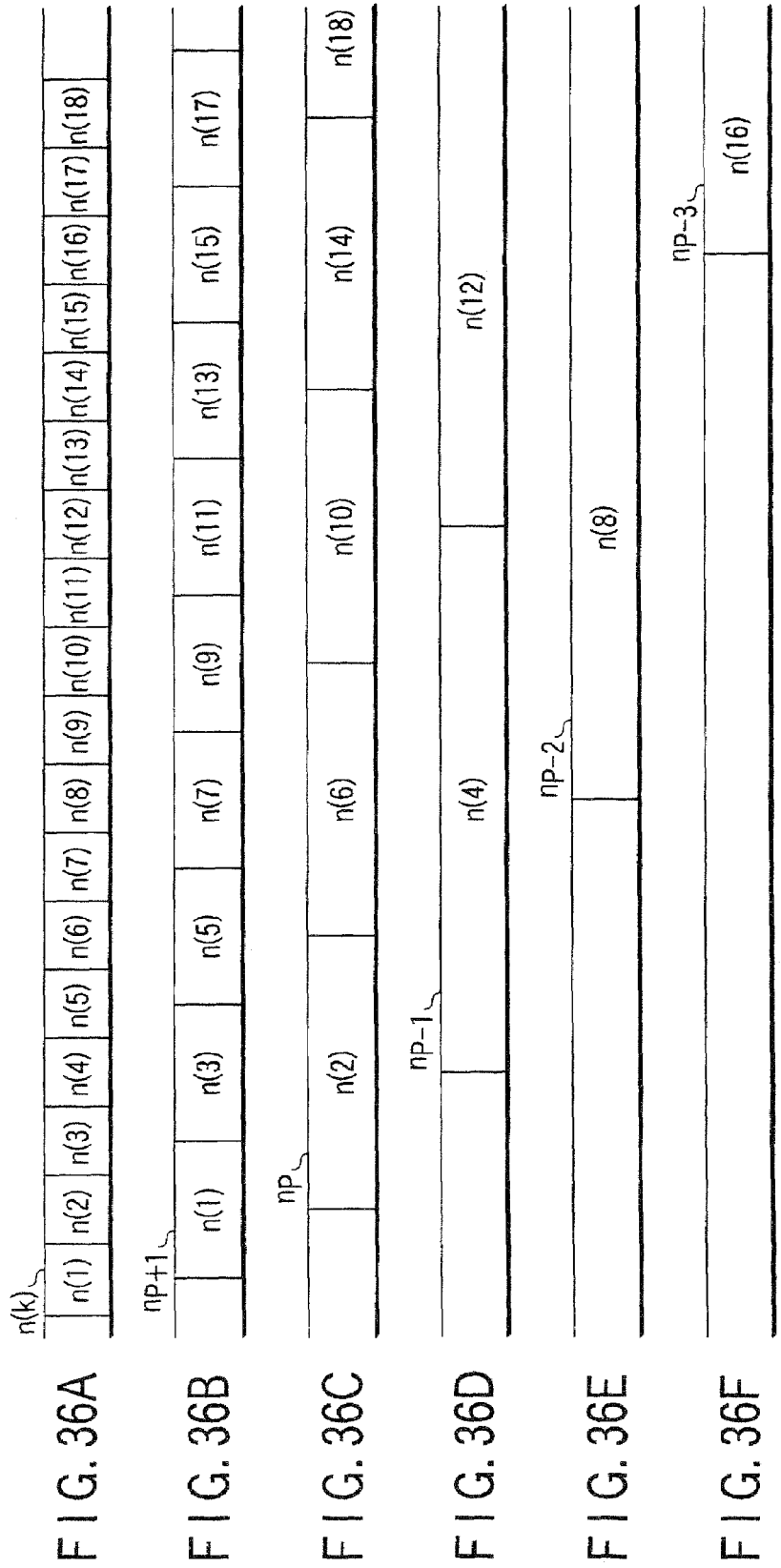
FIGS. 36A through 36F are timing diagrams for explaining the operation of the modification example in FIG. 35.

As the ½ decimate circuit 142(P) at the first stage receives noise signals n(1), n(2), n(3), ... as illustrated in FIG. 36A, it outputs odd-numbered noise signals n(1), n(3), n(5), ... from one output thereof, while it outputs even-numbered noise signals n(2), n(4), n(6), ... from the other output terminal, as illustrated in FIG. 36B.

The noise signals output from the other input terminal is input to the ½ decimate circuit 142(P−1) at the second stage.

Similarly, the ½ decimate circuit 142(P−1) outputs, within the input noise signals n(2), n(4), n(6), ..., the noise signals n(2), n(6), n(10), ... from one output terminal, and the noise signals n(4), n(8), n(12), ... from the other output terminal, as illustrated in FIG. 36C.

The noise signals output from the other output terminal is input to the ½ decimate circuit 142(P−2) at the third stage.

Similarly, the ½ decimate circuit 142(P−2) outputs the noise signals n(4), n(12), n(20), ... from one output terminal, and the noise signals n(8), n(16), n(24), ... from the other output terminal, as illustrated in FIG. 36D.

Similarly, the ½ decimate circuit 142(P−3) at the fourth stage outputs noise signals n(8), n(24), n(40), ... from one output terminal, and the noise signals n(16), n(32), n(56), ... from the other output terminal, as illustrated in FIG. 36E.

Further, from the respective ½ decimate circuits 142(P−4)-142(1), noise signals are output such that the output rate is reduced by a factor of two.

In this way, the noise signals $n_1, n_2, n_3, \ldots, n_{P+1}$ output at different rates from the one output terminal of each of the ½ decimate circuits 142(1)-142(P) are input to multipliers 144(1)-144(P+1) of the weighting circuit 143.

The multipliers 144(1)-144(P+1) multiply the input noise signals $n_1, n_2, n_3, \ldots, n_{P+1}$ by weighting coefficients (characteristic coefficients) $\sigma_1, \sigma_2, \sigma_3, \ldots, \sigma_{P+1}$, respectively, and output the resulting noise signals.

By thus weighting the noise signals $n_1, n_2, n_3, \ldots, n_{P+1}$ at the respective rates, it is possible to arbitrarily set the frequency characteristic for the noise signal u(k) output from the filter unit 125.

Figure 37:
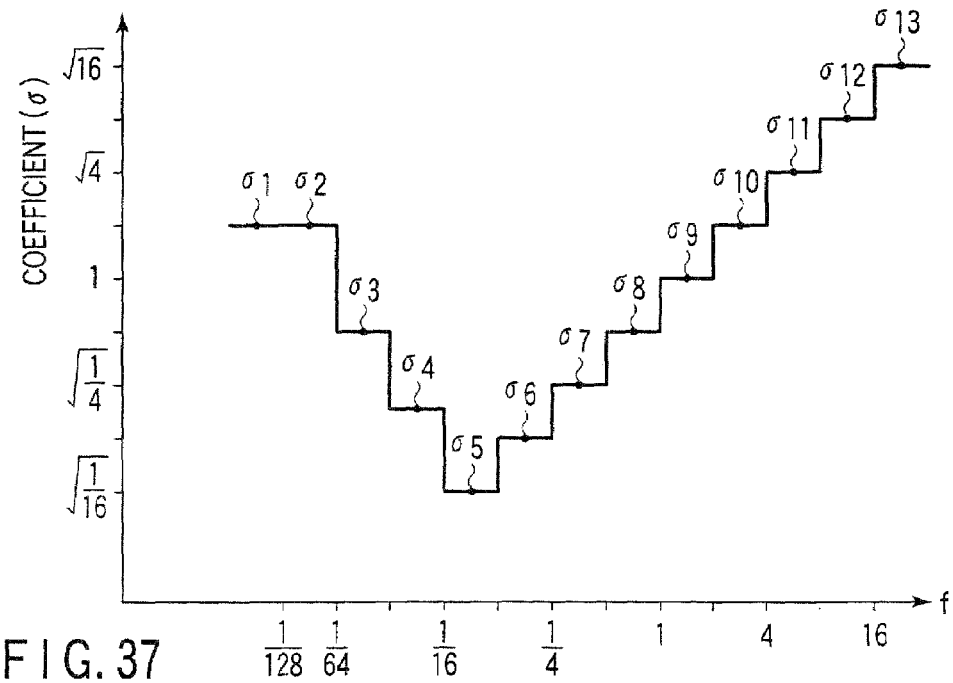
FIG. 37 is a diagram illustrating the operation of the modification example in FIG. 35.

For example, by performing the weighting as illustrated in FIG. 37 (in this figure, P is 12), it is possible to generate a clock signal having phase fluctuations (wander) of a power spectrum density distribution corresponding to a particular TDEV mask characteristic for use in the evaluation of the wander.

In this event, the power spectrum density distribution follows a distribution of square values of σ.

Also, the weighted noise signals $n_1', n_2', n_3', \ldots, n_{P+1}'$ at the respective rates are input to sub-band combiners 146(1)-146(P) of the combiner circuit 145.

Here, each of the sub-band combiners 146(1)-146(P) contains an FIR type LPF (low pass filter) and HPF (high pass filter) having a common cut-off frequency.

Then, each of the sub-band combiners 146(1)-146(P) is configured to interpolate two digital signals input thereto to block a lower band of one input (with the higher frequency) by the HPF, and to block a higher band of the other input (with the lower frequency) by the LPF, and to combine outputs of both filters to output the resulting signal.

It should be noted that the cut-off frequency of the internal filter of each of the sub-band combiners 146(1)-146(P) is set twice as high as the preceding one, corresponding to the rates of the input noise signals, in the order of 2fa, 4fa, 8fa, ..., $2^{P-1}$fa, wherein fa is the cut-off frequency of the internal filter of the sub-band combiner 146(1) having the lowest frequency.

In this way, the respective sub-band combiners 146(1)-146(P) are connected to combine the noise signals in order from the one having the lowest rate.

Figure 38:
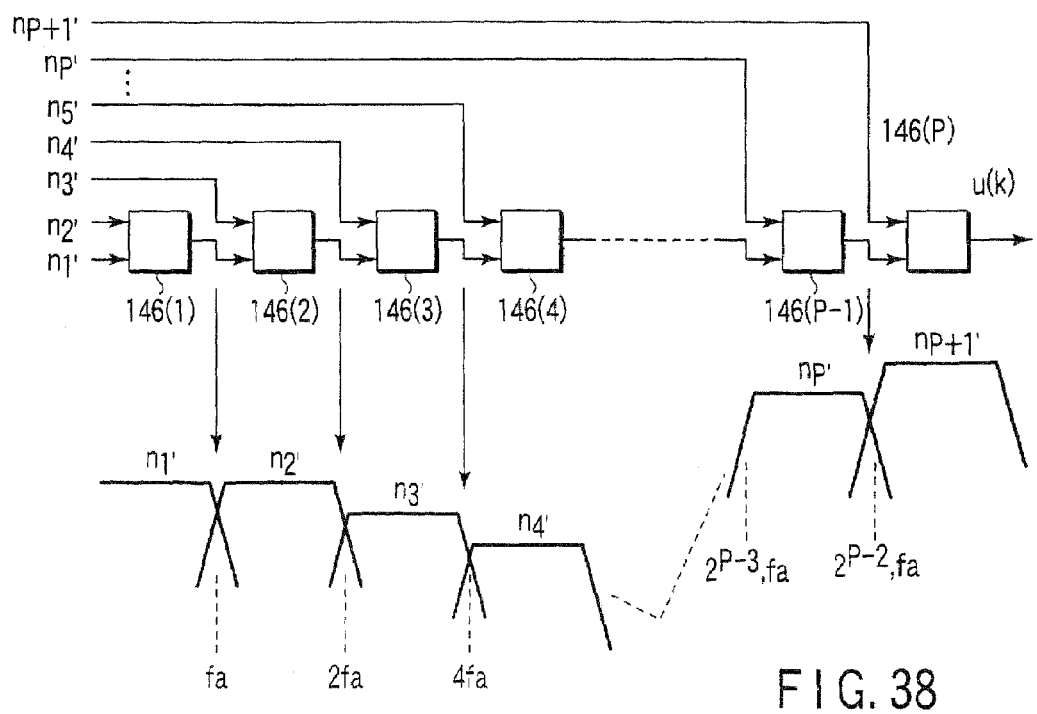
FIG. 38 is a diagram illustrating the operation of the modification example in FIG. 35.

Specifically, as illustrated in FIG. 38, the two noise signals at the lowest rates $n_1'$, $n_2'$ are combined at the cut-off frequency f1 in the sub-band combiner 146(1).

The combined output and the noise signal $n_3'$ are combined at the cut-off frequency 2fa in the sub-band combiner 146(2).

The combined output and the noise signal $n_4'$ are combined at the cut-off frequency 4fa in the sub-band combiner 146(3).

Subsequently, in a similar manner, the noise signals are combined in order from the lowest rate, so that the sub-band combiner 146(P) outputs the noise signal u(k) of the frequency characteristic in which the level in each band of an octave width varies in accordance with the weighting coefficients, as illustrated in FIG. 38.

As described above, with the filter unit 125 comprised of the weighting circuit 143 and the combining circuit 145, filters in the respective sub-band combiners 146 in the combiner circuit 145 have fixed cut-off frequencies, so that the filter coefficients need not be variably controlled. Thus, the weighting coefficients $\sigma_1, \sigma_2, \sigma_3, \ldots, \sigma_{P+1}$ for determining the characteristics of the filters are set by the characteristic coefficient setting means 130.

The initial setting means 131 initially sets a noise signal sequence of the characteristic identical to the contents stored in the respective storage elements in a state in which noise signals of frequency characteristics corresponding to characteristic coefficients (in this event, weighting coefficients) are being output from the filter unit 125 for internal storage element of the filters (digital filters) of the combiner circuit in an initial phase of operation of the apparatus and upon changing the weighting coefficients.

In this event, however, since the signal sequence output from the white noise generating means 121 cannot be simply substituted in the manner described above, initial values to be set in the storage elements of the respective filters are calculated and set therein based on the noise signals and information such as the weighting coefficients from the characteristic coefficient setting means 130 and the like.

Specifically, assuming, as described above, that the noise signal n(1) generated by the white noise generating means 121 in an initial phase of operation is known, the respective noise signals $n_1$-$n_{P+1}$ output from the divider circuit 141 are also known when the white noise generating means 121 generates the noise signal n(1) in a steady state, and the characteristics (transfer functions) of the filters of the respective sub-band combiners 146 in the combiner circuit 145 are also known.

Further, assume that the storage elements in the internal LPF and HPF of the respective sub-band combiners 146(1)-146(P) in the combiner circuit 145 have M stages, similarly to the foregoing.

In this event, M regular noise signals are input to the respective storage elements of the filters of the sub-band combiner 146(P) at the final stage when $2^P \cdot M$ noise signals are input to the sub-band combiner 146(1) at the first stage.

A stored value Li(m) in a storage element at an m-th stage of the LPF and a stored value Hi(m) in a storage element at an m-th stage of the HPF of the i-th (i is any of 1 through P) sub-band combiner 146(i) are expressed by:

$$L_i(m) = \sum_{j=1}^{i+1} \sigma_j \cdot x_j(m)$$

$$H_i(m) = \sum_{j=1}^{i+1} \sigma_j \cdot y_j(m)$$

where $x_j(m)$, $y_j(m)$ are constant sequences (constant sequences when the weighting coefficient is set to one) derived from the transfer functions of the LPF and HPF, and the noise signal output from the white noise generating means 121.

As described above, the transfer functions of the LPF and HPF, and the noise signal output from the white noise generating means 121 are known.

Therefore, the noise signal u(k) of a desired characteristic can be immediately output if the constant sequences $x_j(m)$, $y_j(m)$ have been previously found and stored in the memory 131a, and initial values are derived for the filters through the foregoing calculations and set in the respective sub-band combiners 146(1)-146(P) in an initial phase of operation or upon changing the weighting coefficients.

The total number of times of performed product sum calculations is:

$$M[(P+1)^2 + (P+1)-2]$$

With M=24, P+1=20, the total number of times amounts to 10032, so that the product sum calculations can be completed in a short time.

Then, the initial setting means 131 sets the initial values $L_1(1)$-$L_1(M), L_2(1)$-$L_2(M), \ldots, L_P(1)$-$L_P(M), H_1(1)$-$H_1(M), H_2(1)$-$H_2(M), \ldots, H_P(1)$-$H_P(M)$, derived by the calculations, in the storage elements of the internal LPFs and HPFs of the respective sub-band combiners 146(1)-146(P) in the combiner circuit 145, and instructs the white noise generating means 121 to output noise signals.

If this initial setting were actually performed by inputting the noise signals from the white noise generating means 121, $2^P \cdot M$ noise signals must be input as mentioned above, resulting in about 70 hours taken therefor, assuming that the input rate is 50 Hz.

Also, even if the input rate is increased only during the initial setting, the total number of times of product sum calculations required for the combiner circuit 145 to calculate $2^P \cdot M$ noise signals is $2M^2(2^P-1)$, so that product sum calculations are required 60205 times more, assuming M=24, P+1=20 similarly to the foregoing, needing a long time.

In this way, by initially setting the respective storage elements of the digital filters in the filter unit 125 in an initial phase of operation or upon changing the characteristic coefficients, the internal state of the filter unit 125 is immediately set to the state identical to the steady state, so that the filter unit 125 can promptly output the noise signals of frequency characteristic in accordance with characteristic coefficients (in this event, weighting coefficients) set by the characteristic coefficient setting means 130.

FIG. 39 illustrates the general configuration of a wander generator 150 according to the present invention which includes the configuration of the noise generating unit 120 described above.

In FIG. 39, white noise generating means 121, a filter unit 125, characteristic coefficient setting means 130, initial setting means 131, a multiplier 132 and amplitude setting means 133 are identical to those in the noise generating unit 120.

This wander generator 150 inputs an output y(k) of the multiplier 132 to a frequency synthesizer 151.

The frequency synthesizer 151, which is comprised, for example, of DDS, a phase locked loop (PLL) oscillator and the like, has a predetermined center frequency, and outputs a clock signal CK which has a phase (i.e., the frequency) modulated in accordance with the output y(k) of the multiplier 132.

On the other hand, characteristic calculating means 134' calculates the characteristic of the noise signal y(k) or the characteristic of wander in the clock signal CK based on characteristic coefficients from the characteristic coefficient setting means 130; an amplitude coefficient A of the amplitude setting means 133, and parameters set from an manipulation unit or the like, not shown.

For example, as an evaluation amount of wander that is phase fluctuations at 10 Hz or less, there are TIErms ($\tau$) (Root Mean Square Time Interval Error), ADEV ($\tau$) (Allan Deviation), MADEV ($n\tau 0$) (Modified Allan Deviation), TDEV ($n\tau 0$) (Time Deviation), and the like.

If they were actually measured for a clock signal CK, a very long time (several hours or longer) would take as mentioned above.

Therefore, the wander generator 150 selectively finds the characteristic of the wander by performing the following equations in the characteristic calculating means 134':

$$TIErms(\tau) = \left[8\int Sx(f)\sin^2(\pi f\tau)df\right]^{1/2}$$

$$ADEV(\tau) = \left[(16/\tau^2)\int Sx(f)\sin^4(\pi f\tau)df\right]^{1/2}$$

$$MADEV(n\tau_0) = \left\{[16/(n^2\tau_0)^2]\int [\sin^6(\pi fn\tau_0)/\sin^2(\pi f\tau_0)] \cdot Sx(f)df\right\}^{1/2}$$

(where $n = 0, 1, 2, \ldots, N$)

$$TDEV(n\tau_0) = \left\{(16/3n^2)\int [\sin^6(\pi fn\tau_0)/\sin^2(\pi f\tau_0)] \cdot Sx(f)df\right\}^{1/2}$$

(where $n = 0, 1, 2, \ldots, N$)

$$Sx(f) = fc[(\sigma_a \cdot u \cdot A)\sin(\pi f/f_s)/2\pi f\sin(\pi f/f_c)]^2 \cdot |H(e^{j\pi f/fs})|^2$$

The symbol $\int$ represents integration for f=0–f=fh; the parameter fh is a maximum frequency of noise; $\tau$ is a measuring time; $\tau_0$ is a measurement sampling time; $\sigma_a$ is a standard deviation of the white noise; $f_s$ is a sampling frequency of the white noise generating means 121; u is a quantization step of DDS when the frequency synthesizer 151 is comprised of DDS; and $f_c$ is a clock frequency of a D/A converter of the same.

Also, A is an amplitude coefficient from the amplitude setting means 133; $|H(e^{j\pi f/fs})|$ is a frequency characteristic calculated based on the characteristic coefficient set by the characteristic coefficient setting means 131; and Sx(f) is the power spectrum of a time error calculated based on the characteristic coefficient set by the characteristic coefficient setting means 131.

The characteristics derived by the calculations as above are displayed on the display 136 by the characteristic display means 135 as numerical values or a graph.

Thus, the foregoing calculations are performed based on the characteristic coefficients, amplitude coefficient and parameters without measuring an actual clock signal, so that the characteristics can be found in a short time.

In this way, it is possible to confirm beforehand the characteristic of the noise signal, and the characteristic of wander in a clock signal which is frequency modulated by the noise signal when a signal is output.

While the foregoing embodiment has been described for the case where the digital filter included in the filter unit 125 is a finite impulse response (FIR) type, this does not limit the present invention.

Specifically, any digital filter may be used as long as it performs the processing while input data is shifted into a plurality of internal storage elements. For example, an infinite impulse response (IIR) type digital filter may be applied as well in a similar manner.

The white noise generating means 121 in the wander generator 150 sequentially outputs the white noise signal n(k) comprised of a plurality of bits at a constant rate determined by the clock signal CKn in accordance with a predetermined algorithm determined by an internal structure of the pseudo random signal generators 122(1)-122(N).

Therefore, the white noise generating means 121 corresponds to the random number generating means in the aforementioned inventions (1), (2), similarly to the random number generating means 25 in the wander generators 21, 21'.

Also, the filter unit 125 filters a signal sequence output from the white noise generating means 121.

Therefore, the filter unit 125 corresponds the filter unit in the aforementioned inventions (1), (3), (4), (5), similarly to the convolution processing means 28, data distributing means 51, weighting means 54 and combining means 56 of the wander generators 21, 21'.

Also, the frequency synthesizer 151 corresponds to the clock generating means and the modulating means in the aforementioned invention (1) since it outputs the clock signal CK which has the frequency modulated by the output of the filter unit 125.

Also, the characteristic coefficient setting means 130 provides the filter unit 125 with coefficients which determine the frequency characteristics of a signal sequence output from the filter unit 125 such that the characteristic of wander in the clock signal output from the frequency synthesizer 151 matches a desired characteristic.

Therefore, the characteristic coefficient setting means 130 corresponds to the setting means in the aforementioned inventions (1), (4), (5).

Then, the wander generator 150, as is the case of the aforementioned wander generators 21, 21' comprises random number generating means for sequentially generating a random number signal comprised of a plurality of bits at a constant rate in accordance with a predetermined algorithm; a filter unit for receiving a sequence of random number signals output from the random number generating means for performing filtering; clock generating means for generating a clock signal; modulating means for modulating the frequency of the clock signal generated by the clock signal generator by a signal output from the filter unit; and setting means for setting each amplitude value for a spectrum of a signal sequence output from the filter unit such that the characteristic of wander of the clock signal having the frequency modulated by the modulating means matches a desired characteristic, so that a clock signal of a desired wander characteristic can be readily generated.

Therefore, the wander generator 150 can readily generate a clock signal having wander of a desired characteristic.

Also, the initial setting means 131 of the wander generator 150 initially sets values equivalent to stored values stored in the respective storage elements in a steady state in which a clock signal having wander of a desired characteristic is being output in the storage elements included in the filter unit 125 through a path different from a signal input path in a steady state.

Therefore, the initial setting means 131 corresponding to the initial setting means in the aforementioned invention (6).

In this way, the wander generator 150 sets initial values in the storage elements in the filter unit 125 by means of the initial setting means 131, thereby making it possible to promptly output a clock signal having a desired wander characteristic.

Also, the characteristic calculating means 134' of the wander generator 150 calculates the characteristic of the wander in the frequency-modulated clock signal based on information including the signals set in the filter unit 125 from the characteristic coefficient setting means 130.

Therefore, the characteristic calculating means 134' corresponds to the characteristic calculating means in the aforementioned invention (7).

Also, the characteristic display means 135 displays the wander characteristic found by the characteristic calculating means 134', so that it corresponds to the characteristic display means in the aforementioned invention (7).

Thus, the wander generator 150 calculates the characteristic of the wander in the frequency-modulated clock signal based on the information including the signals set in the filter unit 125 from the characteristic coefficient setting means 130, and displays the calculated wander characteristic, so that the characteristic can be conveniently known beforehand without measuring the wander characteristic of an actually output clock signal.

It should be noted that the foregoing wander generator 150 may be used instead of the wander generators 21, 21' of the digital line tester 20.

In this event, the characteristic of wander calculated by the characteristic calculating means 134' is displayed on the display device 47 through the display control means 46.

As explained above, the wander generator according to the aforementioned invention (1) comprises random number generating means (25, 121) for sequentially generating a random number signal comprised of a plurality of bits at a constant rate in accordance with a predetermined algorithm; a filter unit (28, 125) for receiving a sequence of random number signals output from the random number generating means for performing filtering; clock generating means (30, 31, 151) for generating a clock signal; modulating means (30, 151) for modulating the frequency of the clock signal generated by the clock signal generator by a signal output from the filter unit; and setting means (23, 26, 130) for setting each amplitude value for a spectrum of a signal sequence output from the filter unit such that the characteristic of wander of the clock signal having the frequency modulated by the modulating means matches a desired characteristic, so that a clock signal of a desired wander characteristic can be readily generated.

Also, as to the wander generator according to the aforementioned invention (2), in the wander generator as set forth in the aforementioned (1), the random signal generating means has a plurality of pseudo random signal generator, wherein the plurality of pseudo random signal generators combine pseudo random signals generated thereby respectively, and random number signals comprised of the plurality of bits is sequentially generated at a constant speed, thereby making it possible to make the random number signal extremely close to an ideal white noise and more accurately generate a clock signal of a desired wander characteristic.

Also, as to the wander generator according to the invention (3), in the wander generator as set forth in the aforementioned (1), the filter unit includes a plurality of storage elements for storing an input signal sequence while sequentially shifting it; and calculating means for performing a product sum calculation of stored values stored in the plurality of storage elements with a plurality of coefficients, thereby making it possible to correctly perform the filtering through the calculation and more accurately generate a clock signal of a desired wander characteristic.

Also, the wander generator according to the aforementioned invention (4) is characterized in that, in the wander generator as set forth in the aforementioned (3), the filter unit is configured to store a random number signal sequence output from the random number generating means in the plurality of storage elements, perform the product sum calculation by means of the calculating means, and filter the random number signal sequence, wherein the setting means sets the plurality of coefficients in the calculating means as signals for setting respective amplitude values for spectra of the signal sequence output from the filter unit, thereby making it possible to generate a clock signal of a desired wander characteristic in a simple configuration.

Also, the wander generator according to the aforementioned invention (5) is characterized in that, in the wander generator as set forth in the aforementioned (3), the filter unit comprises data distributing means (51, 141) for distributing the random number signal sequence generated by the random number signal generating means into a plurality of paths having different rates from each other; weighting means (54, 143) for weighting a signal sequence for each of the paths distributed by the data distributing means with a previously set coefficient for each of the paths; and combining means (56, 145) for combining the signal sequences on the respective paths weighted by the weighting means by means of a plurality of sub-band combiners comprised of a plurality of storage elements and calculating means and for outputting the result of the combination as the result of filtering, wherein the setting means sets the plurality of weighting coefficients in the weighting means of the filter unit as signals for setting respective amplitude values for spectra of the signal sequence output from the filter unit, thereby making it possible to set the wander characteristic of an output clock signal with a higher degree of freedom.

Also, the wander generator according to the aforementioned-invention (6), in the wander generator as set forth in any of the aforementioned (3) through (5), comprises initial setting means (131) for initially setting values equivalent to stored values stored in the respective storage elements in a steady state in which the clock signal having the wander of the desired characteristic is being output to the respective storage elements included in the filter unit at least in an initial phase of operation of the apparatus through a path different from a signal input path in the steady state, thereby making it possible to immediately output a clock signal having a desired wander characteristic and rapidly start a measurement.

Also, the wander generator according to the aforementioned invention (7), in the wander generator as set forth in the foregoing (1), comprises characteristic calculating means (134') for calculating a characteristic of wander in a clock signal frequency-modulated by the modulating means based on information including a signal set in the filter unit from the setting unit; and characteristic display means (135) for displaying the characteristic calculated by the characteristic calculating means, so that the wander characteristic of an actually output clock signal can be conveniently confirmed beforehand.

Also, the digital line apparatus according to the aforementioned invention (8) comprises a wander generator unit (21, 40) for generating a test signal having wander; and a wander measuring unit (41, 43) for evaluating a signal passing through a digital line under testing from the wander generator unit, wherein the wander generator unit includes the wander generator set forth in any of the aforementioned (1) through (7), and is configured to output a test signal synchronized with a clock signal output from the wander generator, thereby making it possible to output a test signal synchronized with a clock signal of a desired wander characteristic to a digital line under testing, and measure the wander characteristic of the signal passing through the digital line.

Also, the wander generator according to the aforementioned invention (9), which is a wander generator for generating a clock signal having wander which satisfies a desired time deviation characteristic, comprises center frequency information setting means (22) for setting data for determining a center frequency of the clock signal; characteristic information setting means (23) for setting characteristic information of the desired time deviation characteristic; a fluctuating signal sequence generator unit (24) for generating a fluctuating signal sequence having a power spectrum density distribution characteristic of frequency fluctuations corresponding to the desired time deviation characteristic based on characteristic information set by the characteristic information setting means; an adder (29) for adding data set by the center frequency information setting means to the fluctuating signal sequence output from the fluctuating signal sequence generator unit; a direct digital synthesizer (30) for outputting a frequency signal corresponding to an output of the adder; and a clock signal output circuit (31) for waveform shaping an output signal of the direct digital synthesizer to output a clock signal, thereby making it possible to readily generate a clock signal having a desired time deviation characteristic.

Also, as to the wander generator according to the aforementioned invention (10), in the wander generator as set forth in the aforementioned (9), the fluctuating signal sequence generator unit comprises noise generating means (25) for generating a white noise signal based on a pseudo random signal; impulse response processing means (26) for calculating an impulse response of a transfer function for approximating a power spectrum of a white noise signal output from the noise generating means to a power spectrum density distribution characteristic of the frequency fluctuations based on the characteristic information set by the characteristic information setting means; and convolution processing means (28) for convoluting the result of the calculation by the impulse response processing means with the missourians white noise signal output from the noise generating means to generate a fluctuating signal sequence having the power spectrum density distribution characteristic of the frequency fluctuations, thereby making it possible to accurately generate a clock signal having wander which satisfies a desired time deviation characteristic.

Also, the wander generator according to the aforementioned invention (11) is characterized in that, in the wander generator as set forth in the aforementioned (10), the impulse response processing means corrects an impulse response with a correction function corresponding to an error between the power spectrum density distribution characteristic of the frequency fluctuations and the transfer function, thereby making it possible to more accurately generate a clock signal having wander which satisfies a desired time deviation characteristic.

Also, the wander generator according to the aforementioned invention (12) is characterized in that, in the wander generator as set forth in the aforementioned (10), the convolution processing means preferentially performs the product sum calculation for smaller absolute values of the result of the calculation for the impulse response, thereby making it possible to reduce errors in floating point calculations.

Also, the wander generator according to the aforementioned invention (13) is characterized in that, in the wander generator as set forth in the aforementioned (10), the impulse response processing means is configured to perform the calculation for the impulse response each time a white noise signal is output from the noise generating means, and the convolution processing means performs the convolution processing using the result of the calculation made each time by the impulse response processing means, thereby making it possible to save the memory and simplify the hardware configuration of the apparatus.

Also, as to the wander generator according to the aforementioned invention (14), in the wander generator as set forth in the aforementioned (9), the fluctuating signal sequence generator unit comprises noise generating means (25) for generating a white noise signal based on a pseudo random signal; data distributing means (51) for distributing noise signals output from the noise generating means into signal paths respectively in accordance with a plurality of bands into which a frequency range of a power spectrum density distribution characteristic of the frequency fluctuations is divided to output at rates corresponding to the respective bands; weighting means (54) for applying weights in accordance with the magnitude of spectrum of each of the bands into which the frequency band of the power spectrum density distribution characteristic is divided for the noise signals at the respective rates distributed by the data distributing means; and combining means (56) for combining the noise signals at the respective rates weighted by the weighting means to generate a fluctuating signal sequence having the power spectrum density distribution characteristic of the frequency fluctuations, thereby making it possible to generate a fluctuating signal of an arbitrary power spectrum density distribution characteristic and readily generate a clock signal of a complicated TDEV mask characteristic which is difficult in calculating the impulse response.

Also, as to the wander generator according to the aforementioned invention (15), in the wander generator as set forth in the aforementioned (10), the noise generating means has a plurality (m) of sets of pseudo random signal generating means for generating pseudo random codes of M sequence at initial phases different from one another, and is configured to collect outputs at predetermined stages of the respective pseudo random signal generating means to output an m-bit parallel white noise signal, thereby making it possible to make the white noise signal extremely close to ideal white noise, and more accurately generate a clock signal having wander which satisfies a desired time deviation characteristic.

Also, the digital line tester according to the aforementioned invention (16) comprises a wander generator (21) for generating a clock signal having wander which satisfies a defined time deviation characteristic; a transmission unit (40) for sending a digital signal synchronized with the clock signal output from the wander generator to a digital line under testing; a reception unit (41) for receiving the digital signal returned from the digital line under testing and restoring a clock signal of the received digital signal; an error measuring unit (42) for measuring errors in the digital signal received by the reception unit; a time deviation measuring unit (43) for measuring a time deviation characteristic of the clock signal, restored by the reception unit; a display device (47); and display control means (46) for displaying the result of measurements of the error measuring unit and the time deviation characteristic measured by the time deviation measuring unit on the display unit such that it can be compared with the defined time deviation characteristic, thereby making it possible to readily and efficiently evaluate the wander on the digital line under testing and readily compare a change in the wander due to the digital line on the display screen.

Also, the digital line tester according to the aforementioned invention (17) is characterized in that, in the digital line tester as set forth in the aforementioned (16), the wander generator is the wander generator set forth in the foregoing (9) through (15), thereby making it possible to send a digital signal synchronized with a clock signal having wander which satisfies a desired time deviation to the line under testing, correctly evaluate the line, and reduce the size of the apparatus.

Also, the wander generator according to the aforementioned invention (18) comprises white noise generating means (121) for generating a digital white noise signal; a filter unit (125) having a digital signal for storing a digital signal in a plurality of internal storage elements while sequentially shifting thereinto and performing product sum calculations for the contents stored in the plurality of storage element for converting a noise signal output from the white noise generating means to a noise signal of a frequency characteristic corresponding to a previously set characteristic coefficient to output the noise signal; characteristic coefficient setting means (130) for setting arbitrary characteristic coefficient in the filter unit; a multiplier (132) for multiplying a noise signal output from the filter unit by an amplitude coefficient; amplitude setting means (133) for setting an arbitrary coefficient to the multiplier; a frequency synthesizer (51) for outputting a clock signal which is phase modulated by a noise signal output from the multiplier; and initial setting means (131) for initially setting a noise signal sequence equivalent to the contents stored in the respective storage elements of the digital filter in a state in which a noise signal of a frequency characteristic corresponding to the characteristic coefficient is being output from the filter unit in the respective storage elements of the digital filter at least in an initial phase of operation of the apparatus, so that the internal state of the filter unit is immediately set in the state identical to the steady state in the initial phase of operation and the like, thereby making it possible to promptly output a clock signal which is phase modulated by a noise signal of a frequency characteristic in accordance with a characteristic coefficient set by the characteristic coefficient setting means.

Also, the wander generator according to the aforementioned invention (19) comprises white noise generating means (121) for generating a digital white noise signal; a filter unit (125) having a digital signal for storing a digital signal in a plurality of internal storage elements while sequentially shifting thereinto and performing product sum calculations for the contents stored in the plurality of storage element for converting a noise signal output from the white noise generating means to a noise signal of a frequency characteristic corresponding to a previously set characteristic coefficient to output the noise signal; characteristic coefficient setting means (130) for setting arbitrary characteristic coefficient in the filter unit; a multiplier (132) for multiplying a noise signal output from the filter unit by an amplitude coefficient; amplitude setting means (133) for setting an arbitrary coefficient to the multiplier; a frequency synthesizer (151) for outputting a clock signal which is phase modulated by a noise signal output from the multiplier; characteristic calculating means (134, 134') for calculating a characteristic of a noise signal output from the multiplier or a clock signal output from the frequency synthesizer based on a characteristic coefficient set by the characteristic coefficient setting means and an amplitude coefficient set by the amplitude setting means; and characteristic display means (135) for displaying the characteristic calculated by the characteristic calculating means, so that the characteristic of the noise signal or the clock signal can be conveniently known beforehand without actually measuring it.

Next, an embodiment of a phase noise transfer characteristic analyzer according to the present invention will be explained.

Figure 40:
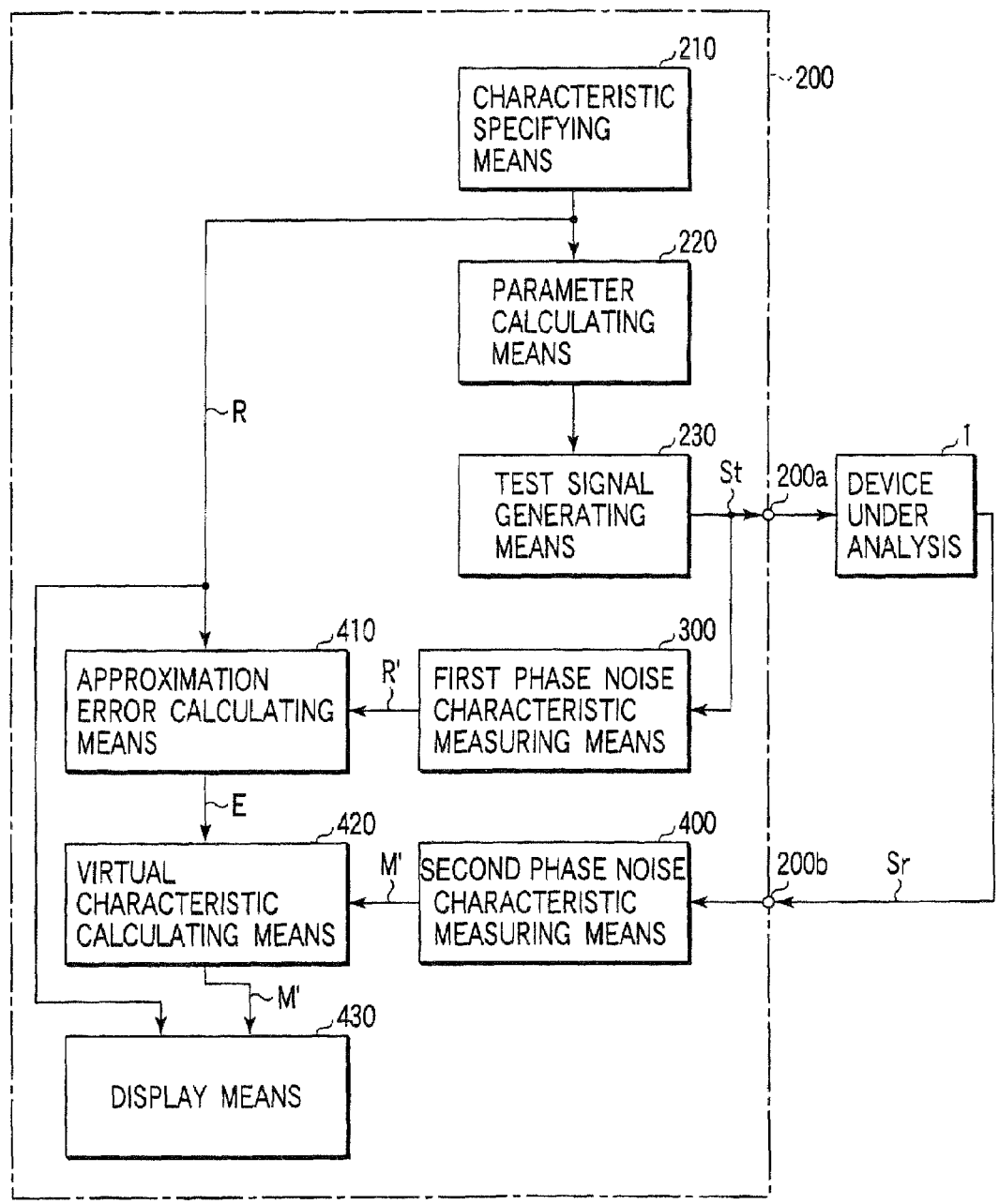
FIG. 40 is a block diagram illustrating the configuration of one embodiment of a phase noise transfer characteristic analyzer according to the present invention.

FIG. 40 illustrates the configuration of an embodiment of a phase noise transfer characteristic analyzer 200 corresponding to the phase noise transfer characteristic analyzer according to the aforementioned invention (20).

In FIG. 40, characteristic specifying means 210 specifies an arbitrary phase noise characteristic R including the aforementioned standardized characteristics through manipulations on a manipulation unit or the like, not shown, and specifies, for example, a characteristic of TDEV or the like for use in evaluating wander.

Parameter calculating means 220 in turn calculates parameters required for test signal generating means 230 to generate a test signal for a phase noise characteristic specified by the characteristic specifying means 210, and outputs the parameters to the test signal generating means 230.

The test signal generating means 230 generates a test signal St having a phase noise characteristic determined by parameters calculated by the parameter calculating means, and outputs the test signal St from an output terminal 200a.

Here, the test signal generating means 230 comprises, for example, a white noise generator unit 240, a filter 250, a clock modulator 260, and a data generator 270, as illustrated in FIG. 41.

The white noise generator 240 in turn outputs a digital noise signal N of a white Gaussian nature which has the amplitude uniformly distributed over a wide band.

The white noise generator 240 generates, for example, a noise signal by combining or adding outputs of a plurality of pseudo random signal generators of the same code sequence with the phases of output codes shifted from one another such that the codes are not correlated with one another.

The filter 250, which has a digital filter for storing a digital signal sequence while sequentially shifting it into a plurality of internal storage elements, performs product sum calculations for the contents stored in the plurality of storage elements, and converts a noise signal N output from the noise generator 240 to a noise signal N' of a frequency characteristic corresponding to a previously set coefficient and outputs the noise signal N'.

The filter 250 used herein may be one comprised of a single digital filter, the frequency coefficient of which is determined by a filter coefficient, or that configured to divide an input signal into bands by a plurality of digital filters and multiply signals in the respective bands by weighting coefficients for combination.

Also, the clock modulator 260, which is comprised, for example, of DDS, a PLL oscillator or the like, has a predetermined center frequency, and outputs a clock signal, the phase of which is modulated in accordance with the noise signal N' from the filter 250 to the data generator 270.

The data generator 270 outputs a predetermined pattern signal synchronism with the clock signal CK as a test signal St.

It should be noted that a pattern signal synchronized with the clock signal CK from the data generator 270 is used herein as the test signal St.

Alternatively, the clock signal Ck output from the clock modulator 260 may be directly output as a test signal without passing through the data generator 270.

In the test signal generating means 230 which generates a test signal that is phase modulated by a noise signal, the band of which is limited by the filter 250, a phase noise characteristic of the test signal depends on the characteristics of the filter 250.

Then, the characteristics of the filter 250 is determined by parameters such as the aforementioned filter coefficients, weighting coefficients, and the like.

For this reason, the parameter calculating means 220 calculates a filter coefficient for approximating the phase noise characteristic of the test signal St to a phase noise characteristic R specified by the characteristic specifying means 210 or a weighting coefficient as a parameter which is set in the filter 250.

The test signal St generated by the test signal generating means 230 is also input to a device 1 under analysis through an output terminal 200a as well as input to first phase noise characteristic measuring means 300.

The first phase noise characteristic measuring means 300 measures a phase noise characteristic R' output from the test signal generating means 230.

In the first phase noise characteristic measuring means 300, for example, as illustrated in FIG. 42, a clock signal CK is first extracted from the test signal St by a clock extracting circuit 310.

Next, a phase comparator 320 detects a phase difference between this clock signal CK and a reference clock CKr.

Then, a filter 330 extracts a wander component or a jitter component from the detected signal.

Here, an A/D converter 340 samples the extracted signal component at a predetermined sampling period for sampling to convert to a digital value.

This digital value is output to a characteristic calculating unit 350 as TIE data.

Alternatively, the clock extracting circuit 310 may be omitted such that the clock signal CK output from the clock modulator 260 of the test signal generating means 230 is directly input to the phase comparator 320.

The characteristic calculating unit 350 calculates the phase noise characteristic R' of the test signal St based on the TIE data.

For example, for finding a TDEV characteristic of wander, the characteristic calculating unit 350 performs the following calculation:

$$TDEV(\tau) = \{(1/6n^2)(1/m) \cdot \sum_{j=1}^{m} [\sum_{j=i}^{n+j-1}(x_{i+2n} - 2x_{i+n} + x_i)]^2\}^{1/2}$$

where $m = N - 3n + 1$, $x_i$ is the TIE data, N is the total number of samples, $\tau$ is an integration time ($\tau = n\tau_0$), n is the sampling number ($n = 1-3/N$), $\tau_0$ is a sampling period, and the symbol $j=1\Sigma m$ represents the total sum of $j=1-m$.

$TDEV(\tau)$ is found based on all TIE data over a measuring time 12 times a maximum integration time.

For example, for finding $TDEV(1000)$ for $\tau=1000$ seconds when the sampling period $\tau_0$ is $1/80$ seconds (12.5 mS), the above equation is solved using measurement data over 12000 seconds (80 samples/second × 1000 seconds × 12 = 960000 samples).

A signal Sr output from the device 1 under analysis which has received the test signal St is input to second phase noise characteristic measuring means 400 through an input terminal 200b.

The second phase noise characteristic measuring means 400 is identical in configuration to the aforementioned first phase noise characteristic measuring means 300, and measures a phase noise characteristic M of the input signal Sr in parallel with the measurement of the test signal by the first phase noise characteristic measuring means 300.

It should be noted that, as described later, instead of the first phase noise characteristic measuring means 300, phase noise characteristic calculating means 510 may be used for finding the phase noise characteristic R' of the test signal St based on a parameter output from the parameter calculating means 220 through a calculation.

Approximation error calculating means 410 calculates a difference between the phase noise characteristic R specified by the characteristic specifying means 210 and the phase noise characteristic R' measured by the first phase noise characteristic measuring means 300 as an approximation error E.

Virtual characteristic calculating means 420 corrects the phase noise characteristic M measured by the second phase noise characteristic measuring means 400 with the approximation error E calculated by the approximation error calculating means 420 to calculate a virtual phase noise characteristic M' of a signal which is output when assuming that the device 1 under analysis has received a test signal of the phase noise characteristic R specified by the characteristic specifying means 120.

Display means 430 displays the phase noise characteristic R specified by the characteristic specifying means 300 and the virtual phase noise characteristic M' calculated by the virtual characteristic calculating means 420 in such a manner that a difference therebetween can be understood.

Assume that the display means includes an image display and a printer for visibly outputting the characteristics.

Next, the operation of the phase noise transfer characteristic analyzer 200 will be explained.

First, for analyzing a transfer characteristic for the TDEV characteristic of wander as described above, the characteristic specifying means 210 specifies a characteristic R of TDEV, the slope k of which varies from $\alpha$ to $\beta$ and to $\gamma$ on boundaries located at integration times $\tau 1$, $\tau 2$, for example, as illustrated in FIG. 43.

Responsively, the parameter calculating means 220 calculates parameters required for the test signal generating means 230 to generate the test signal St of a phase noise characteristic approximate to this characteristic R based on the integration times $\tau 1$, $\tau 2$, the value of the slope k, and the like, and sets the parameters in the test signal generating means 230.

Consequently, the test signal generating means 230 generates the test signal St having a characteristic R' approximate to the characteristic R, as illustrated in FIG. 43.

Then, the test signal St is input to the device under analysis 1 through an output terminal 200a.

At this time, the first phase noise characteristic measuring means 300 is applied with the test signal St.

The second phase noise characteristic measuring means 400 in turn is applied with the output signal Sr of the device 1 under analysis through the input terminal 200b.

Here, the respective phase noise characteristic measuring means 300, 400 measure the phase noise characteristic in parallel.

Then, as the respective phase noise characteristic measuring means 300, 400 have ended the measurements of the phase noise characteristic, the first phase noise characteristic measuring means 300 generates the characteristic R' of TDEV of the test signal St illustrated in FIG. 44.

The characteristic R' generated by the first phase noise characteristic measuring means 300 is input to the approximation error calculating means 410 together with the characteristic R specified by the characteristic specifying means 210, thereby calculating the approximation error E of the characteristic R' with respect to the characteristic R, for example, as illustrated in FIG. 45.

On the other hand, the second phase noise characteristic measuring means 400 generates a characteristic M of TDEV of an output signal Sr which has a larger value of TDEV than the characteristic R' of the test signal St over the entire range, for example, as illustrated in FIG. 46.

Figure 47:
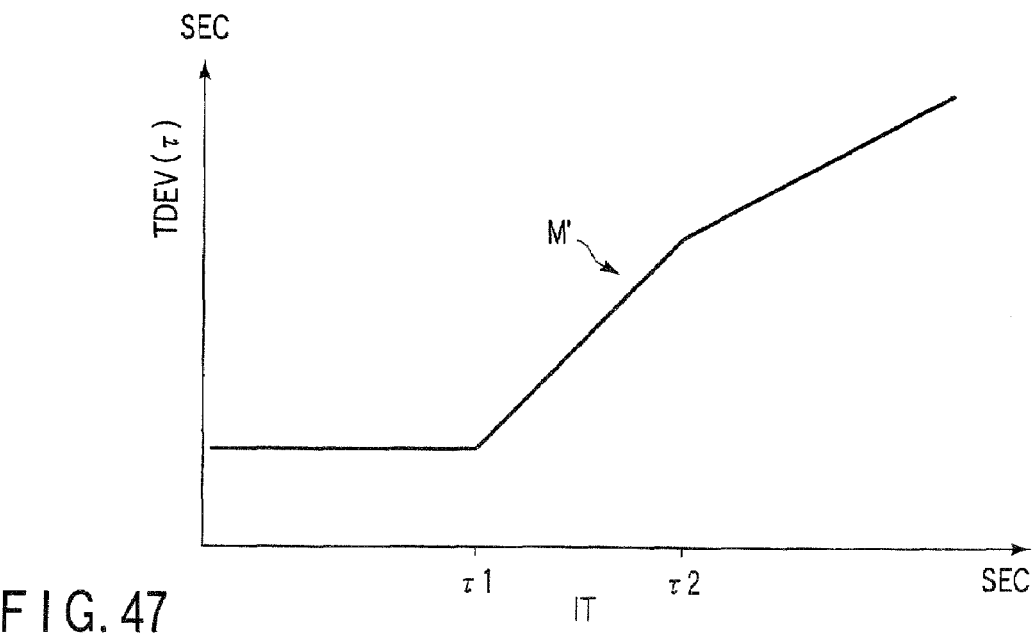
FIG. 47 is a virtual characteristic diagram derived by a correction to the approximation error for explaining the operation of the main portion in FIG. 40.

This characteristic M is input to the virtual characteristic calculating means 42 together with the approximation error E. After the approximation error E is corrected by the characteristic M, a virtual characteristic M' of an output signal when assuming that a test signal of the characteristic R has been input to the device 1 under analysis is generated, as illustrated in FIG. 47.

Figure 48:
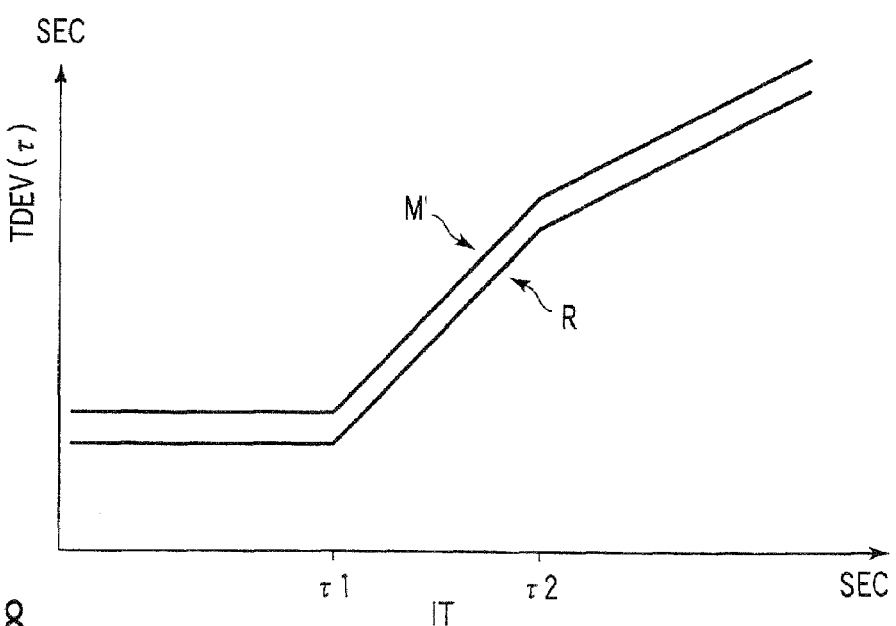
FIG. 48 is a diagram illustrating an exemplary display of characteristics for explaining the operation of the main portion in FIG. 40.

This virtual characteristic M' and the characteristic specified by the characteristic specifying means 210 are displayed for comparison as illustrated in FIG. 48.

The two characteristics displayed herein are not measured characteristics but logical ones.

Thus, since both correspond to each other, a difference therebetween can be correctly seen by simply comparing both with each other.

In this way, in the phase noise transfer characteristic analyzer according to this embodiment, the phase noise characteristic R' of the test signal St actually input to the device 1 under analysis, and the phase noise characteristic M of the output signal Sr of the device 1 under analysis are measured in parallel by the first phase noise characteristic measuring means 300 and the second phase noise characteristic measuring means 400.

Then, the virtual phase noise characteristic M' derived from the results of the measurements and the specified phase noise characteristic R are displayed such that the difference therebetween can be seen.

It is therefore possible to correctly know the difference between the specified phase noise characteristic R and the virtual characteristic M, i.e., the phase noise transfer characteristic of the device 1 under analysis for the specified phase noise characteristic R in a short measuring time.

Since the foregoing phase noise transfer characteristic analyzer 200 has two phase noise characteristic measuring means 300, 400, the configuration is rather complicated.

Figure 49:
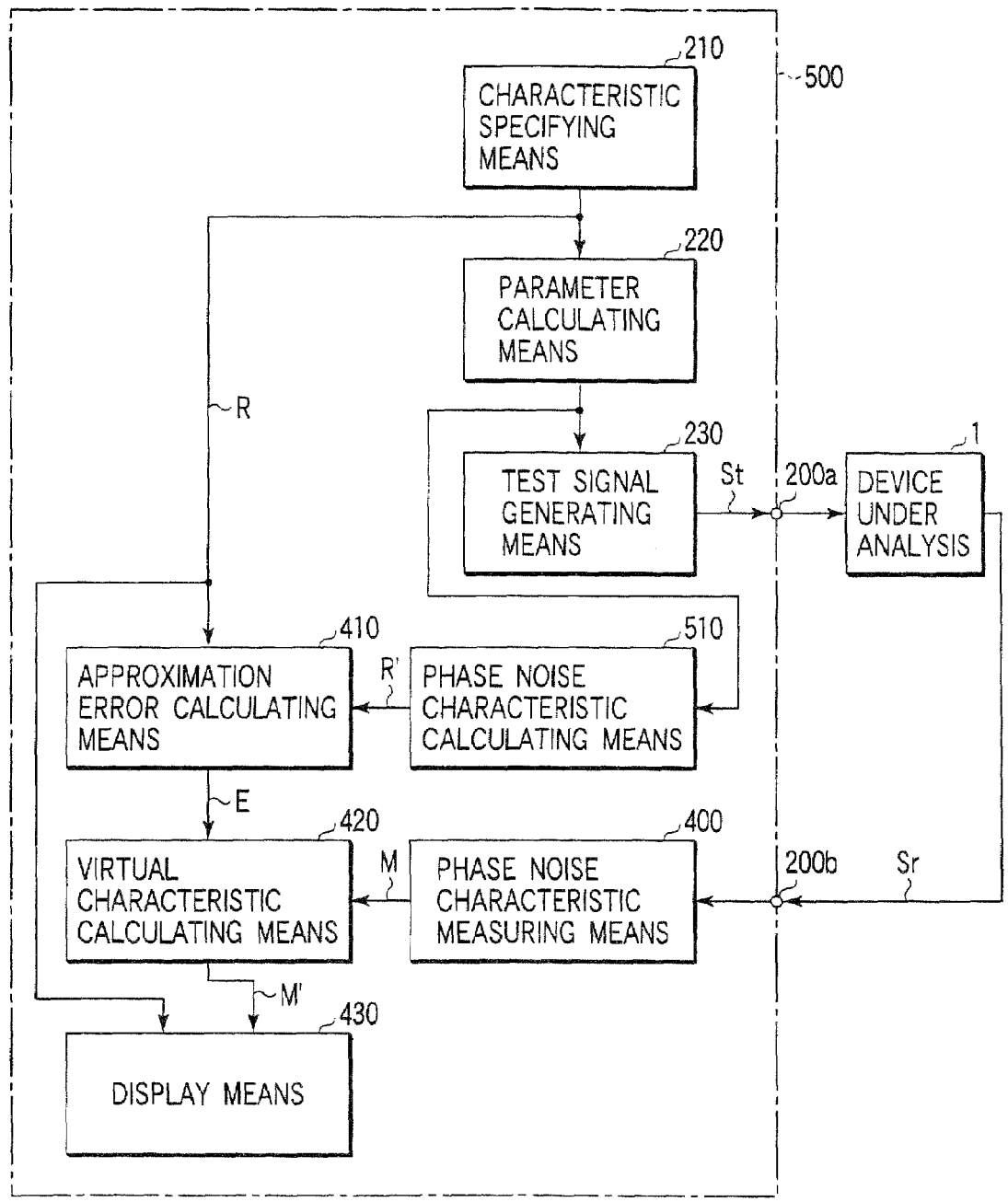
FIG. 49 is a diagram illustrating another embodiment of a phase noise transfer characteristic analyzer according to the present invention.
Figure 50:
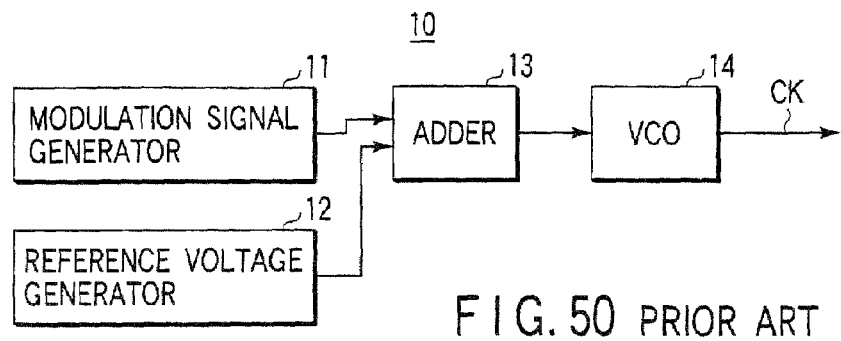
FIG. 50 is a block diagram illustrating the configuration of a conventional wander generator.
Figure 52:
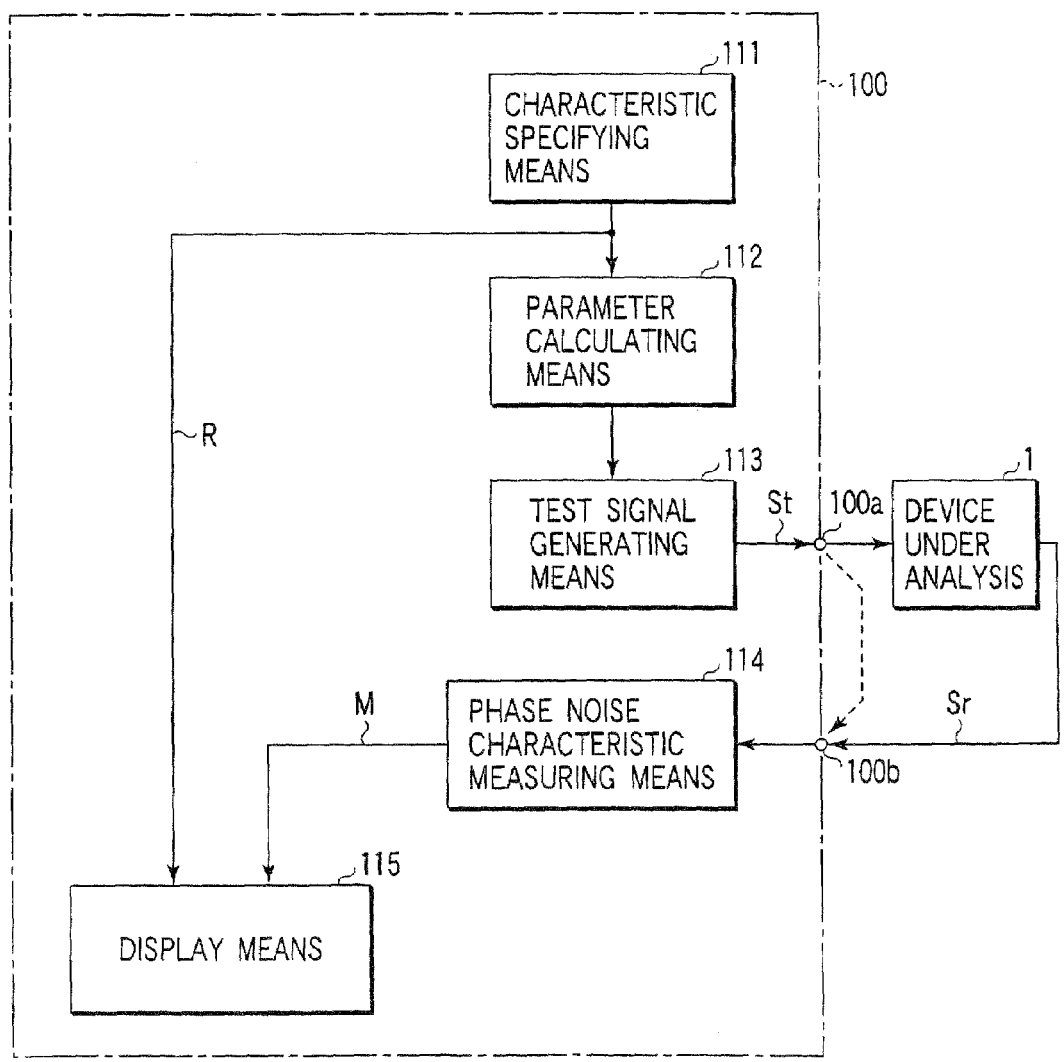
FIG. 52 is a block diagram illustrating the configuration of a conventional phase noise transfer characteristic analyzer.

Next, a phase noise transfer characteristic analyzer 500, which improves in this respect, corresponding to the phase noise transfer characteristic analyzer according to the aforementioned invention (21) will be explained with reference to FIG. 49.

This phase noise transfer characteristic analyzer 500 employs phase noise characteristic calculating means 510 instead of the first phase noise characteristic measuring means 300 of the aforementioned phase noise transfer characteristic analyzer 200. Since the rest of the configuration is identical to the phase noise transfer characteristic analyzer 200, the same reference numerals are designated, and explanation is omitted.

The phase noise characteristic calculating means 510 finds a phase noise characteristic R' of the test signal output by the test signal generating means 230 based on a parameter calculated by the parameter calculating means 220.

Specifically, the phase noise characteristic calculating means 510 performs the following calculations for finding the aforementioned characteristics of the phase noise such as TDEV, TIErms, MADEV, ADEV and the like:

$$TDEV(n\tau_0) = \left\{(16/3n^2)\int [\sin^6(\pi fn\tau_0)/\sin^2(\pi f\tau_0)]\cdot Sx(f)df\right\}^{1/2}$$

(where $n = 0, 1, 2, \ldots, N$)

$$TIErms(\tau) = \left[8\int Sx(f)\sin^2(\pi f\tau)df\right]^{1/2}$$

$$ADEV(\tau) = \left[(16/\tau^2)\int Sx(f)\sin^4(\pi f\tau)df\right]^{1/2}$$

$$MADEV(n\tau_0) = \left\{\left[16/(n^2\tau_0)^2\right]\int [\sin^6(\pi fn\tau_0)/\sin^2(\pi f\tau_0)]\cdot Sx(f)df\right\}^{1/2}$$

(where $n = 0, 1, 2, \ldots, N$)

$$Sx(f) = fc[(\sigma_a \cdot u \cdot A)\sin(\pi f/f_s)/2\pi f\sin(\pi f/f_c)]^2 \cdot |H(e^{j\pi f/fs})|^2$$

The symbol $\int$ represents integration for $f=0-f=fh$; the parameter fh is a maximum frequency of noise; $\tau$ is a measuring time; $\tau_0$ is a measurement sampling time; $\sigma_a$ is a standard deviation of the white noise; $f_s$ is a sampling frequency of the white noise generating means 121; u is a quantization step of DDS when the clock modulator 260 is comprised of DDS; and $f_c$ is a clock frequency of a D/A converter used for binarizing the output of the DDS.

Also, A is an amplitude coefficient of the noise signal N'; $|H(e^{j\pi f/fs})|$ is a frequency characteristic calculated based on the characteristic coefficient output from the parameter calculating means 220; and Sx(f) is the power spectrum of a time error calculated based on the parameter output from the parameter calculating means 220.

As described above, since the phase noise characteristic R' calculated using the power spectrum Sx(f) of the time error derived from the parameter output from the parameter calculating means 220 corresponds to the circuit configuration for generating an actual test signal, it well represents the phase noise characteristic of the test signal St.

Thus, according to the phase noise transfer characteristic analyzer 500, similar to the aforementioned phase noise transfer characteristic analyzer 200, the approximation error E of the phase noise characteristic R' of the test signal St with respect to the specified phase noise characteristic R is calculated by the approximation error calculating means 410. The phase noise characteristic M measured by the phase noise characteristic measuring means 400 is corrected with the approximation error E by the virtual characteristic calculating means 420 to derive the virtual phase noise characteristic M' of a signal output from the device 1 under analysis when assuming that a test signal of the specified phase noise characteristic R is received. Then, the virtual phase noise characteristic M' and the specified phase noise characteristic R are displayed by the display means 43 in such a manner that the difference therebetween can be seen, thereby making it possible to correctly know the difference by a simple comparison between the characteristics in a manner similar to the foregoing.

Also, in this case, since the measurement for deriving the characteristic need be made only once, the phase noise transfer characteristic of the device 1 under analysis can be correctly known in a short measuring time.

It should be noted that the phase noise transfer characteristic analyzers 200, 500 display the specified phase noise characteristic R and the virtual characteristic M' by the display means 430 in such a manner that the difference therebetween can be seen.

Alternatively, the difference between the specified phase noise characteristic R and the virtual characteristic M' may be calculated by a processor, the result may be output as a graph or numerical values in the manner described above.

As explained above, the phase noise transfer characteristic analyzer according to the aforementioned invention (20) comprises characteristic specifying means for specifying an arbitrary phase noise characteristic; parameter calculating means for calculating a parameter required to generate a test signal of a phase noise characteristic specified by the characteristic specifying means; test signal generating means for generating a test signal having the phase noise characteristic based on a parameter calculated by the parameter calculating means; first phase noise characteristic measuring means for measuring a phase noise characteristic of the test signal generated by the test signal generating means; an output terminal for outputting the test signal generated by the test signal generating means to an external device under analysis; an input terminal for inputting a signal output from the device under analysis which has received the test signal; second phase noise characteristic measuring means for measuring a phase noise characteristic of a signal input from the input terminal in parallel with the measurement of the phase noise characteristic for the test signal by the first phase noise characteristic measuring means; approximation error calculating means for calculating a difference between the phase noise characteristic specified by the characteristic specifying means and the phase noise characteristic measured by the first phase noise characteristic measuring means as an approximation error; and virtual characteristic calculating means for calculating a virtual phase noise characteristic of a signal output when assuming that the device under analysis has received a test signal of the phase noise characteristic specified by the characteristic specifying means, thereby making it possible to know the difference between the phase noise characteristic specified by the characteristic specifying means and the virtual phase noise characteristic calculated by the virtual characteristic calculating means.

Also, the phase noise transfer characteristic analyzer according to the aforementioned invention (21) comprises characteristic specifying means for specifying an arbitrary phase noise characteristic; parameter calculating means for calculating a parameter required to generate a test signal of a phase noise characteristic specified by the characteristic specifying means; test signal generating means for generating a test signal having the phase noise characteristic based on a parameter calculated by the parameter calculating means; phase noise characteristic calculating means for calculating a phase noise characteristic of the test signal generated by the test signal generating means; an output terminal for outputting the test signal generated by the test signal generating means to an external device under analysis; an input terminal for inputting a signal output from the device under analysis which has received the test signal; phase noise characteristic measuring means for measuring a phase noise characteristic of a signal input from the input terminal; approximation error calculating means for calculating a difference between the phase noise characteristic specified by the characteristic specifying means and the phase noise characteristic measured by the phase noise characteristic measuring means as an approximation error; and virtual characteristic calculating means for correcting the phase noise characteristic measured by the second phase noise characteristic measuring means with the approximation error calculated by the approximation error calculating means to calculate a virtual phase noise characteristic of a signal output when assuming that the device under analysis has received a test signal of the phase noise characteristic specified by the characteristic specifying means, thereby making it possible to know the difference between the phase noise characteristic specified by the characteristic specifying means and the virtual phase noise characteristic calculated by the virtual characteristic calculating means.

Thus, according to the phase noise transfer characteristic analyzers of the aforementioned inventions (20) and (21), it is possible to correctly know the difference between the phase noise characteristic specified by the characteristic specifying means and the virtual phase noise characteristic calculated by the virtual characteristic calculating means, i.e., the phase noise transfer characteristic of the device under analysis for the specified phase noise characteristic in a short measuring time.

Therefore, according to the present invention, it is possible to provide a wander generator which is capable of readily and accurately generating a clock signal having wander of a desired characteristic, and a digital line tester using the wander generator.

Also, according to the present invention, it is possible to provide a phase noise transfer characteristic analyzer which is capable of correctly evaluating a specified characteristic in a short measuring time, for example, using the wander generator which is capable of readily and accurately generating a clock signal having wander of a desired characteristic.

What is claimed is:

1. A digital line tester comprising:
   a wander generator for generating a clock signal having wander which satisfies a defined time deviation characteristic;
   a transmission unit for sending a digital signal synchronized with the clock signal output from said wander generator to a digital line under testing;
   a reception unit for receiving the digital signal returned from said digital line under testing and restoring a clock signal of the received digital signal;
   an error measuring unit for measuring errors in the digital signal received by said reception unit;
   a time deviation measuring unit for measuring a time deviation characteristic of the clock signal restored by said reception unit;
   a display device; and
   display control means for displaying a result of measurements of said error measuring unit and the time deviation characteristic measured by said time deviation measuring unit on said display unit in such a manner that it can be compared with the defined time deviation characteristic,
   wherein said wander generator comprises:
      center frequency information setting means for setting data for determining a center frequency of the clock signal;
      characteristic information setting means for setting characteristic information of the defined time deviation characteristic;
      a fluctuating signal sequence generator unit for generating a fluctuating signal sequence having a power spectrum density distribution characteristic of frequency fluctuations corresponding to the defined time deviation characteristic based on the characteristic information set by said characteristic information setting means;

an adder for adding the data set by said center frequency information setting means to the fluctuating signal sequence output from said fluctuating signal sequence generator unit;

a direct digital synthesizer for outputting a frequency signal corresponding to an output of said adder; and a clock signal output circuit for waveform shaping an output signal of said direct digital synthesizer to output a clock signal;

wherein said fluctuating signal sequence generator unit comprises:

noise generating means for generating a white noise signal based on a pseudo random signal:

impulse response processing means for calculating an impulse response of a transfer function for approximating a power spectrum of the white noise signal output from said noise generating means to the power spectrum density distribution characteristic of the frequency fluctuations based on the characteristic information set by said characteristic information setting means; and convolution processing means for convoluting a result of the calculation by said impulse response processing means with the white noise signal output from the noise generating means to generate the fluctuating signal sequence having the power spectrum density distribution characteristic of the frequency fluctuations.

2. A digital line tester according to the claim 1, wherein said impulse response processing means corrects the impulse response with a correction function corresponding to an error between the power spectrum density distribution characteristic of the frequency fluctuations and the transfer function.

3. A digital line tester according to claim 1, wherein said convolution processing means preferentially performs a product sum calculation for smaller absolute values of the result of the calculation for the impulse response.

4. A digital line tester according to claim 1, wherein said impulse response processing means is configured to perform the calculation for the impulse response each time a white noise signal is output from the noise generating means; and wherein said convolution processing means performs the convolution processing using a result of the calculation made each time by the impulse response processing means.

5. A digital line tester according to claim 1, wherein said noise generating means comprises a plurality of sets of pseudo random signal generating means for generating pseudo random codes of M sequence at initial phases different from one another, and wherein said noise generating means is configured to collect outputs at predetermined stages of said respective pseudo random signal generating means to output a parallel white noise signal of a plurality of bits.

6. A digital line tester comprising:

a wander generator for generating a clock signal having wander which satisfies a defined time deviation characteristic;

a transmission unit for sending a digital signal synchronized with the clock signal output from said wander generator to a digital line under testing;

a reception unit for receiving the digital signal returned from said digital line under testing and restoring a clock signal of the received digital signal;

an error measuring unit for measuring errors in the digital signal received by said reception unit;

a time deviation measuring unit for measuring a time deviation characteristic of the clock signal restored by said reception unit;

a display device; and display control means for displaying a result of measurements of said error measuring unit and the time deviation characteristic measured by said time deviation measuring unit on said display unit in such a manner that it can be compared with the defined time deviation characteristic, wherein said wander generator comprises:

center frequency information setting means for setting data for determining a center frequency of the clock signal;

characteristic information setting means for setting characteristic information of the defined time deviation characteristic;

a fluctuating signal sequence generator unit for generating a fluctuating signal sequence having a power spectrum density distribution characteristic of frequency fluctuations corresponding to the defined time deviation characteristic based on the characteristic information set by said characteristic information setting means;

an adder for adding the data set by said center frequency information setting means for generating unit;

a direct digital synthesizer for outputting a frequency signal corresponding to an output of said adder; and a clock signal output circuit for waveform shaping an output signal of said direct digital synthesizer to output a clock signal; and wherein said fluctuating signal sequence generator unit comprises:

noise generating means for generating a white noise signal based on a pseudo random signal;

data distributing means for distributing noise signals output from said noise generating means into respective signal paths in accordance with a plurality of bands into which a frequency range of the power spectrum density distribution characteristic of the frequency fluctuations is divided to output at rates corresponding to the respective bands;

weighting means for applying weights in accordance with a magnitude of spectrum of each of the bands into which the frequency band of the power spectrum density distribution characteristic is divided for the noise signals at the respective rates distributed by said data distributing means; and combining means for combining the noise signals at the respective rates weighted by the weighting means to generate the fluctuating signal sequence having the power spectrum density distribution characteristic of the frequency fluctuations.

7. A digital line tester according to claim 6, wherein said noise generating means comprises a plurality of sets of pseudo random signal generating means for generating pseudo random codes of M sequence at initial phases different from one another, and wherein said noise generating means is configured to collect outputs at predetermined stages of said respective pseudo random signal generating means to output a parallel white noise signal of a plurality of bits.

8. A digital line tester comprising:

white noise generating means for generating a digital white noise signal;

a filter unit having a digital filter for storing a digital signal in a plurality of internal storage elements while sequentially shifting therein and performing product sum calculations for the contents stored in said plurality of storage elements for converting the noise signal output from said white noise generating means to a noise signal of a frequency characteristic corresponding to a previously set characteristic coefficient and for outputting the noise signal;

characteristic coefficient setting means for setting arbitrary characteristic coefficients in said filter unit;

a multiplier for multiplying the noise signal output from said filter unit by an amplitude coefficient;

amplitude setting means for setting an arbitrary coefficient to the multiplier;

a frequency synthesizer for outputting a clock signal which is phase modulated by a noise signal output from said multiplier; and initial setting means for initially setting a noise signal sequence equivalent to the contents stored in the respective storage elements of said digital filter in a state in which a noise signal of a frequency characteristic corresponding to a characteristic coefficient is being output from said filter unit in the respective storage elements of said digital filter at least in an initial phase of operation of said apparatus.

* * * * *